(12) United States Patent (10) Patent No.: US 12,578,738 B2

Jorge (45) Date of Patent: Mar. 17, 2026

(54) MOTION CONTROL OF A ROBOTIC LOAD HANDLING DEVICE

(71) Applicant: Ocado Innovation Limited, Hatfield (GB)

(72) Inventor: Tiago Miguens Rijo Branco Jorge, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 450 days.

(21) Appl. No.: 18/258,908

(22) PCT Filed: Dec. 21, 2021

(86) PCT No.: PCT/EP2021/087168

§ 371 (c)(1),
(2) Date: Jun. 22, 2023

(87) PCT Pub. No.: WO2022/136480

PCT Pub. Date: Jun. 30, 2022

(65) Prior Publication Data

US 2024/0043224 A1 Feb. 8, 2024

(30) Foreign Application Priority Data

Dec. 24, 2020 (GB) ...................................... 2020668
Dec. 24, 2020 (GB) ...................................... 2020680

(Continued)

(51) Int. Cl.
G05D 1/65 (2024.01)
B65G 1/04 (2006.01)
(Continued)

(52) U.S. Cl.
CPC ......... G05D 1/0212 (2013.01); B65G 1/0464 (2013.01); B65G 1/0478 (2013.01);
(Continued)

(58) Field of Classification Search
CPC .. G05D 1/0212; G05D 1/0066; G05D 1/0223; G05D 1/644; G05D 1/65;
(Continued)

(56) References Cited

U.S. PATENT DOCUMENTS 9,421,687 B2 8/2016 Nakajima
2007/0091094 A1 4/2007 Hong et al.
(Continued)

FOREIGN PATENT DOCUMENTS

CN 104298114 A 1/2015
EP 3535633 B1 8/2020
(Continued)

OTHER PUBLICATIONS

Office Action (Communication) issued on May 10, 2024, by the European Patent Office in corresponding European Patent Application No. 21 840 053.9. (3 pages).

(Continued)

*Primary Examiner* — Bao Long T Nguyen

(74) *Attorney, Agent, or Firm* — Gregory Matt McCloskey

(57) ABSTRACT

A load handling device for lifting and moving containers stacked in a storage system having a grid framework structure supporting a plurality of tracks arranged in a grid pattern, the load handling device including: a wheel assembly driven by a drive mechanism; a lifting device for lifting a storage container; a position detection detector; and a controller configured to control movement of the load handling device by: a) determining a feedforward torque demand on the wheel assembly at a given time from a predetermined motion control profile; and b) compensating the feedforward torque demand from a measured position of the load handling device on the grid structure at the given time to calculate a torque demand on the wheel assembly.

26 Claims, 43 Drawing Sheets

(30) Foreign Application Priority Data

| | | | |
|---|---|---|---|
| Dec. 24, 2020 | (GB) | .................................... | 2020681 |
| Dec. 24, 2020 | (GB) | .................................... | 2020684 |

(51) Int. Cl.

| | |
|---|---|
| B65G 43/00 | (2006.01) |
| B65G 43/02 | (2006.01) |
| B65G 59/02 | (2006.01) |
| G05D 1/00 | (2006.01) |
| G05D 1/644 | (2024.01) |
| G05D 1/83 | (2024.01) |

(52) U.S. Cl.
CPC ............. *B65G 43/00* (2013.01); *B65G 43/02* (2013.01); *B65G 59/02* (2013.01); *G05D 1/0066* (2013.01); *G05D 1/0223* (2013.01); *G05D 1/644* (2024.01); *G05D 1/65* (2024.01); *G05D 1/83* (2024.01); *B65G 2203/0283* (2013.01); *B65G 2203/0291* (2013.01); *B65G 2203/044* (2013.01)

(58) Field of Classification Search
CPC .......... G05D 1/83; G05D 1/0217; G05D 1/02; G05D 1/00; G05D 1/0221; B65G 1/0464; B65G 1/0478; B65G 43/00; B65G 43/02; B65G 59/02; B65G 2203/0283; B65G 2203/0291; B65G 2203/044; B65G 1/065; B65G 1/0457; B65G 2203/0266
See application file for complete search history.

(56) References Cited

U.S. PATENT DOCUMENTS

| | | | | |
|---|---|---|---|---|
| 2008/0133102 | A1 | 6/2008 | Kubo | |
| 2010/0063603 | A1 | 3/2010 | Chandhoke | |
| 2014/0012419 | A1 | 1/2014 | Nakajima | |
| 2017/0225710 | A1 | 8/2017 | Yu et al. | |
| 2019/0092570 | A1 | 3/2019 | Macdonald et al. | |
| 2019/0100382 | A1 | 4/2019 | Skotschek | |
| 2019/0256286 | A1* | 8/2019 | Hognaland | .......... B65G 1/0492 |
| 2020/0363819 | A1 | 11/2020 | Stadie et al. | |
| 2020/0384645 | A1 | 12/2020 | Griffiths et al. | |
| 2021/0214161 | A1* | 7/2021 | Stuhaug | ............... B65G 1/0485 |
| 2024/0045435 | A1 | 2/2024 | Jorge | |
| 2024/0053752 | A1 | 2/2024 | Jorge | |
| 2024/0059487 | A1 | 2/2024 | Jorge | |

FOREIGN PATENT DOCUMENTS

| | | | |
|---|---|---|---|
| GB | 2584766 | A | 12/2020 |
| JP | S63261404 | A | 10/1988 |
| JP | H03243453 | A | 10/1991 |
| JP | 2005041383 | A | 2/2005 |
| JP | 2008140144 | A | 6/2008 |
| JP | 2010511919 | A | 4/2010 |
| JP | 2013215827 | A | 10/2013 |
| JP | 2014014876 | A | 1/2014 |
| JP | 2016529181 | A | 9/2016 |
| JP | 2019510674 | A | 4/2019 |
| JP | 2019533857 | A | 11/2019 |
| KR | 20130092306 | A | 8/2013 |
| WO | 2006102517 | A2 | 9/2006 |
| WO | 2015019055 | A1 | 2/2015 |
| WO | 2015185628 | A2 | 12/2015 |
| WO | 2017165687 | A1 | 9/2017 |
| WO | 2017186825 | A1 | 11/2017 |
| WO | 2019170805 | A1 | 9/2019 |
| WO | 2019206440 | A1 | 10/2019 |
| WO | 2019238676 | A1 | 12/2019 |
| WO | 2019238702 | A1 | 12/2019 |

OTHER PUBLICATIONS

Office Action (Communication) issued on May 10, 2024, by the European Patent Office in corresponding European Patent Application No. 21 844 285.3. (4 pages).

Office Action (Communication) issued on May 10, 2024, by the European Patent Office in corresponding European Patent Application No. 21 844 286.1. (4 pages).

Office Action issued on Jul. 16, 2024, by the Japanese Patent Office in corresponding Japanese Patent Application No. 2023-539009, and an English Translation of the Office Action. (9 pages).

Office Action (Communication) issued on Nov. 7, 2024, by the European Patent Office in corresponding European Patent Application No. 21 844 286.1. (3 pages).

Office Action issued on Oct. 10, 2024, by the Canadian Patent Office in corresponding Canadian Patent Application No. 3,204,856. (7 pages).

Office Action issued on Oct. 11, 2024, by the Canadian Patent Office in corresponding Canadian Patent Application No. 3,204,768. (7 pages).

Office Action issued on Oct. 18, 2024, by the Canadian Patent Office in corresponding Canadian Patent Application No. 3,205,072. (8 pages).

Office Action issued on Oct. 9, 2024, by the Canadian Patent Office in corresponding Canadian Patent Application No. 3,206,367. (8 pages).

Office Action issued on Jan. 7, 2025 by the Japanese Patent Office in corresponding Japanese Application No. 2023-539004 (2 pages) corresponding to Applicant's U.S. Appl. No. 18/258,908.

Office Action issued on Feb. 7, 2025 by the Korean Patent Office in corresponding Korean Application No. 10-2023-7025308 (7 pages) corresponding to Applicant's U.S. Appl. No. 18/258,908.

First Office Action issued on Aug. 6, 2024, by the Japanese Patent Office in corresponding Japanese Patent Application No. 2023-539008, and an English Translation of the Office Action. (7 pages).

Office Action (Examination Report No. 1) issued on Feb. 8, 2024, by the Australian Patent Office in corresponding Australian Patent Application No. 2021405485. (4 pages).

Office Action (Examination Report No. 1) issued on Feb. 8, 2024, by the Australian Patent Office in corresponding Australian Patent Application No. 2021405502. (4 pages).

Office Action (Examination Report No. 1) issued on Jan. 18, 2024, by the Australian Patent Office in corresponding Australian Patent Application No. 2021405508. (4 pages).

Office Action (Examination Report No. 1) issued on Jan. 22, 2024, by the Australian Patent Office in corresponding Australian Patent Application No. 2021405506. (4 pages).

First Office Action issued on Oct. 1, 2024, by the Japanese Patent Office in corresponding Japanese Patent Application No. 2023-539005, and an English Translation of the Office Action. (15 pages).

Office Action (Notice of Reasons for Refusal) issued on Oct. 1, 2024, by the Japanese Patent Office in corresponding Japanese Patent Application No. 2023-539004, and an English Translation of the Office Action. (25 pages).

Office Action issued on Jun. 15, 2022, by the Great Britain Patent Office in corresponding Great Britain Patent Application No. GB2118674.7. (7 pages).

Office Action issued on Jun. 15, 2022, by the Great Britain Patent Office in corresponding Great Britain Patent Application No. GB2118698.6. (7 pages).

Office Action issued on Jun. 15, 2022, by the Great Britain Patent Office in corresponding Great Britain Patent Application No. GB2118702.6. (8 pages).

"Bibliographic information for UGent How To: Dynamic Torque/ Acceleration Feedforward in Beckhoff Twincat", Mpa_o&d_ mechatronica_ugent_campus_kortrijk, Sep. 29, 2017, XP55902993, retrieved from https://www.youtube.com/watch?v+n17gAgvISOk. (2 pages).

Beckhoff New Automation Technology, "Functional description | EN, TF5200 | TwinCAT 3 CNC, Feedforward control", Jul. 28, 2021, Version 1.01, pp. 1-32, XP055902471, Beckhoff Automation Gmbh & Co. KG, Germany. (32 pages).

(56) References Cited

OTHER PUBLICATIONS

International Search Report (PCT/ISA/210) and Written Opinion (PCT/ISA/237) mailed on Apr. 22, 2022, by the European Patent Office as the International Searching Authority for International Application No. PCT/EP2021/087170. (14 pages).

International Search Report (PCT/ISA/210) and Written Opinion (PCT/ISA/237) mailed on Mar. 22, 2022 by the European Patent Office as the International Searching Authority for International Application No. PCT/EP2021/087125. (15 pages).

International Search Report (PCT/ISA/210) and Written Opinion (PCT/ISA/237) mailed on Mar. 25, 2022 by the European Patent Office as the International Searching Authority for International Application No. PCT/EP2021/087163. (16 pages).

International Search Report (PCT/ISA/210) and Written Opinion (PCT/ISA/237) mailed on Mar. 31, 2022 by the European Patent Office as the International Searching Authority for International Application No. PCT/EP2021/087168. (18 pages).

Kim, Joohn-Sheok, "A Feasible Approach for the Unified PID Position Controller Including Zero-Phase Error Tracking Performance for Direct Drive Rotation Motor", Journal of Power Electronics, Jan. 1, 2009, vol. 9, No. 1, pp. 74-84. (11 pages).

Maxon Motor Control, "Application Note "Position Regulation with Feed Forward"", EPOS Application Note: Position Regulation with Feed Forward, EPOS Positioning Controller, May 1, 2008, pp. 1-7, XP055902483. (7 pages).

* cited by examiner

174

176

Network

130

200

202 — DEFINE A SET OF MOTION CONSTRAINTS FOR A DRIVE MECHANISM

204 — RECEIVE A COMMAND TO TRAVEL FROM A CURRENT POSITION TO A COMMANDED POSITION

206 — GENERATE A MOTION PROFILE BY APPLYING THE JERK REFERENCE FOR TRAVERSING FROM THE CURRENT POSITION TO THE COMMANDED POSITION

208 — PERIODICALLY ADVANCE THE MOTION PROFILE AND COMPUTE MOTION TORQUE DEMANDS

315

Compute trajectory distance, x, for remainder of constant velocity phase.

Apply velocity transition algorithm to determine the trajectory distance, y, to ramp down to zero velocity Calculate y + x to obtain trajectory distance still to cover in the constant velocity phase Next Question

400

Start

402

Input Constraints

404

$|a_0| > a_{max}$ yes

406

Add trajectory segment to the output list with
$J = -sgn(a_0) \times J_{red}$ and $T = |a_{max} - |a_0|| / J_{red}$ Brings a to $a_{max}$ no

408

Integrate trajectory from start point $(v_0, a_0)$, using all segments on the
output list, to compute the resulting velocity and acceleration, $v_{E1}$ and $a_{E1}$

410

$(a_0, v_0, p_0) \leftarrow (a_{E1}, v_{E1}, p_{E1})$

412

$\Delta v = v_f - v_0$

414

$\Delta v = 0$
and $a_0 \neq 0$ yes no

416

$\Delta v \times a_0 < 0$ yes no

418

Add trajectory segment to the output list with
$J = -sgn(a_0) \times J_{red}$ and $T = |a_0| / J_{red}$

420

Integrate trajectory from start point $(v_0, a_0)$, using all segments on the
output list, to compute the resulting velocity and acceleration, $v_{E2}$ and $a_{E2}$

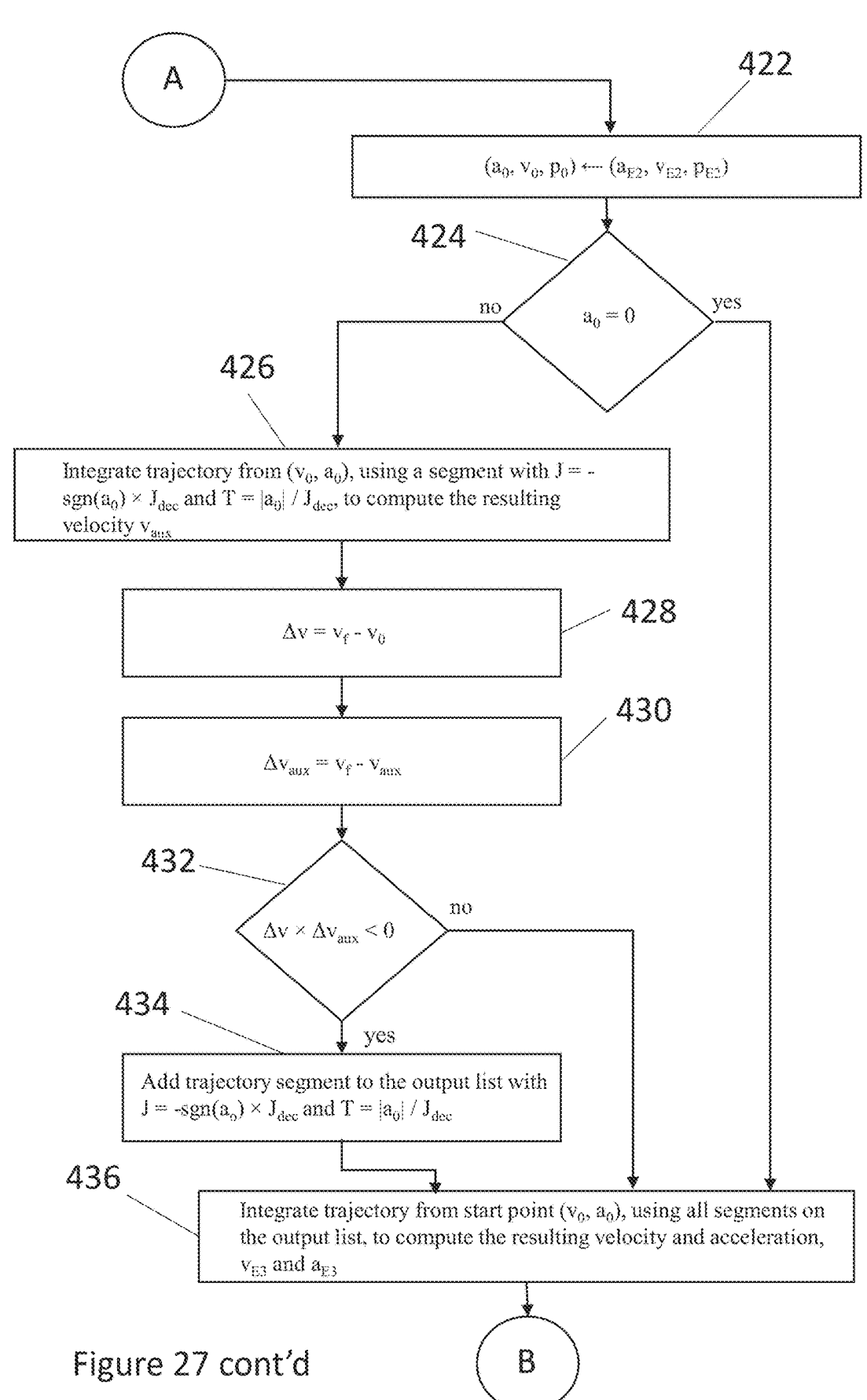

A

422

$(a_0, v_0, p_0) \longleftarrow (a_{E2}, v_{E2}, p_{E2})$

424 no          $a_0 = 0$          yes

426

Integrate trajectory from $(v_0, a_0)$, using a segment with $J = -sgn(a_0) \times J_{dec}$ and $T = |a_0| / J_{dec}$, to compute the resulting velocity $v_{aux}$

428

$\Delta v = v_f - v_0$

430

$\Delta v_{aux} = v_f - v_{aux}$

432

$\Delta v \times \Delta v_{aux} < 0$          no 434          yes

Add trajectory segment to the output list with $J = -sgn(a_0) \times J_{dec}$ and $T = |a_0| / J_{dec}$

436

Integrate trajectory from start point $(v_0, a_0)$, using all segments on the output list, to compute the resulting velocity and acceleration, $v_{E3}$ and $a_{E3}$

B

Figure 27 cont'd $$(a_0, v_0, p_0) \leftarrow (a_{E3}, v_{E3}, p_{E3})$$

438

Call the second velocity transition sub algorithm

440

Integrate trajectory from an initial null position ($P_0 = 0$), using all segments on the output list, to compute the total distance traversed by solution, $\Delta P$

442

End

B′

B

536

$$\Delta v_{dec} = a_{max}^{2} / (2 \times J_{dec})$$

538

$$T_{const} = (|\Delta v| - \Delta v_{dec}) / a_{max}$$

540

Add trajectory segment to the output list with J = 0 and T = T_const

542

Add trajectory segment to the output list with J = -S × J_dec and T = a_max / J_dec End (c)

A'

A

624

626 yes

Apply min forced deceleration (FD$_{min}$)

Applying min forced deceleration (FD$_{min}$) causes trajectory to undershoot or land on the final position?

628 no

Use root-finding to compute the value of forced deceleration that lies between FD$_{min}$ and FD$_{max}$ for which the trajectory lands on the final position, and apply that value of forced deceleration End

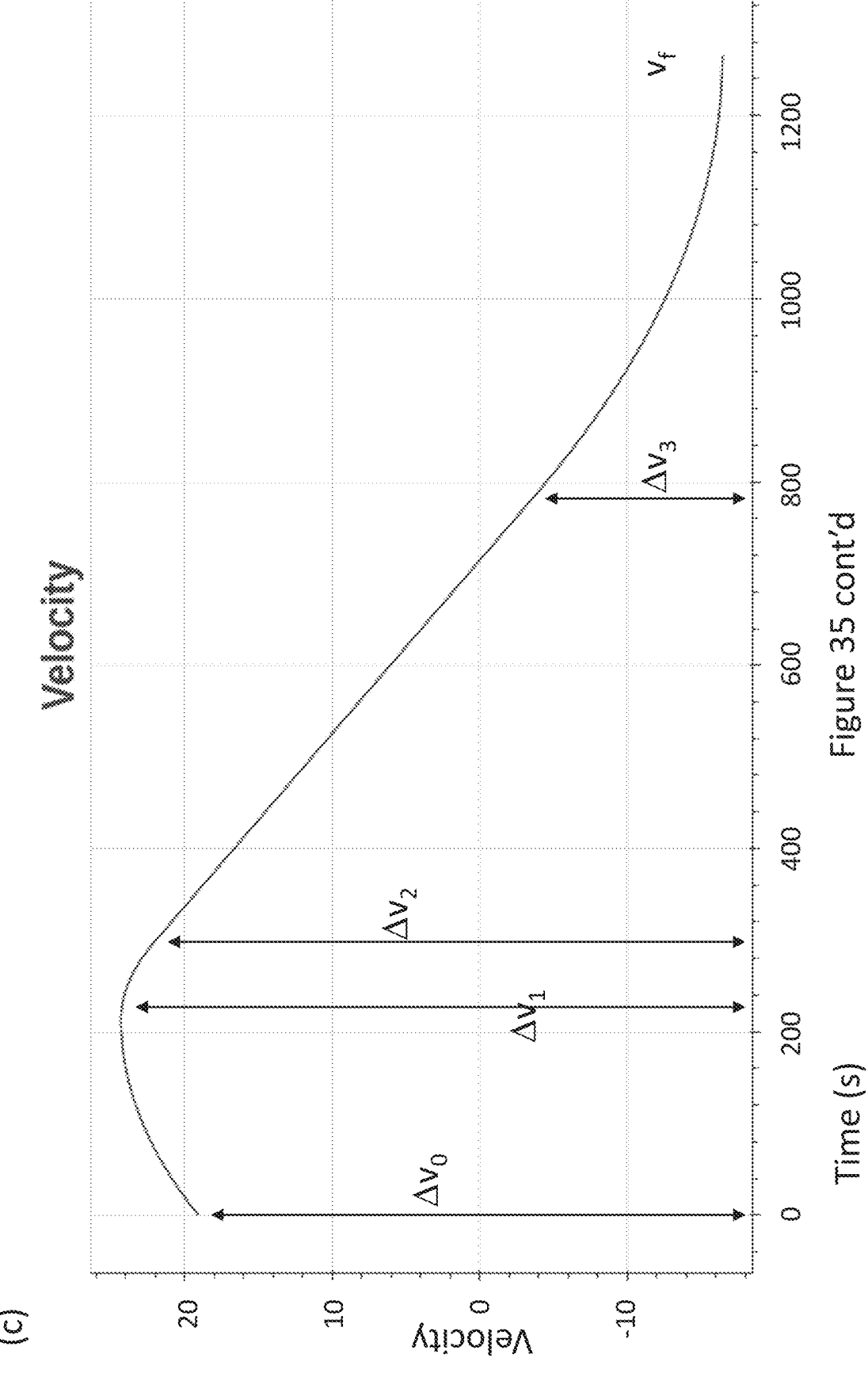

MOTION CONTROL OF A ROBOTIC LOAD HANDLING DEVICE

FIELD OF THE INVENTION

The present invention relates to the field of a storage or fulfilment system in which stacks of bins or containers are arranged within a grid framework structure, more specifically to the generation and control of the motion of a load handling device operative to move one or more containers stored in the storage or fulfilment system.

BACKGROUND

Storage systems comprising a three-dimensional storage grid structure, within which storage containers/bins are stacked on top of each other, are well known. PCT Publication No. WO2015/185628A (Ocado) describes a known storage and fulfilment system in which stacks of bins or containers are arranged within a grid framework structure. The bins or containers are accessed by load handling devices (otherwise known as a "bot") operative on tracks located on the top of the grid framework structure. A system of this type is illustrated schematically in FIGS. 1 to 3 of the accompanying drawings.

As shown in FIGS. 1 and 2, stackable containers, known as storage containers or totes or bins 10, are stacked on top of one another to form stacks 12. The stacks 12 are arranged in a grid framework structure 14 in a warehousing or manufacturing environment. The grid framework structure 14 is made up of a plurality of storage columns or grid columns. Each grid in the grid framework structure has at least one grid column for storage of a stack of containers. FIG. 1 is a schematic perspective view of the grid framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

The grid framework structure 14 comprises a plurality of upright members 16 that support horizontal members 18, 20. A first set of parallel horizontal grid members 18 is arranged perpendicularly to a second set of parallel horizontal members 20 in a grid pattern to form a plurality of horizontal grid structures 15 supported by the upright members 16. The members 16, 18, 20 are typically manufactured from metal. The bins 10 are stacked between the members 16, 18, 20 of the grid framework structure 14, so that the grid framework structure 14 guards against horizontal movement of the stacks 12 of bins 10, and guides vertical movement of the bins 10.

The top level of the grid framework structure 14 comprises a grid or grid structure 15 which includes rails 22 arranged in a grid pattern across the top of the stacks 12. Referring additionally to FIG. 3, the rails or tracks 22 guide a plurality of load handling devices 30. A first set 22a of parallel rails 22 guide movement of the robotic load handling devices 30 in a first direction (for example, an X-direction) across the top of the grid framework structure 14, and a second set 22b of parallel rails 22, arranged perpendicular to the first set 22a, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

A known load handling device 30 shown in FIGS. 4 and 5 comprises a vehicle body 32 is described in PCT Patent Publication No. WO2015/019055 (Ocado), hereby incorporated by reference, where each load handling device 30 only covers one grid space of the grid framework structure 14. Here, the load handling device 30 comprises a wheel assembly comprising a first set of wheels 34 consisting of a pair of wheels on the front of the vehicle body 32 and a pair of wheels 34 on the back of the vehicle body 32 for engaging with the first set of rails or tracks to guide movement of the device in a first direction and a second set of wheels 36 consisting of a pair of wheels 36 on each side of the vehicle 32 for engaging with the second set of rails or tracks to guide movement of the device in a second direction. Each of the sets of wheels are driven to enable movement of the vehicle in X and Y directions respectively along the rails. One or both sets of wheels can be moved vertically to lift each set of wheels clear of the respective rails, thereby allowing the vehicle to move in the desired direction on the grid.

The load handling device 30 is equipped with a lifting device or crane mechanism to lift a storage container from above. The crane mechanism comprises a winch tether or cable 38 wound on a spool or reel (not shown) and a grabber device 39. The lifting device comprises a set of lifting tethers 38 extending in a vertical direction and connected nearby or at the four corners of a lifting frame 39, otherwise known as a grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2. One or more motors can be used to power the lifting device.

The wheels 34, 36 are arranged around the periphery of a cavity or recess, known as a container-receiving recess or container receiving space 40, in the lower part. The recess is sized to accommodate the container 10 when it is lifted by the crane mechanism, as shown in FIG. 5 (a and b). When in the recess, the container is lifted clear of the rails beneath, so that the vehicle can move laterally to a different location. On reaching the target location, for example another stack, an access point in the storage system or a conveyor belt, the bin or container can be lowered from the container receiving portion and released from the grabber device.

Typically, one or more load handling devices remotely operable on the grid structure is configured to receive instructions from a master controller, to retrieve a storage container from a particular storage location within the grid framework structure. Wireless communications and networks may be used to provide the communication infrastructure from the master controller via one or more base stations to the one or more load handling devices operative on the grid structure. A controller in the load handling device in response to receiving the instructions is configured to control various driving mechanisms to control the movement of the load handling device. For example, the load handling device may be instructed to retrieve a container from a storage column at a particular location on the grid structure. The instruction can include various movements in an X-Y direction on the grid structure. Once at the storage column, the lifting mechanism is then operated to grab the storage container and lift it into a container receiving space in the body of the load handling device where it is subsequently transported to a another location on the grid structure commonly known as a drop off port. The storage container is lowered to a suitable pick station so as to allow retrieval of the item from the storage container. Movement of the load handling devices on the grid structure also involves the load handling devices being instructed to move to a charging station which is usually located at the periphery of the grid structure.

To enable the controller to locate the position of the load handling device relative to the grid structure, each load handling device may be provided with one or more RFID tag readers or scanners, and a plurality of RFID tags may be provided across the top of the grid structure. The RFID tags may be fixed relative to the grid structure so as to provide a series of reference points on the grid structure. As the load handling devices moves across the grid structure, the load handling devices' respective RFID tag readers read the signals from the one or more of the RFID tags fixed at various locations on the grid structure. Typically, the RFID tags are fixed at a junction or crossroads of the tracks at each grid cell.

To manoeuvre the load handling devices from one destination to another on the grid structure, each of the of the load handling devices are equipped with motors for driving the wheels of the load handling device. Rotation of the wheels may be driven via one or more belts connected to the wheels or driven individually by a motor integrated into the wheels. Typically, for a single cell load handling device where the footprint of the load handling device occupies a single grid cell and due to the limited availability of space within the vehicle body, the motors for driving the wheels are integrated into the wheels. The wheels of a single cell load handing devices are driven by hub motors. Each hub motor comprises an outer rotor comprising a plurality of permanent magnets that is arranged to rotate about a wheel hub comprising coils forming an inner stator.

One of the major drawbacks of a single cell load handling device is the stability of the load handling device when moving on the tracks, which presents challenges particularly during acceleration/deceleration of the load handling device on the tracks. High acceleration or deceleration on the tracks may cause the load handling device to oscillate or even topple on the grid structure. Typically, the rotation of the wheels of the load handling device are individually controlled to cause the load handling device to be driven in a straight line on the tracks without yawing or deviating from its intended course.

Since the wheels are of a similar size, they will generally rotate at the same speed when the load handling device moves on the tracks. However, there are several factors that may affect the smoothness of the movement of the load handling on the tracks and make it likely to yaw or be driven in an off-lead angle. Such factors may include slippage of one or more wheels, gliding and/or loading one or more of the wheels differently—all of which contribute to one or more of the wheels rotating at different speeds. Additionally, the sudden change in acceleration of the load handling devices on the tracks, otherwise known as jerk, affects the smoothness of the movement of the load handling device on the tracks. When carrying items that can be easily bruised or damaged such as grocery items, this sudden movement of the load handling device when accelerating or decelerating potentially causes the items to be thrown around in the storage container.

EP3535633 (Autostore Technology AS) teaches a method and controller for controlling movements of a robot from a start to a stop position, the robot having pairs of wheels having drive means being controlled by local controllers. Here, a master controller is configured to set up individual speed driving sequences for a pair of wheels based on current speed and angular position of each wheel, current global position of the robot and start and stop position of the robot. The speed driving sequence is transmitted to the local controllers controlling the pair of wheels thereby controlling accelerating and decelerating of each wheel via the individual drive means. In EP3535633 (Autostore Technology AS), the local controllers ensure that the speed of the pairs of wheels are kept synchronised. Thus, the teaching in EP3535633 (Autostore Technology AS) is very much focused on controlling the individual speeds of the wheels and making sure that the speed of pairs of wheels are synchronised.

It is thus an object of the present invention to provide a method and device for controlling the movement of the load handling device from a start position to a stop position with a view to ensuring the smooth movement of the load handling device when transitioning between different speeds on the grid structure.

This application claims priority from GB applications GB2020680.1, GB2020668.6, GB2020681.9, and GB2020684.3, all filed 24 Dec. 2020, the contents being herein incorporated by reference.

SUMMARY OF THE INVENTION

The present invention has provided a load handling device for lifting and moving one or more containers stacked in a storage system comprising a grid framework structure supporting a plurality of tracks arranged in a grid pattern to define a grid structure above the one or more stacks of containers, the grid pattern comprising a plurality of grid cells and each of the one or more stacks of containers being located within a footprint of only a single grid cell, the load handling device comprising:

i) a wheel assembly comprising a first and a second pair of wheels; the wheel assembly being driven by a drive mechanism;
  ii) a lifting device for lifting a storage container from one of the stacks of containers into a container receiving space of the load handling device;
  iii) a position detection means for the measuring the position of the load handling device relative to the grid structure;
  iv) a controller in communication with the position detection means and the drive mechanism, the controller being configured to control the movement of the load handling device from a current position to a commanded position on the grid structure by:
    a) determining a feedforward torque demand on the wheel assembly at a given time from a predetermined motion control profile;
    b) compensating the feedforward torque demand from a measured position of the load handling device on the grid structure from the position detection means at the given time to calculate a torque demand on the wheel assembly.

According to the present invention, the controller in communication with the position detection means and the drive mechanism comprises a motion control system to control the positon and the kinematics of the load handling device on the grid structure under the guidance of a predetermined motion control profile or trajectory. When the controller determines that the load handling device must move to a new position or alter its velocity, the controller calculates a position or velocity trajectory referred to as the predetermined motion control profile for transitioning the load handling device from its current position or velocity trajectory to a target position or velocity. The predetermined motion control profile defines the load handling device's kinematics on the grid structure including but not limited to the velocity, acceleration and/or position over time as the load handling device moves from its current position to the target state. The predetermined motion control profile comprises one or more trajectory segments in a sequence, the one or more trajectory segments being respective portions of the trajectory or the motion control profile prescribing at least one of a jerk reference, an acceleration reference, a velocity reference and a position reference as a function of time.

Once this predetermined motion control profile is generated, the controller translates the motion control profile into appropriate control signals for moving the load handling device through the trajectory defined by the motion control profile. The predetermined motion control profile can optionally be based on two preferred motion control profiles, a trapezoidal or S-curve profile. In both of the trapezoidal and S-curve profiles, various trajectory segments of the motion control profile are generated based on predetermined defined constraints, namely maximum velocity, maximum acceleration etc., where the defined constraints may correspond to mechanical limitations of the drive mechanism of the load handling device. Given these constraints and the desired commanded position, the control will generate the predetermined motion control profile used to carry out the desired move. For a trapezoidal profile, the controller will calculate the motion control profile according to three distinct stages, namely an acceleration stage, a constant velocity stage and a deceleration stage. Such a profile results in a trapezoidal velocity curve. In the case of the trapezoidal profile, it is the acceleration which experiences discontinuities and therefore, the manipulated variable (defined as the variable that is controlled, and therefore allowed to change in a discontinuous fashion) is acceleration. Thus, the trapezoidal profile always accelerates or decelerates at the maximum defined acceleration rate. This results in a "jerkier" movement of the load handling device on the grid structure.

The S-curve profile modifies the trapezoidal profile to mitigate this "jerkiness" by adding additional stages that allow gradual transitions between the constant (or zero) velocity stages and the constant acceleration/deceleration stages, thereby providing smoother motion. In comparison to the trapezoidal profile, the manipulated variable, that is allowed to change in a discontinuous fashion, is "jerk". Thus, in addition to the predetermined constraints of maximum velocity and maximum acceleration, the S-curve profile requires an additional 'jerk' constraint.

In the present invention, the controller in communication with the position detection means and the drive mechanism controls the movement of the load handling device from a current position to a commanded position on the grid structure by determining a feedforward torque demand on the wheel assembly at a given time from the predetermined motion control profile. Knowing the mass of the load handling device and the radius of each of the wheels of the wheel assembly, the feedforward torque control is calculated from the predetermined motion control profile from the product of mass and acceleration, where the acceleration is the derivative of the velocity of the predetermined motion control profile, i.e. the trajectory acceleration reference. The controller preferably compensates the feedforward torque demand by 'real' measurements of the position of the load handling device on the grid structure from a position detection means to calculate a 'real' torque demand on the wheel assembly. Preferably, a feedback torque demand is calculated from the derivative of the position measurement as a function of time. More preferably, the controller is configured to compensate the feedforward torque demand by i) determining a feedback torque demand on the wheel assembly from the measured position of the load handling device;

ii) combining the feedforward torque demand with the feedback torque demand to calculate the torque demand on the wheel assembly.

Optionally, the feedback torque demand is determined from a comparison between the magnitude of the position reference derived from the predetermined motion profile and the measured position of the load handling device on the grid structure at the given time. In accordance with an embodiment of the present invention, the controller compares the trajectory position reference derived from the predetermined motion control profile and the measured position of the load handling device on the grid structure. Preferably, the controller is configured to perform a PI or a PID calculation on the difference between the magnitude of the trajectory position reference and the measured position. The difference provides a positional error which is fed into a PI or a PID controller to calculate a compensating torque demand; the trajectory position reference derived from the motion control profile being the target position and the signal from the position sensor being the measured position. Both the trajectory position reference and the measured position are combined in the PI or PID controller to provide a compensated torque demand. The compensated torque demand or feedback torque demand is combined with the feedforward torque demand to provide a torque demand of the wheels to drive the load handling device. The compensation torque demand allows the load handling device to follow the 'theoretical' motion control profile provided by the predetermined motion control profile.

Preferably, the feedforward torque demand is determined from the magnitude of the acceleration reference and/or the magnitude of the velocity reference.

More preferably, any one of the jerk reference, and/or the acceleration reference, and/or the velocity reference and/or the position reference are stored in a look-up table.

Preferably, the feedforward torque demand is obtained by summing three torque terms together: acceleration feedforward torque demand, velocity feedforward torque demand, and zero-order feedforward torque demand. The acceleration feedforward torque demand is proportional to the acceleration reference, and the velocity feedforward torque demand is proportional to the velocity reference, and the zero-order feedforward torque demand is a constant with a fixed value and the sign of the trajectory velocity reference.

Once the torque demand has been calculated, the controller translates the torque demand into appropriate control signals for moving the load handling device on the grid structure through the trajectory defined by the predetermined motion control profile. Preferably, each wheel of the first and second pair of wheels is configured to be independently driven by the drive mechanism. More preferably, each wheel of the wheel assembly comprises a hub motor. Thus, controlling signals for moving the load handling device are sent to the hub motors. However, the present invention is not limited to the drive mechanism comprising hub motors for driving the wheels of the wheel assembly, and any drive mechanism for driving the wheels known in the art is applicable in the present invention. For example, the wheels can be driven by one or more drive motors by suitable pulley and/or gear arrangement. However, the advantage of the use of hub motors for driving each of the wheels of the load handling device is the ability to control the torque of each of the wheels of the wheel assembly by controlling the controlling signals sent to each of the hub motors.

Preferably, the driving means is configured to at least partially drive at least one of the wheels of the wheel assembly in order to meet the calculated torque demand. Preferably, the driving means is configured to at least partially brake at least one of the wheels of the wheel assembly in order to meet the calculated torque demand.

Preferably, the controller is configured to share the calculated torque demand amongst each wheel of the wheel assembly. For the purpose of the present invention, the term "share" also encompasses distribution in the sense that the calculated torque demand is distributed amongst each wheel of the wheel assembly. Optionally, the controller is configured to share the calculated torque demand between the first and second pair of wheels of the wheel assembly. In one example of the present invention, the torque demand is split between the front and rear pair of wheels depending on the direction of travel of the load handling device on the grid structure. The front pair of wheels can be driven in synchronization and be imagined to be driven about a front "axle". Likewise, the rear pair of wheels can be driven in synchronization and be imagined to be driven about a rear "axle". In a particular embodiment of the present invention, the torque demand is split between the front and rear "axles" to account for any weight transfer of the load handling device on the grid structure.

Optionally, the controller is configured to vary the proportion of the calculated torque demand that is provided by the first and the second pair of wheels. Preferably, the controller is configured to transfer a greater proportion of the calculated torque demand to the first pair of wheels when the first pair of wheels is behind the second pair of wheels in the direction of travel of the load handling device on the grid structure. Preferably, the controller is configured to transfer a greater proportion of the calculated torque demand to the second pair of wheels when the second pair of wheels is in front of the first pair of wheels in the direction of travel of the load handling device on the grid structure. For example, the amount of torque that is shared between the front and rear pair of wheels can be varied and can depend on whether the load handling device is accelerating in the forward direction on the grid structure or decelerating on the grid structure. The first pair of wheels represents the front pair of wheels and the second pair of wheels represents the rear pair of wheels. When the load handling device is accelerating on the grid structure, a greater proportion of the torque is distributed to the front pair of wheels such that the drive mechanism of the front pair of wheels experiences a greater proportion of the torque demand. Conversely, during deceleration of the load handling device on the grid structure, the torque demand is switched to the rear pair of wheels.

The proportion of torque that is provided by the first and second pair of wheels can be made dependent on the degree of trajectory acceleration reference derived from the predetermined motion control profile. Optionally, the controller is configured to share the calculated torque demand between the first and second pair of wheels of the wheel assembly in a ratio based on the magnitude of the trajectory acceleration reference derived from the predetermined motion control profile. The ratio of the distribution of the torque demand between the front and rear wheels can be proportional to the magnitude of the acceleration reference of the load handling device on the grid structure. For example, more torque is distributed to the front pair of wheels when the magnitude of the trajectory acceleration reference in accordance with the predetermined motion control profile is high and conversely, more torque is distributed to the rear pair of wheels when the magnitude of the acceleration reduces or decelerating. Thus, the distribution of the torque demand between the first and second set of wheels varies in a ratio based on data associated with a trajectory acceleration reference derived from the predetermined motion control profile.

Preferably, the ratio of the calculated torque demand between the first and second pair of wheels of the wheel assembly is a function of the magnitude of the trajectory acceleration reference.

During operation of the load handling device on the grid structure, the predetermined motion control profile is regularly updated from the positional measurements from the position detection means. Preferably, the controller is configured to determine the kinematic state of the load handling device on the grid structure from the position measuring means. More preferably, the kinematic state is velocity. Preferably, the velocity of the load handling device relative to the grid structure is determined from a first derivative of the measurements of the position of the load handling device relative to the grid structure as a function of time. Preferably, the load handling device comprises a wheel encoder coupled to at each of the wheels of the wheel assembly for measuring the speed of each of the wheels of the wheel assembly. A comparison of the kinematic state of the load handling device relative to the grid structure and the speed of at least one of the wheels of the wheel assembly will provide a determination whether any one of the wheels of the wheel assembly are slipping on the grid structure or tracks, i.e. losing traction with the grid structure.

More preferably, the controller in communication with the drive wheel encoder is configured to:
i) compare the measured speed of each of the wheels of the wheel assembly with the kinematic state of the load handling device; and
ii) in response to the measured speed of any one of the wheels of the wheel assembly being substantially different to the kinematic state of the load handling device on the grid structure, either:
  a) adjust the shared calculated torque demand to the other wheels such that the kinematic state of the load handling device remains substantially unchanged; and/or
  b) redistribute the calculated torque demand to the each of the wheels of the wheel assembly.

More preferably, the controller in communication with the drive wheel encoder is configured to remove the shared calculated torque demand from the any one of the wheels of the wheel assembly until the speed of the wheel is substantially equal to the kinematic state of the load handling device on the grid structure in response to the measured speed of any one of the wheels of the wheel assembly being substantially greater than the kinematic state of the load handling device.

There may be two occasions where the speed of at least one wheel is different to the kinematic state of the load handling device on the grid structure. The first may be that at least one of the wheels of the wheel assembly has lost traction and is slipping on the grid structure. The second occasion may that the distribution of the torque demand between at least one of the wheels of the wheel assembly may be inadequately even causing the at least one wheel to rotate at a speed differently to the other wheels which are largely driving the load handling device on the grid structure. In both occasions, the controller is configured to adjust the shared calculated torque demand to any one of the wheels of the wheel assembly. Preferably, in response to the measured speed of any one of the wheels of the wheel assembly being substantially less than the kinematic state of the load handling device on the grid structure, the controller adjusts the shared calculated torque demand to the other wheels such that the kinematic state of the load handling device remains substantially unchanged, and/or redistributes the calculated torque demand to the each of the wheels of the wheel assembly. Alternatively, in response to the measured speed of any one of the wheels of the wheel assembly being substantially greater than the kinematic state of the load handling device on the grid structure, the controller removes the shared calculated torque from the any one of the wheels of the wheel assembly until the speed of the wheel is substantially equal to the kinematic state of the load handling device on the grid structure. In this instance, if any one of the wheels are slipping, the torque is removed from said wheel until the speed of the wheel catches up with the kinematic state of the load handling device on the grid structure. The function "remove" can encompass stopping or switching off the control signal being sent to the slipping wheel.

As an alternative to the torque demand being a drive torque for driving the load handling device on the grid structure, the torque demand can be a braking or resistive torque to any one of the wheels of the wheel assembly, e.g. during deceleration of the load handling device on the grid structure. Thus instead of driving rotation of the wheels, the torque demand can offer a resistive or braking torque, i.e. the controller translates the predetermined motion control profile into controlling signals that instructs the load handling device to decelerate on the grid structure in accordance with the predetermined motion control profile.

The wheel assembly of the present invention is arranged such that the wheel assembly comprises a first set of wheels arranged to move the load handling device in a first direction on the grid structure and a second set of wheels arranged to move the load handling device in a second direction on the grid structure, the first set of wheels being transverse to the second set of wheels. The first set of wheels comprises a pair of wheels at the front and back of the body of the load handling device. The second set of wheels comprises a pair of wheels at either side of the body of the load handling device.

Each of the sets of wheels are driven to enable movement of the vehicle in X and Y directions respectively along the rails. One or both sets of wheels can be moved vertically to lift each set of wheels clear of the respective rails, thereby allowing the vehicle to move in the desired direction on the grid.

Preferably, the position detection means comprises a first position detection means and a second position detection means, the first position detection means being configured for detecting the position of the load handling device in a first direction on the grid structure, and the second position detection means being configured for detecting the position of the load handling device in a second direction on the grid structure, the first direction being transverse to the second direction.

Preferably, the position detection means comprises an encoder coupled to a position wheel rotatably mounted to an arm such that rotation of the position wheel is detected by the encoder, said arm being downwardly biased so as to enable the position wheel to be biased into engagement with the grid structure. The position detection means is also known as a "fifth wheel", for the mere fact that is an additional wheel amongst the first or second set of wheels.

The position wheel is biased against the grid structure or track such that movement of the load handling device on the grid structure rotates the position wheel. An encoder coupled to the position wheel measures the rotational speed of the position wheel, which provides an indication of the kinematic state of the load handling device on the grid structure.

The present invention provides a storage system comprising:

a first set of tracks and a second set of tracks running transversely to the first set of tracks in a substantially horizontal plane to form a grid pattern comprising a plurality of grid spaces or grid cells;

a plurality of stacks of containers located beneath the first set of tracks and second set of tracks, wherein each of the stack of containers occupies a single grid space or grid cell;

a load handling device according to the present invention arranged to traverse along the first set and the second set of tracks over the plurality of grid spaces or grid cells such that, when positioned above a stack of containers occupying a grid space or grid cell, the lifting device is configured to lift at least one container from said stack of containers.

BRIEF DESCRIPTION OF THE DRAWINGS

Further features and aspects of the present invention will be apparent from the following detailed description of an illustrative embodiment made with reference to the drawings, in which.

DETAILED DESCRIPTION

Figure 1:
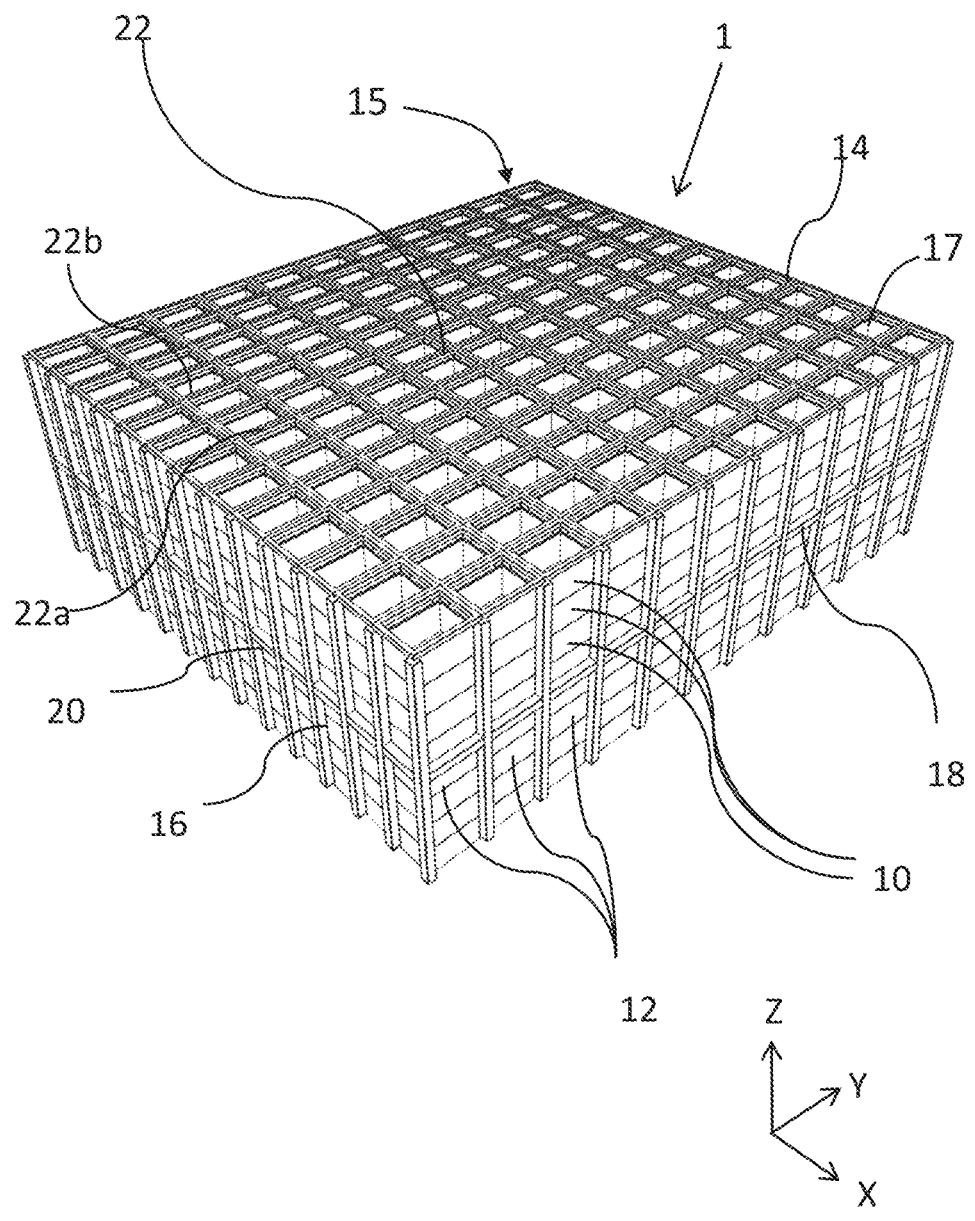
FIG. 1 is a schematic diagram of a grid framework structure according to a known system.
Figure 2:
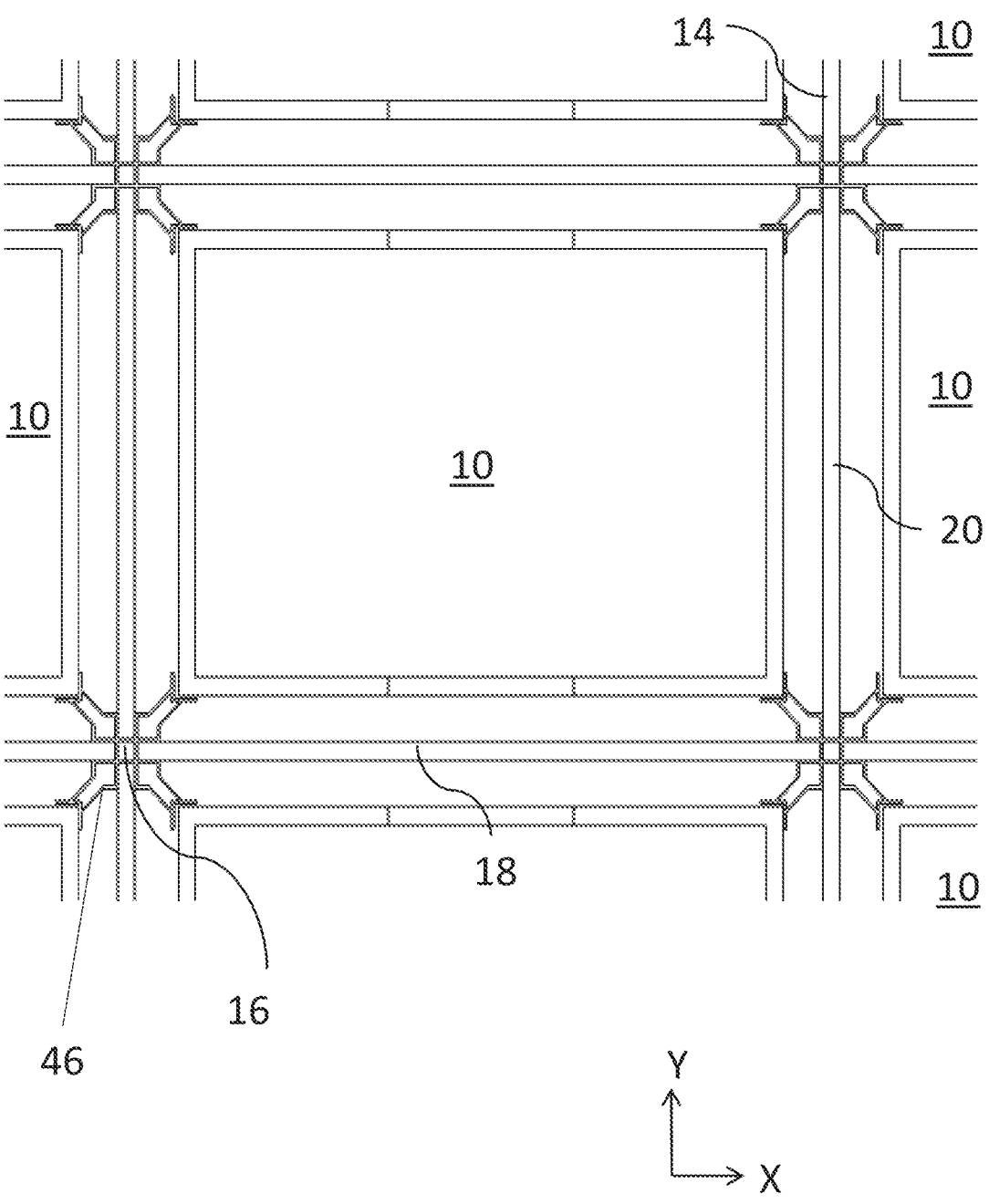
FIG. 2 is a schematic diagram of a top down view showing a stack of bins arranged within the framework structure of FIG. 1.
Figure 3:
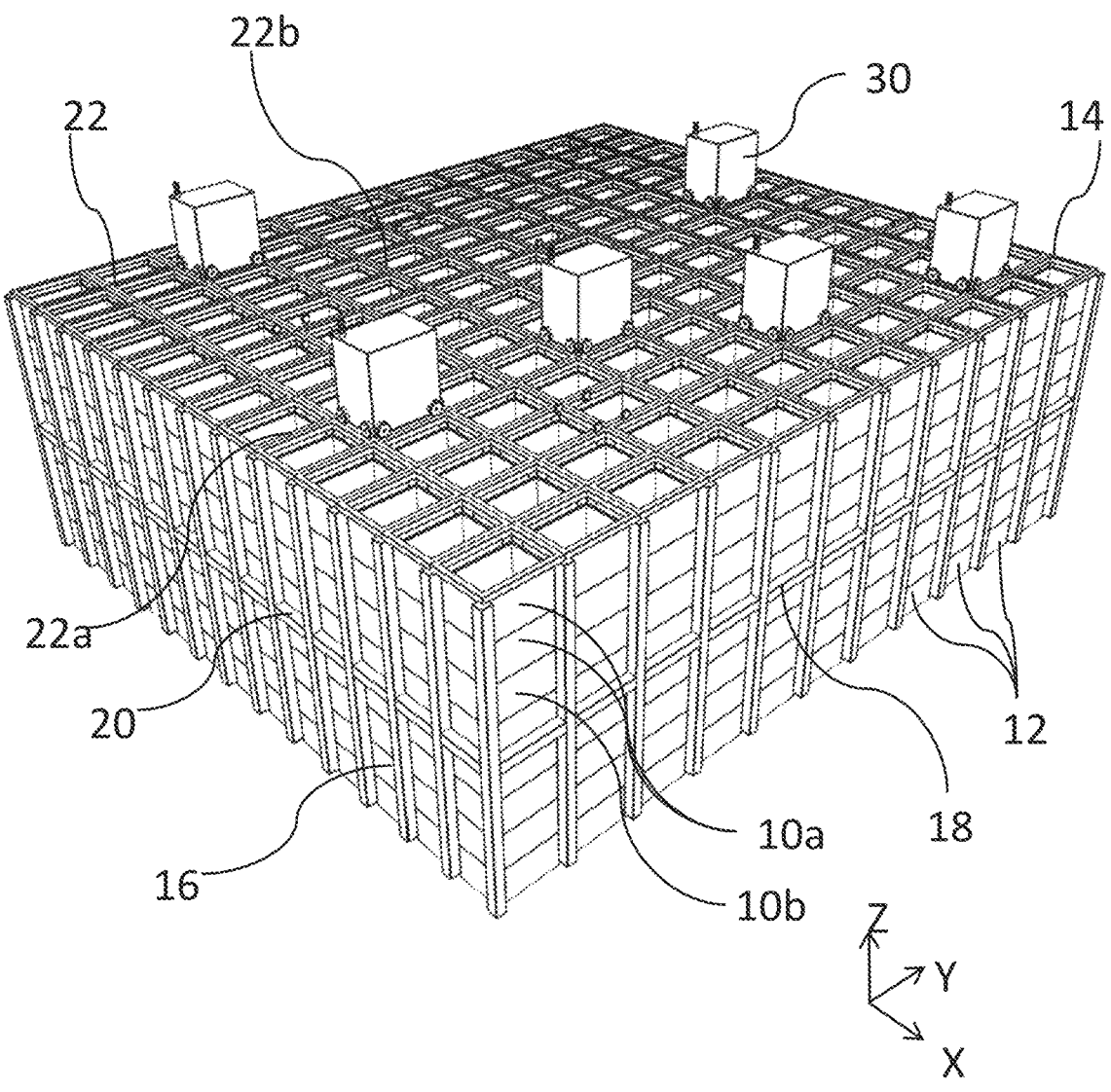
FIG. 3 is a schematic diagram of a known storage system showing a load handling device operative on the grid framework structure.

It is against the known features of the storage system such as the grid framework structure and the load handling device described above with reference to FIGS. 1 to 5, that the present invention has been devised. The present invention is defined by the method and system for controlling the movement of a load handling device or "bot" on the grid structure.

The load handling device 130 comprises a vehicle body 132 equipped with a lifting mechanism (not shown) comprising a winch or a crane mechanism to lift a storage container or bin, also known as a tote, from below. The crane mechanism comprises a winch cable wound on a spool or reel and a grabber device. The grabber device is configured to grip the top of the container to lift it from a stack of containers in a storage system of the type shown in FIGS. 4 and 5.

The vehicle body 132 comprises an upper part and a lower part. The lower part comprises a wheel assembly comprising two sets of wheels 134, 136 that run on rails at the top of the grid framework structure of a storage system. For the purpose of explanation of the present invention, the two sets of wheels are defined as a first set of wheels 134 and a second set of wheels 136. The first 134 and second 136 sets of wheels are arranged around the periphery of the load handling device 130. Each of the first 134 and second 136 sets of wheels are arranged on opposing sides in the lower part of the vehicle body 132 and comprise a pair of wheels on opposing sides of the vehicle body, i.e. each of the first and second sets of wheels comprises four wheels in total. In the particular embodiment of the present invention shown in FIG. 6, each of the first 134 and second 136 sets of wheels are rotatably mounted to a vehicle frame in the lower part of the vehicle body 132 so as to enable movement of the load handling device in X and Y directions respectively along the tracks or rails. Whilst the particular embodiment of the present invention shows pairs of wheels mounted to opposing sides of the vehicle body, the present invention is not restricted to the load handling device being mounted on pairs of wheels either side of the vehicle body. Instead of a pair of wheels mounted to opposing sides of the vehicles, stability of the load handling device can be achieved by at least one wheel on opposing sides of the vehicle body and which are arranged diagonally opposite each other. Thus, the first and second set of wheels each comprises at least one wheel mounted to opposing sides of the vehicle body such that they are diagonally opposed to each other.

Figure 4:
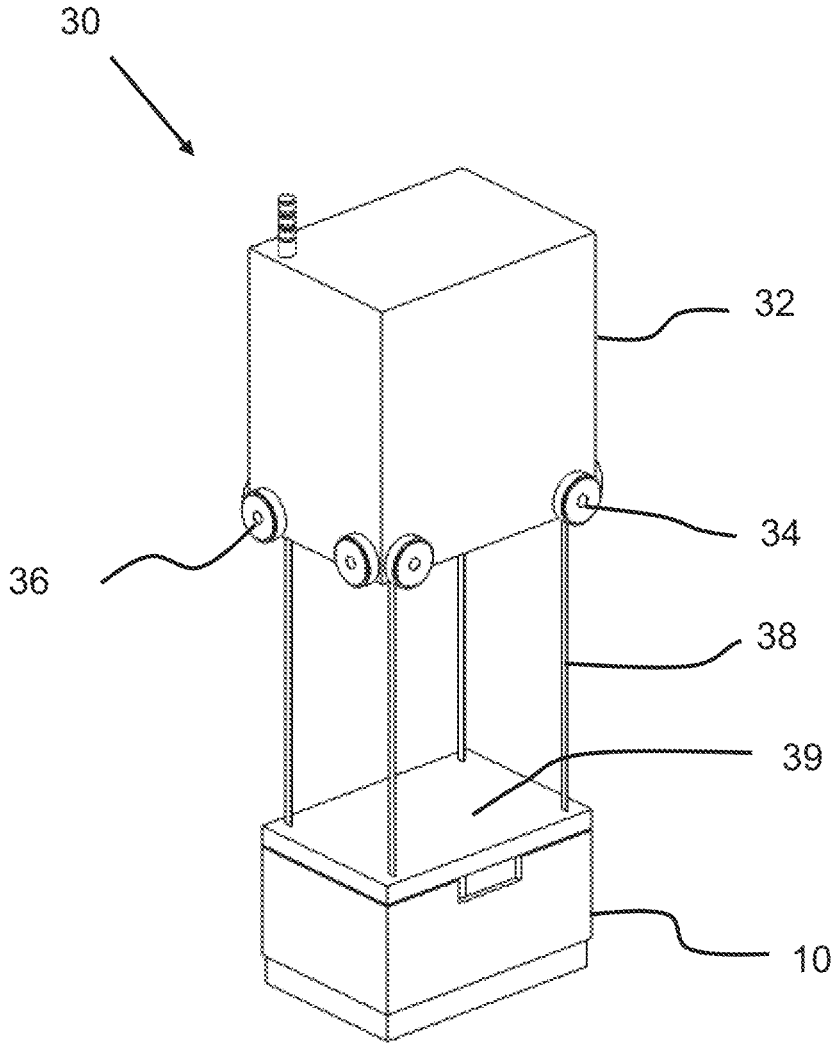
FIG. 4 is a schematic perspective view of the load handling device showing the lifting device gripping a container from above.
Figure 5:
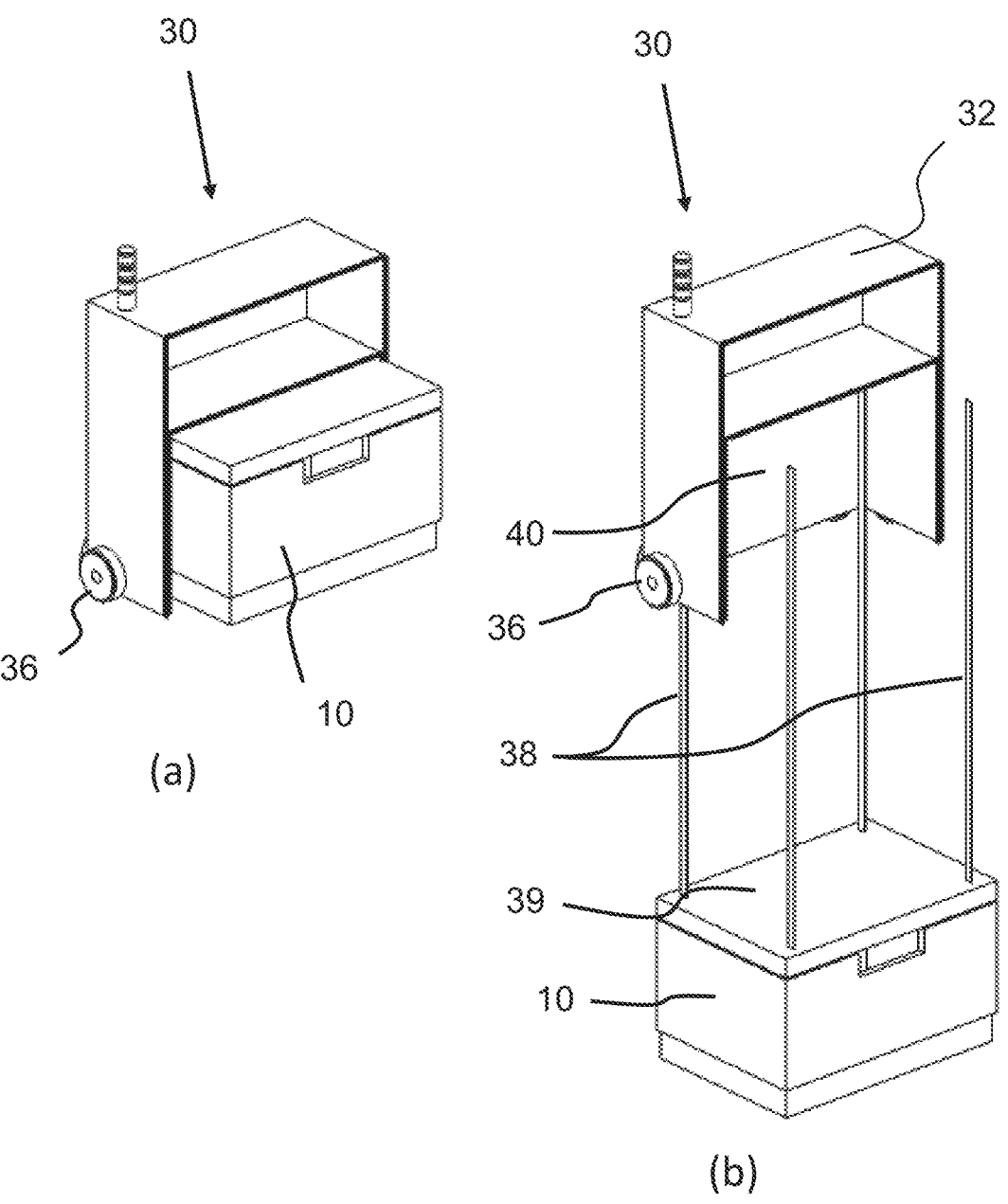
FIGS. 5(a) and 5(b) are schematic perspective cut away views of the load handling device of FIG. 4 showing (a) a container accommodated within the container receiving space of the load handling device, and (b) the container receiving space of the load handling device.

In the particular embodiment of the present invention, the first 134 and second 136 sets of wheels are arranged around the periphery of a cavity or recess, known as a container-receiving recess, in the lower part (see FIGS. 4 and 5). The recess is sized to accommodate a storage container or container 10 when it is lifted by the crane mechanism, as shown in FIG. 5 (a and b). Whilst the particular embodiment describes the container receiving space arranged within the vehicle body, e.g. as described in WO 2015/019055 (Ocado Innovation Limited), the vehicle body may comprise a cantilever as taught in WO2019/238702 (Autostore Technology AS) in which case the container receiving space is located below a cantilever of the load handing device. In this case, the grabber device is hoisted by a cantilever such that the grabber device is able to engage and lift a container from a stack into a container receiving space below the cantilever.

The upper part of the vehicle body 132 may house a majority of the bulky components of the load handling device. Typically, the upper part of the vehicle houses a driving mechanism for driving the lifting mechanism together with an on-board rechargeable power source for providing the power to the driving mechanism and the lifting mechanism. The rechargeable power source can be any appropriate battery, such as, but not limited to, lithium batteries or even a capacitor.

Figure 6:
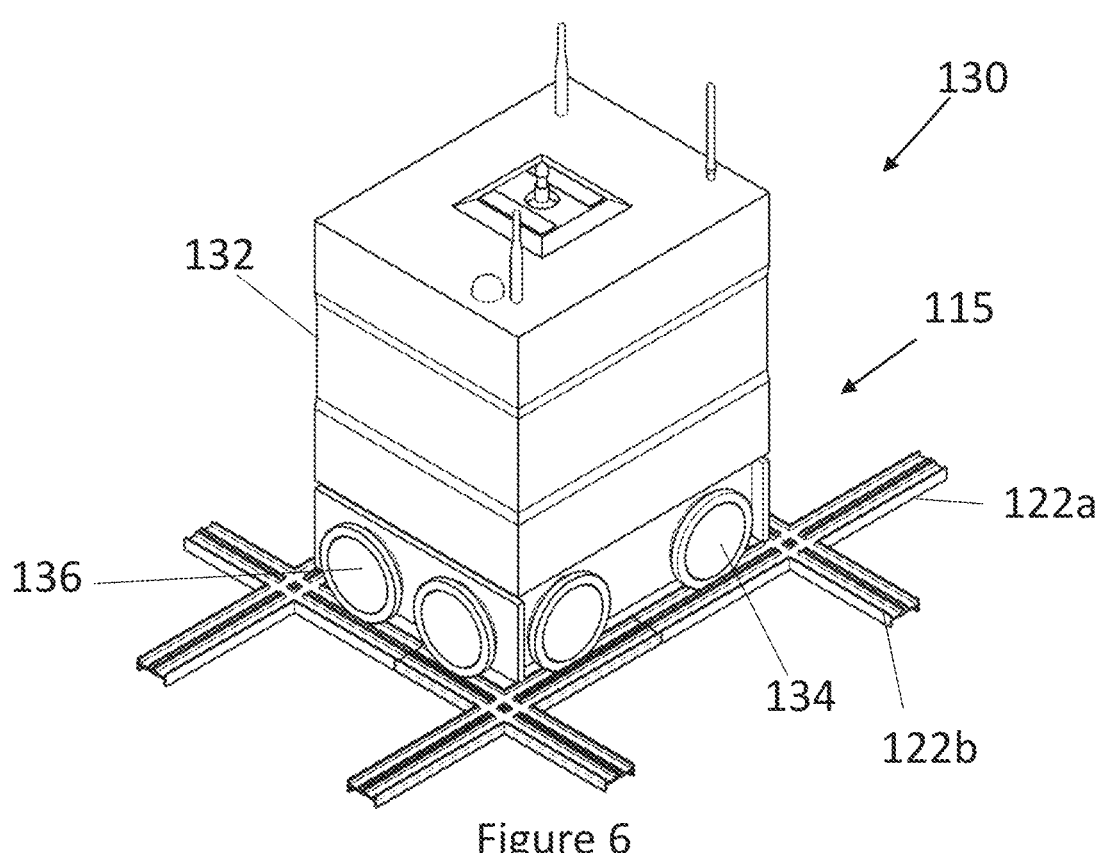
FIG. 6 is a schematic perspective view of a load handling device on a portion of the grid structure according to an embodiment of the present invention.

As shown in FIG. 6, the grid structure 115 comprises a first set of parallel grid members extending in a first direction and the second set of grid members extending in a second direction arranged in a grid pattern comprising a plurality of cells. For ease of explanation of the present invention, movement of the load handling device in the horizontal plane in the first direction represent movement in the X-direction and movement in the second direction represent movement in the Y direction on the grid structure. To permit one or more load handling devices to travel on the grid structure, the first set of grid members comprises a first set of tracks 122*a* and the second set of grid members comprises a second set of tracks 122*b*. Optionally, the first set of grid members comprises a first set of track supports (not shown) and the second set of grid members comprises a second set of track supports (not shown). Optionally, the first set of tracks 122*a* are snap fitted to the first set track supports and the second set of tracks 122*b* are snapped fitted to the second set of track supports. Equally plausible in the present invention is that the plurality of tracks 122*a*, 122*b* can be integrated into the first and second set of track supports such that the grid members of the grid structure comprises both the tracks and the track support.

Figure 7:
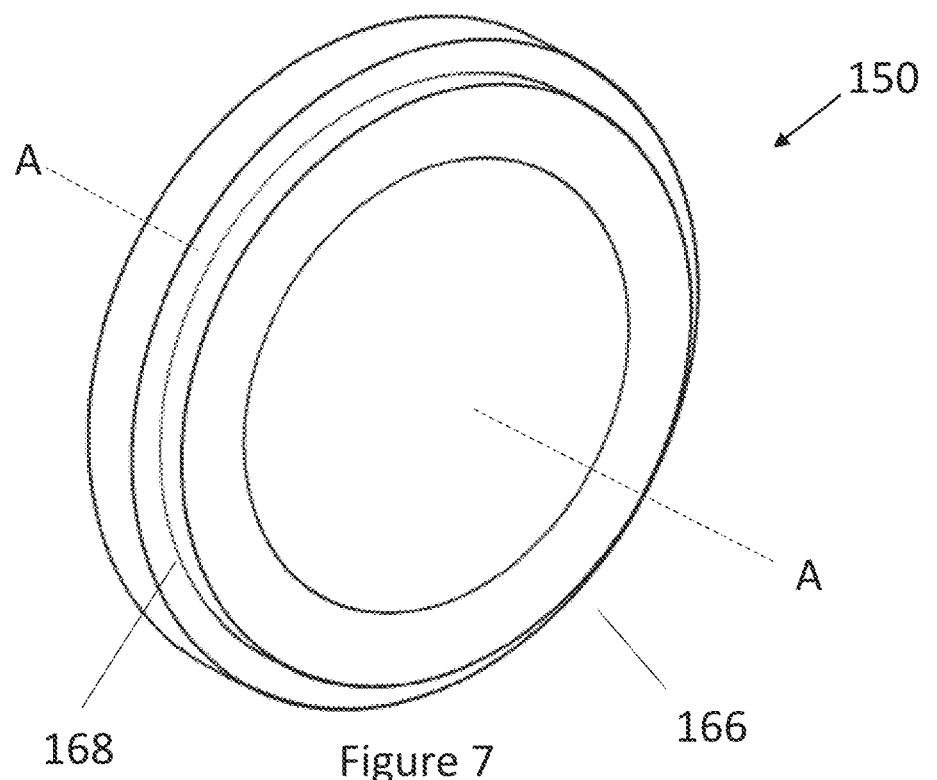
FIG. 7 is schematic perspective view of a wheel of the load handling device showing the central axis of rotation according to an embodiment of the present invention.
Figure 8:
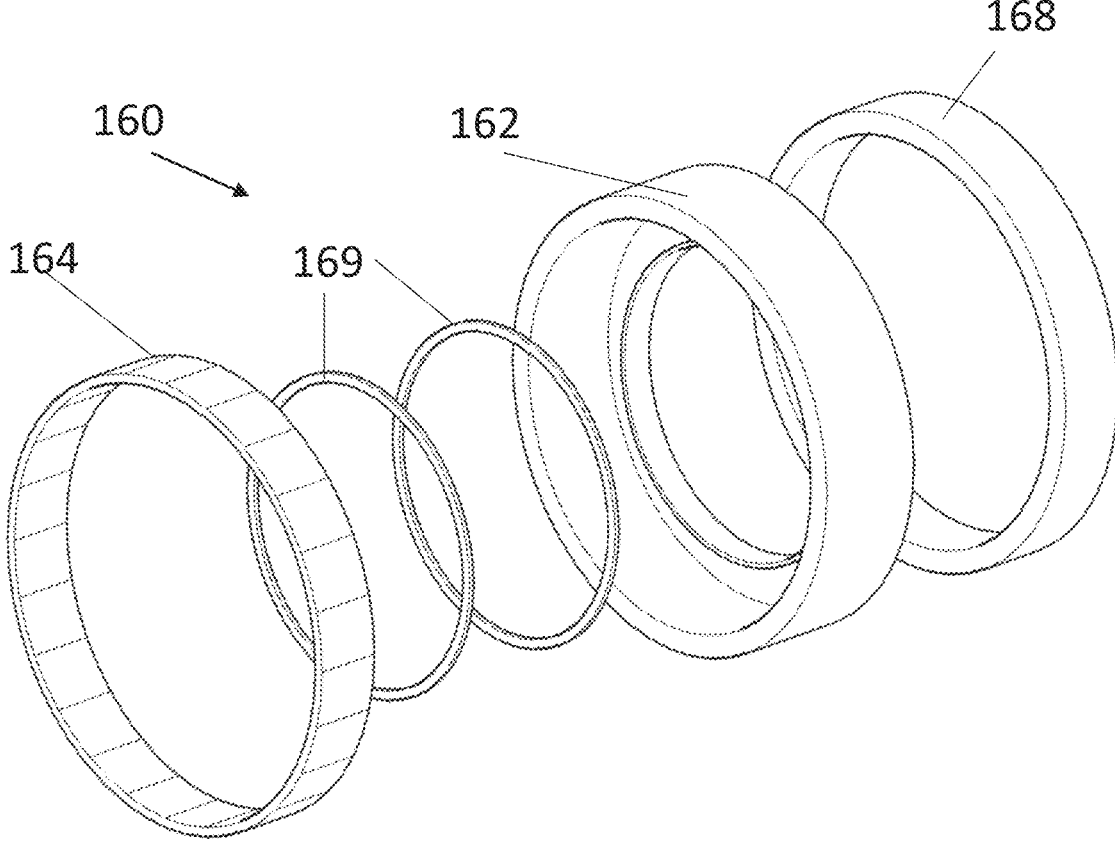
FIG. 8 is an exploded view of the hub motor used to the drive the wheel about the central axis of rotation according to an embodiment of the present invention.

To change direction on the grid structure, thereby allowing the vehicle or load handling device to move in orthogonal directions, each of the first 134 and second 136 sets of wheels are arranged to be moved vertically to lift clear of their respective tracks or rails. For example, to change direction on the grid structure 115 (e.g. to change from movement in the X-direction to movement in the Y-direction), the first set of wheels 134 are lifted clear of the first set of grid members or tracks 122*a* and the second sets of wheels 136 are engaged with the second set of grid members or tracks 122*b*. A driving mechanism (not shown) such as a motor drives either the first 134 or the second 136 set of wheels in the X direction or the Y direction on the grid structure 115. In the particular embodiment of the present invention, each wheel of the first 134 and second 136 sets of wheels in the lower part of the vehicle body 132 are individually driven by hub motors to provide four wheel drive capability of the load handling device 130 on the grid structure 115. In other words, all of the wheels in the first and second set of wheels are driven by individual hub motors. This is to allow the load handling device to be able to travel along the rails or tracks 122*a*, 122*b* on the grid structure 115 should anyone of the wheels in the set 134, 136 slip on the rail or track. FIG. 7 and FIG. 8 show perspective views of a wheel 150 of the load handling device 130 according to an embodiment of the present invention.

In detail, the hub motor 160 shown in FIGS. 7 and 8 comprises an outer rotor 162 comprising an outer surface that is arranged to engage with the grid structure (e.g. tracks) and an inner surface comprising ring shaped permanent magnets 164 that is arranged to rotate around a wheel hub or inner hub 166 comprising the stator of the hub motor 160. Typically, the stator comprises the coils of the hub motor. To drive each wheel 150 of the first or second set of wheels and thus, move the load handling device in the first direction or the second direction on the grid structure, the outer rotor 162 of the hub motor 160 is arranged to rotate about an axis of rotation A-A that corresponds to the central axis of a respective wheel. The outer surface of the rotor 162 can optionally comprise a tyre 168 for engaging with the tracks or rails. In the particular embodiment shown in FIG. 8, the outer rotor 162 rotates on bearings (not shown) about its rotational axis and comprises the outer rotor 162 on which the permanents magnets 164 are bonded to its inner surface. Each of the wheels 150 are coupled to the vehicle body of the load handling device by coupling the inner hub or hub 166 comprising the stator of the hub motor to the vehicle body so as to allow the outer rotor 162 to rotate relative to the wheel hub 166. Whilst the particular embodiment describes the drive mechanism of each of the wheels 150 of the first 134 and second 136 set of wheels to comprise a hub motor, other means to rotatably drive the wheels is applicable in the present invention. For example, pair of wheels at the front and back and either side of the load handling device can be driven by one or more motors connected to a suitable pulley or gear mechanism.

Figure 9:
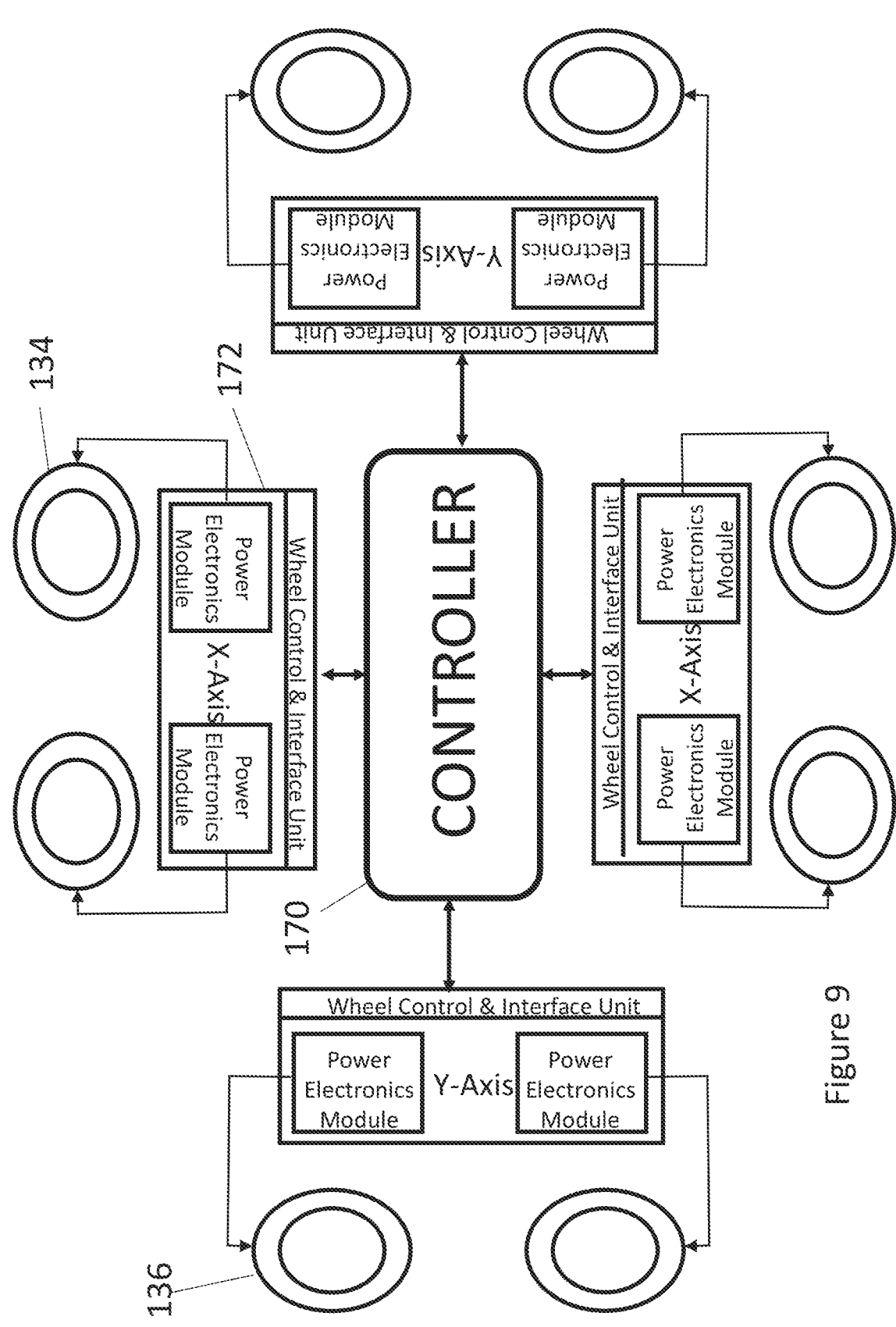
FIG. 9 is a wheel assembly control and interface architecture according to an embodiment of the present invention.

In the block diagram of the wheel assembly shown in FIG. 9, each of the pair of wheels of the first 134 and second 136 set of wheels are instructed to rotate about their respective axes of rotation by a control module or controller 170. The control module 170 can comprise a computer system comprising one or more processors and memory storing instructions that when executed by the one or more processors cause the one or more processors to instruct the first or second set of wheels to rotate about their respective axes of rotation in synchronization. The memory can be any storage device commonly known in the art and include but are not limited to a RAM, computer readable medium, magnetic storage medium, optical storage medium or other electronic storage medium which can be used to store data and accessed by the processor. The one or more processing devices can be any processing device known in the art. Typical examples include but are not limited to microprocessor. The driving mechanism and the wheel positioning of each of the wheels of the first 134 and second 136 set of wheels are communicatively coupled to the control module via any suitable communication interface unit 172. These include but are not limited to any wired or wireless communication known in the art.

The controller 170 sends control instructions to the drive mechanism which translates the control instructions into suitable driving current output signals to the wheel motors in accordance with the control instructions, facilitating the controlled movement of the load handling device on the tracks. The control signals can be provided directly to the wheel motors or to a motor drive that controls the speed and direction of the wheel motors by varying the power delivered to the wheel motors. When the controller 170 determines that the drive mechanism must move the load handling device from its current position to a new position or alter its velocity, the controller 170 generates a trajectory otherwise known as a motion control profile which is translated into suitable control signals to drive the load handling device via the drive mechanism from its current position or velocity to a target position or commanded stop positon. The motion control profile defines the kinematic state of the load handling device such as the velocity, acceleration and/or position over time as the load handling device moves from its current state to the commanded stop position. The current position could be from standstill or rest on the grid structure, in which case both the initial velocity and acceleration of the load handling device are substantially zero, or whilst it is in motion, in which case the load handling device has an initial velocity greater than zero. The commanded position can be a desired storage location or grid cell on the grid structure, e.g. when retrieving or depositing a storage container. Alternatively, the commanded position can also be a position or grid cell on the grid structure nearby one or more charging points, e.g. in the case where the load handling device is instructed to re-charge the rechargeable power source. Typically, the charging points are located around the periphery of the grid structure.

Once this motion control profile is generated, the controller translates the motion control profile into appropriate control signals for moving the load handling device through the trajectory defined by the motion control profile. The various segments (or stages) of the motion control profile are calculated based on one or more predetermined constraints corresponding to the mechanical limitations of the drive mechanism. The one or more predetermined constraints include but are not limited to maximum velocity, maximum acceleration, and maximum deceleration. For example, the load handling device according to an embodiment of the present invention is expected to travel at speeds up to 4 m/s and accelerate at 2 m/s$_2$. Given these constraints and the desired commanded position, the controller will calculate the motion control profile to carry out the desired move. The desired move may include a plurality of positions in the X and Y direction on the grid structure, which may be blended together or sequentially executed in order for the load handling device to reach a desired storage column. Each of the plurality of positions can comprise a single move in either the X direction or Y direction on the grid structure. For the purpose of the present invention, the terms "commanded velocity" and "velocity constraint" are used interchangeably to mean the same function. Likewise, the terms "commanded acceleration" and "acceleration constraint" are used interchangeably to mean the same function.

Figure 10:
FIG. 10 is a schematic view of the communication between the load handling device and the master controller over the network according to the embodiment of the invention.

The present invention relates to the generation of a constraint based, time optimal motion control profile for point-to-point movement of the load handling device on the grid structure. Point-to-point movement in the context of the present invention refers to movement from a start position to a commanded stop position. The final acceleration and velocity are taken to be zero at the moment the load handling device arrives at a programmed destination or a commanded stop position. In a particular embodiment of the present invention, inputs to the controller are received via a master controller 174. The controller may be coupled to the master controller 174 over a network 176 as shown in FIG. 10. The controller is shown in FIG. 10 incorporated into a load handling device 130. The network 176 can be any of the various types including a LAN (Local Area Network), WAN (Wide Area Network), the Internet or an Intranet, among others. One or more base stations (not shown) can transmit the input information to the controller. In the particular embodiment of the present invention, the inputs can include the one or more constraints and the commanded position or target position on the grid structure. The one or more constraints may be received independently from the commanded position. For example, the master controller 174 may communicate the commanded position and the one or more constraints separately to a motion control profile or trajectory generator stored within the controller of the load handling device 130.

The motion control profile is generated or calculated (e.g. automatically by the controller) based on the receipt of the one or more constraints and commanded position corresponding to the desired position on the grid structure, which could be a desired storage location on the grid structure or a charge location. In accordance with the present invention, the motion control profile or trajectory includes a collection of position, speed and acceleration and/or jerk signals. The trajectory is terminated (or reaches its end point) when the commanded position is attained and the remaining signals (speed, acceleration, jerk) are precisely zero.

The resultant motion control profile is a function of the type of profile the controller is configured to generate. These are the S-curve profile and its simpler cousin, the trapezoidal profile.

1.0 Trapezoidal and S-Curve Trajectory Profile

Figure 11:
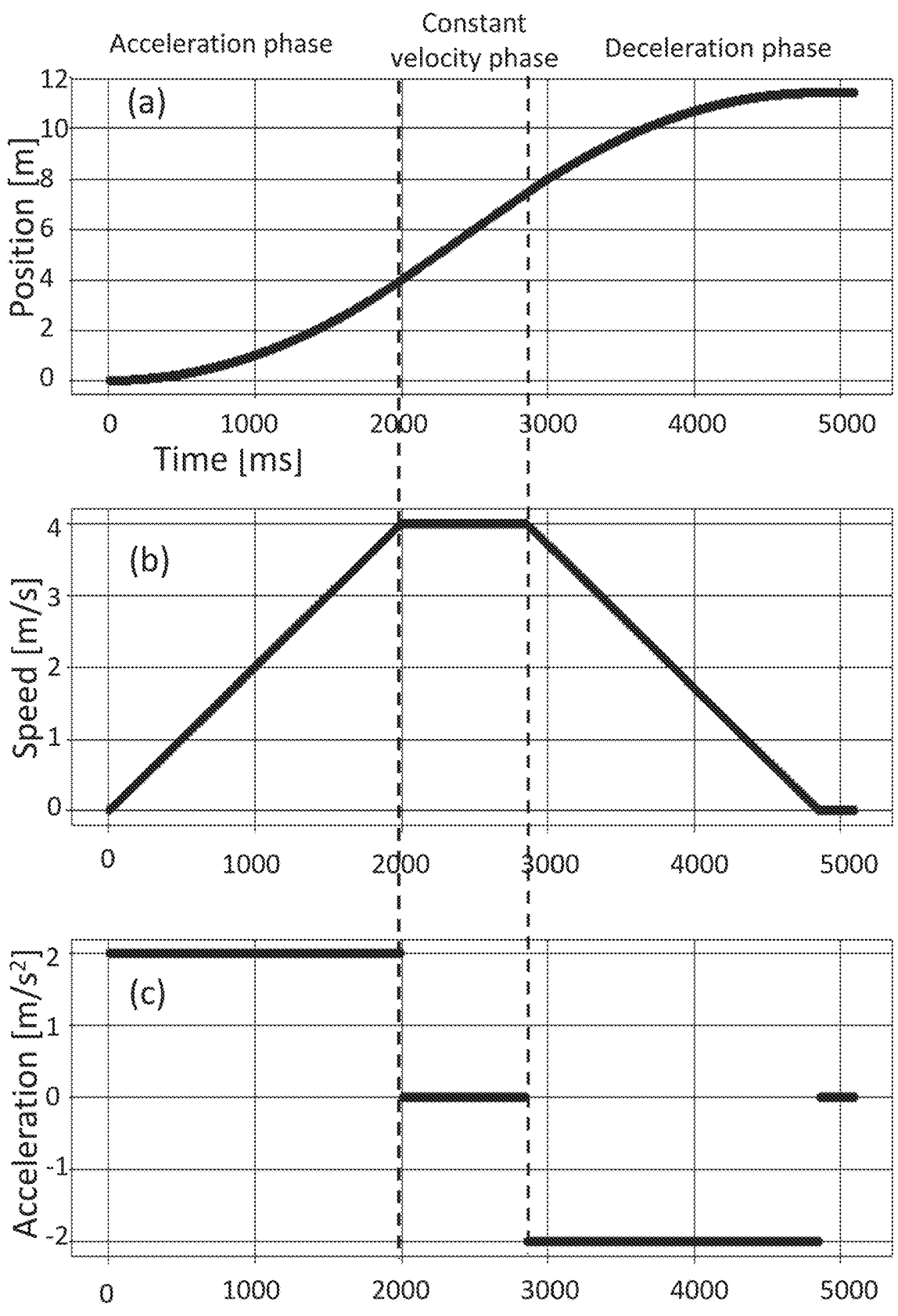
FIG. 11 (a to c) is schematic view of the trapezoidal trajectory profiles.

In the context of a point-to-point move, a trapezoidal profile typically consists of 3 distinct phases of motion in a triangular motion profile. The simplest form of the trapezoidal profile is shown in FIG. 11 (a to c), and consists of a period of constant acceleration to a maximum velocity followed by a period of constant deceleration back to zero velocity. The period of positive acceleration is termed the "acceleration phase" and the period of negative acceleration is termed the "deceleration phase". As shown in the acceleration segment in FIG. 11c, the acceleration and the deceleration increases and decreases almost instantaneously. In these locations, the rate of change in acceleration (da/dt) is undefined and considered to be equal to infinity. The rate of acceleration change with respect to time is given the name Jerk, j=da/dt and in high throughput applications the undefined jerk will cause impact loading, oscillation of the load handling device on the grid structure, and possibly audible noise. The generated motion control profile as a function of time includes a collection of (i) acceleration reference (FIG. 11c); (ii) velocity reference (FIG. 11b); and (iii) position reference (FIG. 11a). As a result, the trapezoidal trajectory shown in FIG. 11(a to c) consists of signals related to position, speed, and acceleration. The main inputs in the generation of the motion control profile based on the trapezoidal profile are (i) Commanded Position (position that should be attained at the end of the trajectory); (ii) Commanded Velocity (maximum velocity allowed) and (iii) Commanded Acceleration (maximum acceleration allowed). The commanded velocity and commanded acceleration represent the one or more constraints in the generation of the motion control profile based on the trapezoidal profile. Thus, the velocity reference in the trapezoidal profile is controlled by manipulating the acceleration reference.

Given the initial condition at time, t=0, the velocity v(t)=v$_0$ and position, p(t)=p$_0$, and keeping the manipulated variable, acceleration reference, a, constant (for time t≥t(0)) then for the trapezoidal trajectory profile, the velocity reference and the position reference as a function of time is given by the equations:

$$v(t) = +v_0 + at \qquad (1)$$

$$p(t) = p_o + v_o t + \frac{1}{2} a t^2 \qquad (2)$$

At any point in time, r, at which the value of the manipulated variable changes (acceleration), equations (1) and (2) can be applied again simply by making the trajectory point values at time τ the initial condition, e.g. v$_0$←v(τ), p$_0$←p(τ) and by resetting time to (t−τ). The trajectory point refers to the value of a point on the acceleration reference, velocity reference and position reference at a specific time— this could be a start point or an endpoint of a trajectory segment, as will be explained later.

The "manipulated variable" here means the variable whose value is set by the control system. For the trapezoidal profile, the manipulated variable is acceleration, so the value of acceleration is set by the control system. The other variables (position and speed) that are not the manipulated variable are calculated from the value of the manipulated variable according to the equations above.

Figure 12:
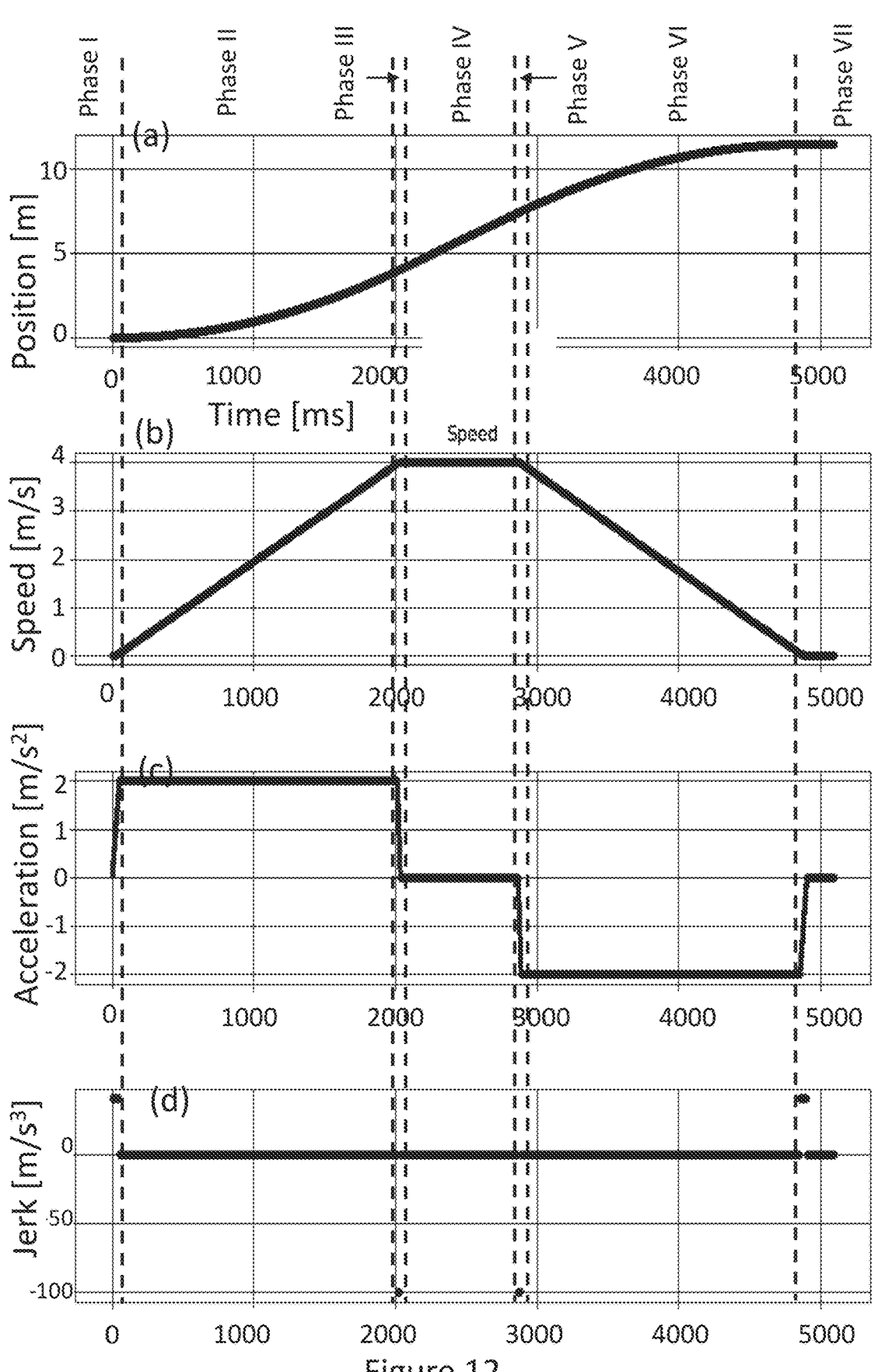
FIG. 12 (a to d) is schematic view of the S-curve trajectory profiles.

An S-curve acceleration profile as shown in FIG. 12 (a to d) is an alternative to the traditional trapezoidal profile and typically consists of seven distinct phases of motion. The acceleration profile can broadly be divided into three parts: an acceleration phase (Phases I, II, and III), a constant velocity phase (Phase IV), and a deceleration phase (Phases V, VI, and VII). The acceleration, constant velocity, and deceleration phase in the S-curve profile are equivalent to the acceleration, constant velocity, and deceleration phases in the trapezoidal profile as described above with reference to FIG. 11 (a to c), but since the application of jerk makes the profile more complex, subdivision of the acceleration and deceleration phases is needed to fully describe the trajectory. Phase I starts moving the load handling device from rest or the start position in the acceleration phase with a positive value of jerk until it reaches the maximum acceleration. In Phase II, the profile accelerates at its maximum acceleration rate until it must start decreasing as it approaches the maximum velocity. In the trajectory profile shown in FIG. 12c, the trajectory transitions to zero jerk during Phase II. In Phase III, the acceleration decreases until it reaches zero, i.e. the jerk transitions to a negative value of jerk until zero acceleration is reached at the desired velocity. In Phase IV, the constant velocity phase, the desired velocity is constant and the acceleration and jerk are both zero. Phases V, VI, and VII are the deceleration phase, during which the profile decelerates in a manner symmetric to Phases I, II and III. In the deceleration phase, the S-curve profile starts by applying a negative value of jerk in Phase V, zero jerk in Phase VI, and finally increases jerk to a positive value in Phase VII to decelerate the trajectory until zero velocity is reached.

In contrast to the generation of the motion control profile based on the trapezoidal profile, the main inputs in the generation of the motion control profile based on the S-curve profile are (i) Commanded Position (position that should be attained at the end of the trajectory); (ii) Commanded Velocity (maximum velocity allowed, $v_{max}$); (iii) Commanded Acceleration (maximum acceleration allowed, $a_{max}$); and (iv) Commanded Jerks. Thus, the one or more constraints in the generation of the motion control profile include commanded velocity, commanded acceleration and commanded jerks. The commanded acceleration can include a maximum positive acceleration in the acceleration phase and a maximum negative acceleration in the deceleration phase. Alternatively, different terminology can be used where the constraints relating to the acceleration can be broken down into a commanded acceleration and a commanded deceleration to differentiate the acceleration in the acceleration phase and the deceleration phase. For the purpose of explanation of the present invention, the terms commanded velocity and velocity constraint are used interchangeably to mean the same function and the terms commanded acceleration and acceleration constraint equally mean the same function. The generated motion control profile as a function of time includes a collection of (i) jerk reference; (ii) acceleration reference; (iii) velocity reference;

and (iv) position reference. As a result, the S-curve trajectory shown in FIG. 12 consists of signals related to position, speed, acceleration and jerk.

In contrast to the trapezoidal profile where the transition between constant velocity and acceleration are abrupt, the smoothing of the edges or "corners" of the velocity profile provided by the one or more commanded jerks in the S-curve motion profile reduces abrupt changes in acceleration and thereby smooths out the motion of the load handling device on the grid structure, i.e. the S-curve profile injects dramatically less vibrational energy into the connecting mechanisms and the load of the load handling device. This is particularly the case where the drive mechanism for driving the wheel assembly is a servo motor or a stepper motor. Compared to the trapezoidal profile, the S-curve profile provides a control mechanism for cancelling oscillations in the load handling device by adjusting the ratio of the profile's transition phases to the constant acceleration phases. In terms of the jerk, the higher the jerk the greater the amount of unwanted vibration energy will be generated and the broader the frequency spectrum of the vibration energy will be. This means that the more rapid the change in acceleration, the more powerful the vibrations will be. By reducing the jerk, the abrupt changes in acceleration in the region where the acceleration transitions to a constant acceleration at the edges or "corners" of the velocity profile is reduced. This will be apparent by the smoothing out the edges or "corners" of the velocity profile.

In comparison to the trapezoidal profile where acceleration is the manipulated variable, the position, velocity, and acceleration in the S-curve profile are all controlled by manipulating one or more jerk values. Referring to the transition time (or transition) as the time at which the manipulated variable changes its value, then there are at least four transitions at which the manipulated variable changes its value. Putting it simply, the manipulated variable remains constant between each pair of consecutive transitions. In the case of the trapezoidal trajectory the manipulated variable is acceleration, and in the case of the S-curve trajectory the manipulated variable is jerk. The value of the trajectory at the transition is referred to as the transition point. For the purpose of terminology in both the trapezoidal profile and the S-curve profile, a trajectory segment is a section of the profile where the manipulated variable (acceleration for the trapezoidal profile and jerk for the s-curve profile) remains constant. In other words, a trajectory segment starts and ends at a transition point. In the description of the trapezoidal and S-curve trajectories above with reference to FIGS. 11 and 12, the three phases of the trapezoidal trajectory and the seven phases of the S-curve trajectory could also be described as trajectory segments. For the purpose of explanation of the present invention, the trajectory segment has a start point given by the trajectory point $(p_0, v_0, a_0)$ and an endpoint $(p_E, v_E, a_E)$, where $p_0, v_0, a_0$ are the respective initial position reference, $a_0$, initial velocity reference, $v_0$, and initial acceleration reference, $a_0$, and where $p_E, v_E, a_E$ are the respective endpoint position reference, $p_E$, endpoint velocity reference, $v_E$ and endpoint acceleration reference, $a_E$. A motion control profile or trajectory is a collection or a sequence of such trajectory segments as a result of changes to the manipulated variable.

Given the initial condition at t=0 and a starting acceleration $a(t)=a_0$, a starting velocity $v(t)=v_0$, a starting position, $p(t)=p_0$, and keeping the manipulated variable, jerk, j, constant for t≥0, then for the S-curve trajectory profile, the relationship between the jerk reference, acceleration reference, velocity reference and the position reference as a function of time is given by the equations:

$$a(t) = a_0 + jt \tag{3}$$

$$v(t) = v_0 + a_0 t + \frac{1}{2} j t^2 \tag{4}$$

$$p(t) = p_0 + v_0 t + \frac{1}{2} a_0 t^2 + \frac{1}{6} j t^3 \tag{5}$$

As with the trapezoidal profile, at any point in time, $\tau$ at which the value of the manipulated variable changes, equations (3) to (5) can be applied again simply by making the value of the trajectory point at time T the initial condition, $a_0 \leftarrow a(\tau)$, $v_0 \leftarrow v(\tau)$, $p_0 \leftarrow p(\tau)$ and by resetting time to ($t \leftarrow \tau$).

The trajectory profiles in FIGS. 11 and 12 show that in the case of the trapezoidal trajectory, discontinuities occur in the second derivative of position, i.e. acceleration, and in the case of the S-curve trajectory, the discontinuities occur in the third derivative of position, i.e. jerk. The trapezoidal trajectory is often used instead of the S-Curve trajectory as it provides a good-enough approximation of the system's motion, and is more lightweight in terms of its mathematical (and thus, software implementation) complexity. However, the motion control profile generated according to the trapezoidal profile is not ideal in controlling the kinematics of the load handling device on the grid structure due to the stability of the load handling device. To effect the generation of the trajectory, for the trapezoidal trajectory the manipulated variable, acceleration, is allowed to change in a discontinuous fashion. In contrast to the trapezoidal profile, for the S-curve trajectory the manipulated variable, jerk, is allowed to change in a discontinuous fashion. The time at which the manipulated variable changes its value, otherwise known as the transition time, has an influence on the smoothness of the load handling device on the grid structure. As the change in acceleration has an influence on the smoothness of the ride of the load handling device on the grid structure, the transition time of the manipulated variable in the trapezoidal profile is too abrupt, resulting in oscillation of the load handling device on the grid structure, i.e. the acceleration changes in a discontinuous fashion. Having the manipulated variable, jerk, to be allowed to change in a discontinuous fashion in the S-curve profile allows the acceleration to change in a more continuous fashion allowing for a smoother ride.

In the particular embodiment of the present invention, generation of the motion control profile will be described with reference to the S-curve profile.

2.0 Components of the Trajectory Generator

Figure 13:
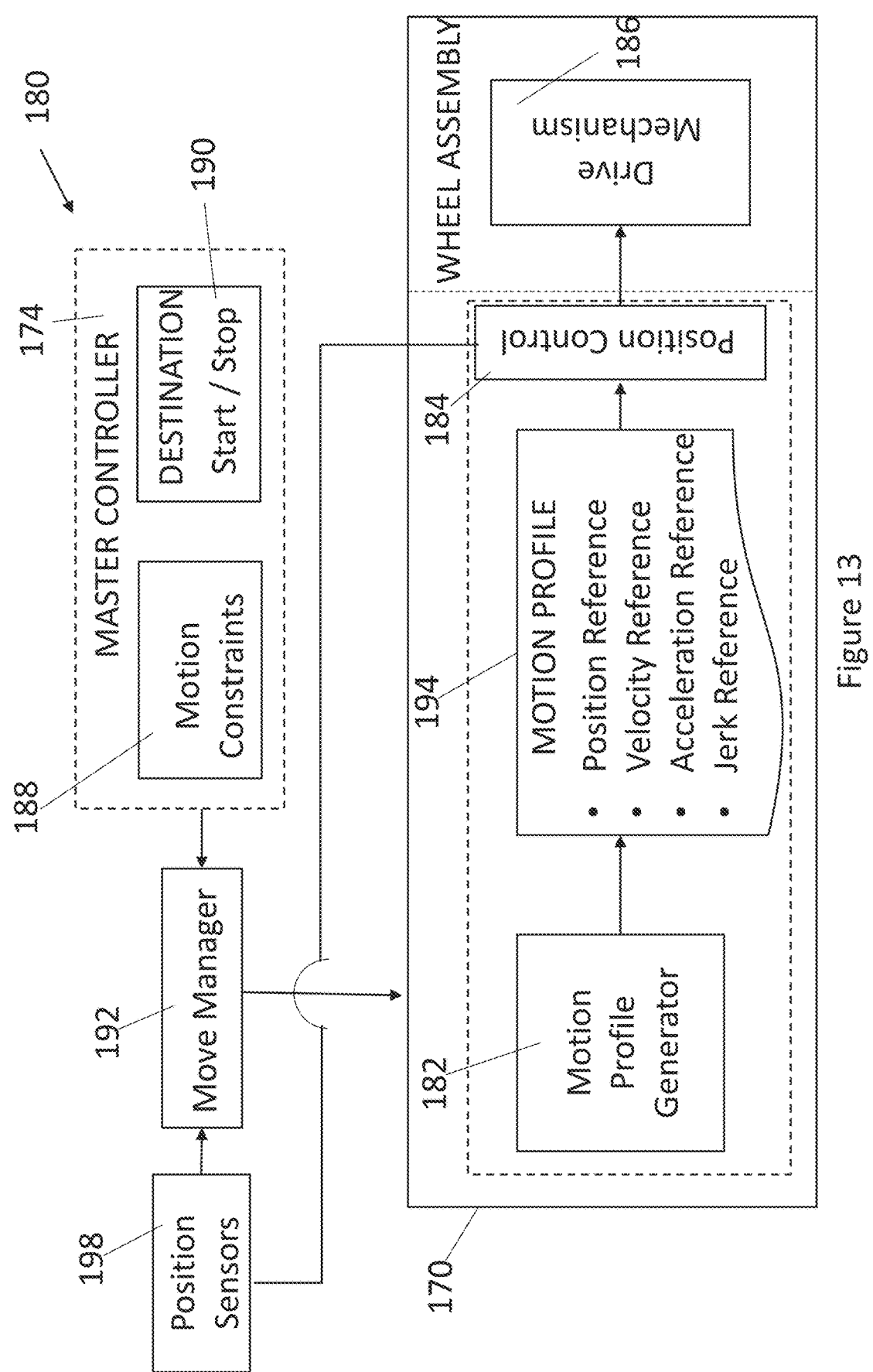
FIG. 13 is a block diagram of the motion control system comprising the trajectory or motion profile generator according to an embodiment of the present invention.

As discussed above, generation or calculation of the motion control profile used to control the drive mechanism of the wheel assembly of the load handling device on the grid structure is largely carried by the controller in the load handling device in response to receiving one or more constraints and a desired specification of the trajectory (commanded position) on the grid structure from a master controller. FIG. 13 is a block diagram of an exemplary non-limiting motion control profile generation system 180 capable of generating motion profiles for point-to-point movement of the load handling device on the grid structure. The motion control system comprises a motion profile generator or trajectory generator 182 for generating motion control signals and a position controller 184 that translates the motion control signals into appropriate torque signals for driving the drive mechanism 186 in accordance with one or more embodiments of the present invention. In this description, the terms "motion profile generator" and "trajectory generator" are used interchangeably.

The motion profile generator 182 can be, for example, a programmable logic controller (PLC) or other such controller that monitors and controls the drive mechanism of the load handling device. In this example, the motion profile generator can be a functional component of a controller's operating system and/or control software executed by one or more processors residing in the controller. The motion profile generator 182 can also be a hardware component residing within the controller, such as a circuit board or integrated circuit that exchanges data with other functional elements of the controller. Other suitable implementations of the motion control profile are also within the scope of the present invention. Although, the motion profile generator 182 is illustrated in FIG. 13 as being an integrated component of the controller or control system, the motion profile generator 182 may be a separate component from the controller. In such a configuration, the motion profile generator can exchange data with the controller or other components of the motion control generation system via any suitable communication means, including but not limited to wired or wireless networking, hardwired data links, or other suitable communication links. In the particular embodiment of the present invention, the controller and thus the motion profile generator resides in the load handling device.

The generated motion profile defines a trajectory or motion control profile for controlling motion of the load handling device from a current state (first position) or velocity to a commanded position (second position), where the motion control profile is defined in terms of one or more of a position reference, a velocity reference, an acceleration reference and a jerk reference as a function of time (in the case of a S-curve profile). When at the commanded position, the load handing device can be at a predetermined threshold distance from the commanded position. Preferably, the predetermined threshold is less than substantially 5 mm, more preferably less than 1 mm, more preferably less than 0.5 mm such that the magnitude of the endpoint acceleration reference and the endpoint velocity reference of the one or more trajectory segments are substantially zero at the commanded position. Preferably, the predetermined threshold is substantially zero, i.e. at the commanded position.

Figure 15:
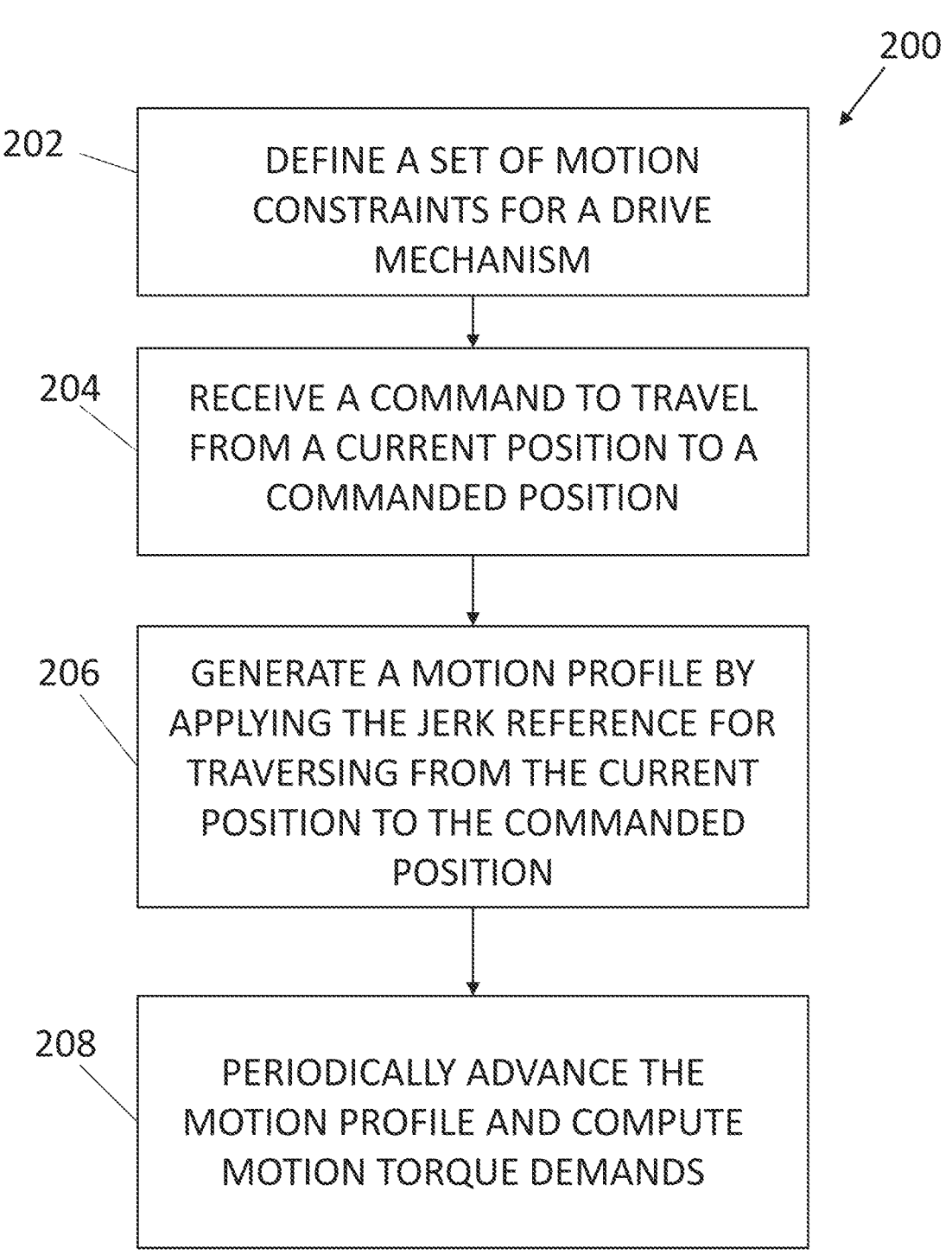
FIG. 15 is a flowchart of an example of the methodology for generating the trajectory profile according to an embodiment of the present invention.

FIG. 15 is a flow chart 200 showing the main stages in adapting motion constraints 188 for position based moves in a motion profile generator 182 and translating the motion control profile into control signals which are sent to the drive mechanism to effect transitioning of the load handling device. The operation begins by the trajectory generator receiving 204 instructions for the load handling device 130 to travel from its current position to a commanded position—in this case, a particular storage column or grid cell. The trajectory generator 182 generates 206 the trajectory or motion control profile given the defined constraints and the commanded position. In the particular embodiment of the present invention, the trajectory generator 182 periodically advances 208 along the motion profile to compute motion torque demands of the wheels to drive the load handling device 130.

Figure 16:
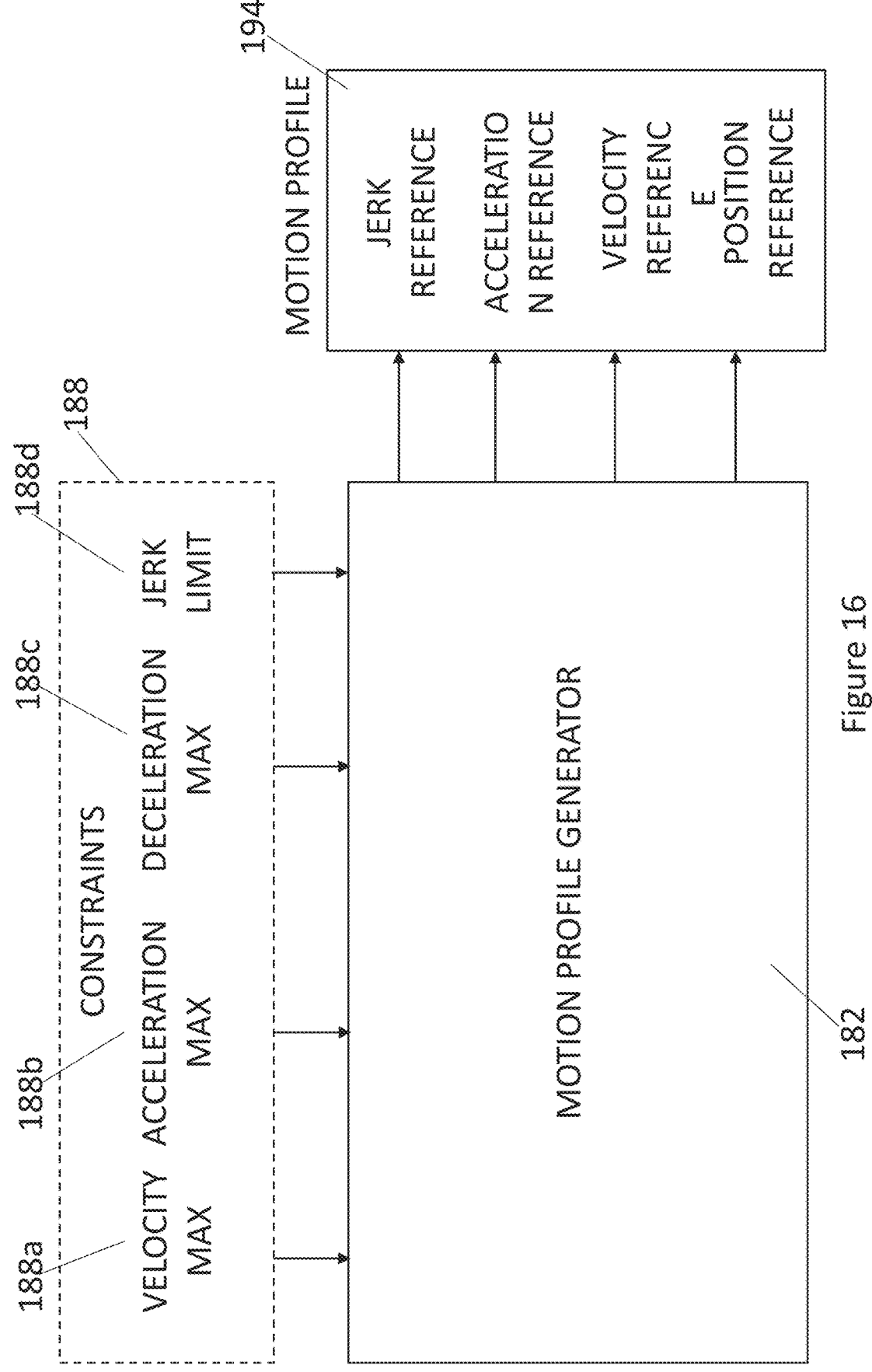
FIG. 16 is a block diagram showing the inputs and outputs of the exemplary motion profile generator according to an embodiment of the present invention.

Referring back to FIG. 13, in operation, the destination position 190 is provided by the master controller 174 to the motion profile generator 182 optionally via the move manager 192. The destination positon 190 comprises a command to travel from a current position or state of the load handling device on the grid structure to a commanded position. The current state of the load handling device can be the rest position of the load handling device on the grid structure or the current kinematic state (e.g. velocity) of the load handling device on the grid structure. From the current state of the load handling device on the grid structure, the motion profile generator 182 calculates a motion control profile as a function of one or more motion constraints, which can represent the mechanical constraints or motion constraints 188 of the drive mechanism 186 or user preference regarding operation of the drive mechanism. As shown in FIG. 16, the motion profile generator 182 receives inputs of a set of constraints 188. These constraints include the upper limits on the velocity 188*a*, acceleration 188*b*, deceleration 188*c* and jerk 188*d*. These constraints 188 may be set once during deployment of the motion profile generator, or may be reconfigured for each move of the load handling device on the grid structure. For example, the motion profile generator 182 can be updated upon receiving a new commanded position or upon receiving a different value for one of the other constraints. The motion profile generator allows the acceleration and deceleration limits to be configured individually to accommodate motion control profiles having asymmetric acceleration and deceleration. In response to receiving the commanded position, the motion profile generator calculates a constraint based, time optimal motion control profile 194 defining a trajectory for moving the load handling device from its current position to the commanded position.

As shown in FIG. 15, generation of the motion control profile involves applying the manipulated variable 206, which in the case of an S-curve profile is jerk, to increase and/or decrease the acceleration in a continuous manner in the acceleration phase and deceleration phase of the motion control profile. As shown in FIGS. 12 and 16, the motion control profile comprises one or more jerk references, an acceleration reference, a velocity reference and a position reference. The references are related to each other as mathematical derivatives as a function of time. The jerk reference is a derivative of acceleration, the acceleration is a derivative of velocity, and the velocity is a derivative of position. The motion profile generator periodically advances the motion control profile calculating one or more jerk reference, acceleration reference, velocity reference and position reference for each of the distinct trajectory segments of the motion control profile. Typically there are up to seven distinct stages of the S-curve motion profile, as discussed above with reference to FIG. 12. The motion control generator defines these references as functions of time for each of a set of defined motion profile stages of the motion control profile. The present invention is not limited to seven distinct stages of the S-curve motion profile and can be any number of stages from a minimum of four stages to greater than seven stages. For example, under the conditions of four stages, the constant velocity stage in Phase III can be absent and the load handling device does not reach the maximum velocity constraint. Equally, the number of stages can be greater than seven if there is at least one change during the trajectory as a result of changes to the one or more constraints or the commanded position. Further detail of the generation of the motion control profile according to an embodiment of the present is discussed below in the next section (Section 3.0). For the purpose of the present invention the function "motion control profile", "motion profile" and "trajectory" are used interchangeably to mean the same feature.

Figure 14:
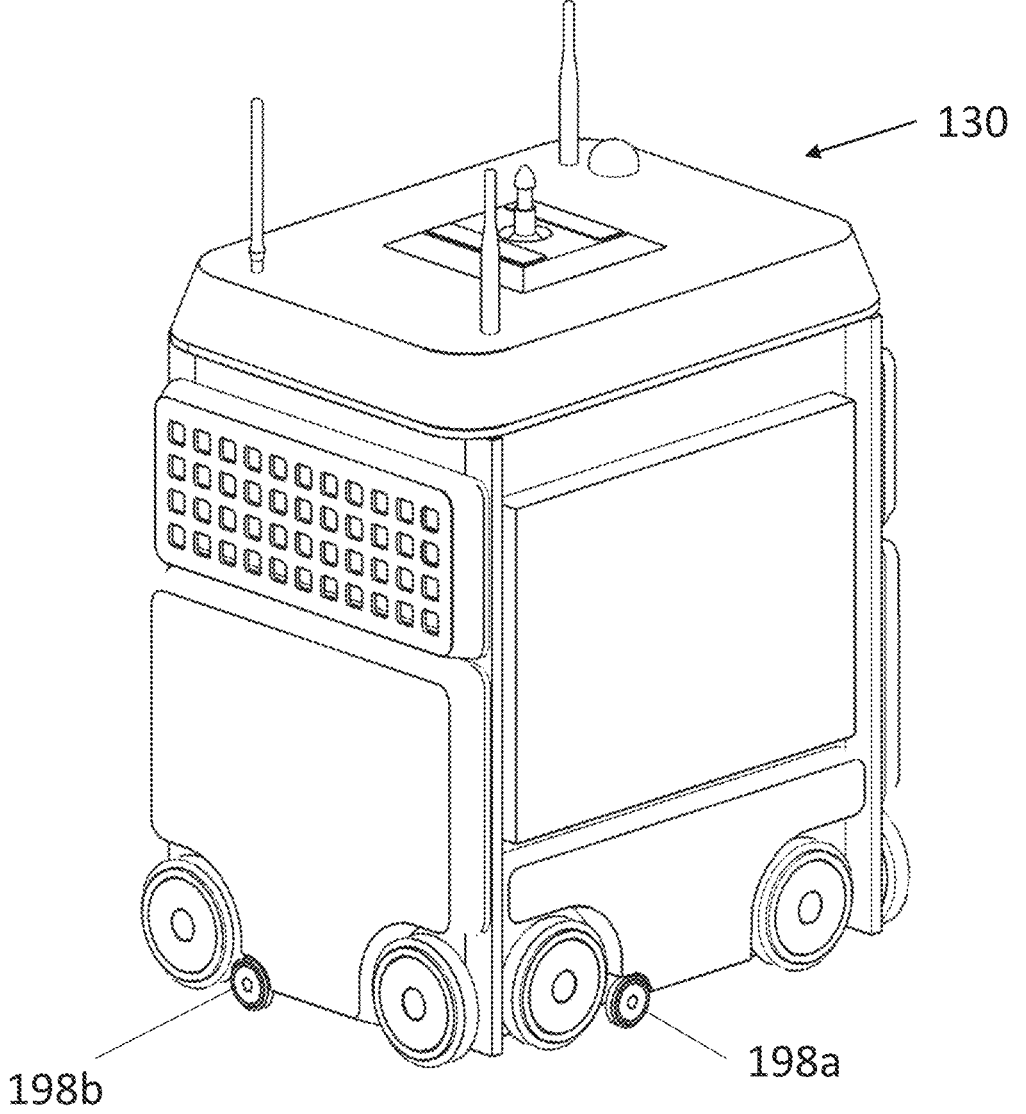
FIG. 14 is a perspective view of the robotic load handling device comprising the position sensor according to an embodiment of the present invention.

As shown in FIG. 14, the position of the load handling device relative to the grid structure is measured by one or more position sensors 198*a,b*. In the particular embodiment of the present invention, the position sensors 198*a,b* comprises a so called "fifth" wheel, in the sense that each of the first and second sets of wheels in this embodiment consists of four wheels, one pair on the front and one pair on the back of the load handling device, so the position sensor wheel is the "fifth" wheel. An additional "fifth" wheel is present amongst the first and second set of wheels for respectively monitoring the position of the load handling device in the first direction and in the second direction on the grid structure. As shown in FIG. 14, a first "fifth" wheel 198*a* is mounted adjacent to one of the first set of wheels and a second "fifth" wheel 198*b* is mounted adjacent to one of the second set of wheels. The first "fifth" wheel 198*a* corresponding to a first position sensor is configured to engage with the tracks when the load handling device is travelling in the first direction such that rotation of the first "fifth" wheel is an indication of the position and direction of travel of the load handling device with respect to time. Similarly, the second "fifth" wheel 198*b* corresponding to a second position sensor is configured to engage with the tracks when the load handling device is travelling in the second direction such that rotation of the second "fifth" wheel is an indication of the position and direction of travel of the load handling device in the second direction with respect to time. The first direction and second direction can respectively be the X and Y direction along the tracks. In the particular embodiment of the present invention, the one or more position sensors comprises an incremental encoder comprising a rotary electromechanical device that generates pulses when the "fifth" wheel rotates indicative of the position and direction of rotation which can be translated into displacement of the load handling device relative to the grid structure. The "fifth" wheel can be mounted on an arm and downwardly biased so as to engage with the tracks. In addition to the measurements from the one or more position sensors (e.g. "fifth" wheel), the desired commanded position on the grid structure defined in the master controller 174 is communicated to the move manager 192 where it is translated by the move manager 192 to the relevant positional units prior to being communicated to the motion profile generator to effect generation of the motion control profile. For example, the move manager 192 translates the commanded position from the master controller, expressed as a number of grid cells that the load handling device is instructed to move on the grid structure, into "position units" that the controller or motion profile generator understands and that which corresponds to the readings from the one or more position sensors 198 ("fifth" wheel). The controller or motion profile generator 182 is then able to correlate the requested commanded position from the master controller with either the position readings from the "fifth" wheel or the one or more position sensors or the position reference provided by the motion control profile. Further detail of the generation of the motion control profile or trajectory of the point-to-point move of the load handling device on the grid structure is discussed below.

Once the motion control profile is generated, the position controller 184 translates the data associated with motion control profile 194 into controlling signals that can be sent directly to the drive mechanism 186 to effect transitioning of the load handling device to the commanded position. As discussed above, the position controller 184 can form part of the controller or control system 170 of the load handling device in the sense that the controller or control system comprises a functional component related to the trajectory generator 182 and position control 184. FIG. 13 is a block diagram illustrating the inputs and outputs of an exemplary position controller according to an embodiment of the present invention. Motion control profile data generated by the trajectory generator are communicated to the position controller 184 where they are translated into the controlling signals to drive the wheels of the wheel assembly. In accordance with the motion control profile, the position controller 184 varies the power to the drive mechanism to vary the speed of the load handling device relative to the grid structure. As with the motion control generator, the position controller 184 can be a functional component residing with the controller or alternatively, a separate component to the motion profile generator having its own control system. For example, pairs of wheels of the wheel assembly can be connected to local controllers and are configured to translate motion control signals from the motion profile generator. Translation of the motion control signals include but are not limited to converting the motion control data into appropriate torque control signals for driving the drive mechanism or motors of the wheels.

As discussed above and shown in FIG. 16, the motion control profile defines the trajectory of a point-to-point move of the load handling device relative to the grid structure over time in terms of one or more of a position reference, a velocity reference, an acceleration reference and a jerk reference (in the case of a S-curve profile). These references represent functional calculations by the trajectory generator defining how respective motion attributes of the drive mechanism will be controlled as a function of time for a given point-to-point move. These references are mathematically related to one another as derivatives. Translation of the motion control profile into controlling signals that instruct the load handling device to perform the desired point-to-point move in accordance with the motion control profile involves the position controller generating a feed forward signal from the motion control profile, more specifically the acceleration reference derived from the motion control profile.

Figure 17:
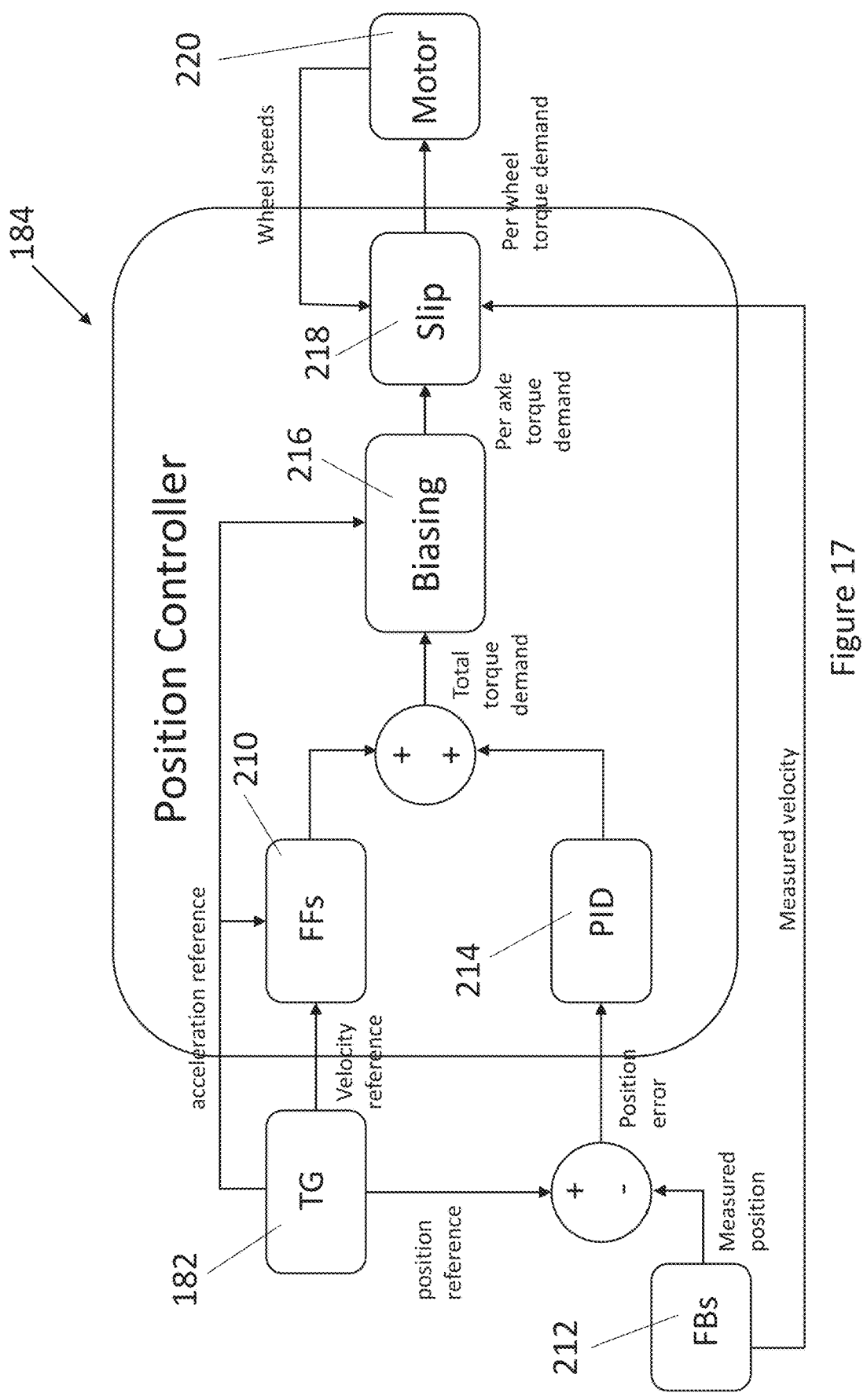
FIG. 17 is a block diagram showing the inputs and outputs of the exemplary position controller according to an embodiment of the present invention.

FIG. 17 is an exemplary position controller 184 showing the architecture of the position controller for translating the signals from the trajectory or motion profile generator to the drive mechanism of the load handling device. Knowing the mass of the load handling device, the feed forward signal 210 (denoted as FFs in FIG. 17) represents a calculated torque demand proportional to the acceleration reference derived from the motion control profile, more specifically derivatives of the velocity reference. The feed forward signal 210 can be translated into appropriate signals to drive the wheels of the wheel assembly. However, in order to ensure that the point-to-point move of the load handling device on the grid structure aligns with the trajectory segments of the motion control profile, the calculated feed forward signal 210 is compensated by a feedback signal 212 (denoted as FBs in FIG. 17) indicating the actual kinematic state of the load handling device relative to the grid structure. The kinematic state of the load handling device on the grid structure can include but is not limited to the position of the load handling device relative to the grid structure and the velocity of the load handling device. The velocity of the load handling device can be derived from a first derivative of the position measurements from the one or more position sensors 198 with respect to time.

Based on the feedback signal 212, the position controller 184 will adjust or compensate the controlling signal from the one or more position sensors 198 necessary to ensure that the load handling device moves in accordance with the motion control profile as closely as possible. In the particular embodiment of the present invention, feedback signals 212 from one or more position sensors are fed back to the position controller to reflect the true state of the load handling device relative to the grid structure. In response to receiving data signals from the one or more position sensors, the position controller can be instructed to re-generate one or more trajectory segments of the motion control profile by varying the manipulated variable, jerk, so as to ensure that the load handling device arrives at its commanded position without undershooting or overshooting, i.e. when the acceleration and velocity are zero at the commanded position.

In a particular embodiment of the present invention, the feedback signal 212 from the one or more position sensors is combined with the feedforward signal 210 to generate a total torque demand for the wheels or the drive mechanism driving the wheels. A comparison is made between the trajectory position derived from the motion control profile and the measured position from the one or more position sensors. The comparison represents a positional error, i.e. the difference between the trajectory position reference and the measured position as a function of time. The positional error is fed into a PID (proportional, integral and derivative) controller or a PI controller 214 which corrects the position based on PID or PI to the set point, which is represented by the motion control profile. The output from the PID or PI 214 is a correction torque, which, when applied, will correct the position error and bring the actual trajectory of the load handling device back in line with the motion control profile. The feedforward signal 210 represents the torque needed in order to meet the velocity/acceleration demanded by the trajectory generator. The correction torque from the PID or PI 214 is combined with the torque demand of the feedforward signal 210 to generate a total torque demand. As shown in the communication paths in FIG. 17, both the "acceleration feedforward" signal and the "velocity feedforward" signal are combined in the feedforward calculation and may be stored in a look-up table. In practice, the acceleration feedforward torque demand term and velocity feedforward torque demand term are summed together with a constant torque demand term, zero order torque demand, which is a fixed value (its sign being sign(trajectory velocity)). The magnitude of the acceleration feedforward torque demand term and the velocity feedforward torque demand term are determined from the acceleration and velocity respectively of the generated motion control profile or trajectory.

In one example, the total torque demand is calculated as follows:

$$\text{Total Torque Demand} = \text{Feedforward Torque Demand} + \text{Feedback Torque Demand}$$

where;

$$\text{Feedforward Torque Demand} = \text{Acceleration Feedforward Torque Demand} + \text{Velocity Feedforward Torque Demand} + \text{Zero-order Torque Demand Value.}$$

where:

$$\text{Acceleration Feedforward Torque Demand} = \text{Trajectory Acceleration} \times \text{Acceleration Feedforward Gain}$$

$$\text{Velocity Feedforward Torque Demand} = \text{Trajectory Velocity} \times \text{Velocity Feedforward Gain}$$

$$\text{Zero-order Feedforward Torque Demand} = \text{sign(Trajectory Velocity)} \times \text{Zero-order Torque Demand Value}$$

where the values of the following three have been empirically determined:

Acceleration Feedforward Gain is a value that depends on the estimated total mass of the load handling device inclusive of the container and its contents such that it has a higher gain value when the load handling device carries a heavier container.

Velocity Feedforward Gain also depends on the estimated total mass of the load handling device Zero-order Torque Demand Value is the value of total torque demand required to just keep the load handling device moving at a constant, near-zero velocity, i.e. it is a proportionality factor.

These three components—the acceleration feedforward torque demand term, the velocity feedforward torque demand term, and the zero order torque demand value—are summed together make up the feedforward torque demand and stored in a look-up table. When compensating the calculated feedforward torque demand with the feedback torque signal, the controller retrieves the feedforward torque demand from the look-up table to combine with the feedback torque measurement.

Alternatively, the values of the acceleration feedforward gain, the velocity feedforward gain, and the zero-order torque demand may be calculated rather than empirically determined.

The acceleration feedforward torque demand term is the component of the total torque demand that provides torque to enable the load handling device to match the demanded acceleration of the trajectory. The propulsive force required to meet the demanded acceleration can be calculated by multiplying the demanded acceleration by the total mass of the load handling device, including storage container and contents. This propulsive force can be converted into a torque demand by multiplying by the wheel radius (torque=force×radius). In examples where the total mass of the load handling device is known, the acceleration feedforward gain can be calculated rather than empirically determined:

$$\text{Acceleration Feedforward Gain} = \text{total mass of load handling device} \times \text{wheel radius.}$$

The velocity feedforward torque demand term and the zero-order torque demand term are the components of the total torque demand that provides torque to enable the load handling device to overcome drag forces. Various different models of calculating drag forces are known in the art, which may have a component proportional to velocity, a component proportional to velocity squared, and a constant component. Drag forces may be due to air resistance, rolling resistance of the wheels on the tracks, and/or gradient resistance if the tracks are not completely horizontal. In the current application it is likely that the velocity-squared term of the drag forces is not significant, and may be omitted in the interest of making the calculation of torque demand faster and less computationally intensive.

The propulsive force required to overcome rolling resistance can be calculated by multiplying the normal force (the total weight of the load handling device including storage container and contents) and a rolling resistance coefficient, which is a property of the wheels and the tracks. This propulsive force term can be converted into a torque demand by multiplying by the wheel radius (torque=force×radius). In examples where the total mass of the load handling device is known, and where the rolling resistance coefficient of the wheels on the tracks is known, the velocity feedforward gain can be calculated rather than empirically determined:

$$\text{Velocity Feedforward Gain} = \text{total mass of load handling device} \times \text{acceleration due to gravity} \times \text{rolling resistance coefficient} \times \text{wheel radius.}$$

In practice it may be easier to determine the velocity feedforward gain and the zero-order torque coefficient empirically rather than by calculation.

Determining the total mass of the load handling device can be difficult because the mass of any storage container and contents must be taken into account. Typically, the load handling devices are configured to receive instructions from a master controller to a retrieve a storage container from a particular a storage location within the grid framework structure. In some examples the master controller will use a database to store data about the location and contents of all of the storage containers in the grid framework structure, and will therefore already have information about the mass of each storage container. When the load handling device picks up a storage container form the grid framework structure, the master controller communicates the mass of the storage container to the controller on the load handling device, so that this mass can be used in the calculation of the total mass of the load handling device. Similarly, when a load handling device returns a storage container to the grid framework structure, the master controller will communicate to the controller on the load handling device that there is no storage container mass to account for. The master controller must keep track of the mass of each storage container and contents, and update this constantly (e.g. when items are picked from storage containers to fulfil customer orders). The mass of any storage container and contents carried by the load handling device can then be added to the mass of the load handling device itself to calculate the total mass.

Figure 36:
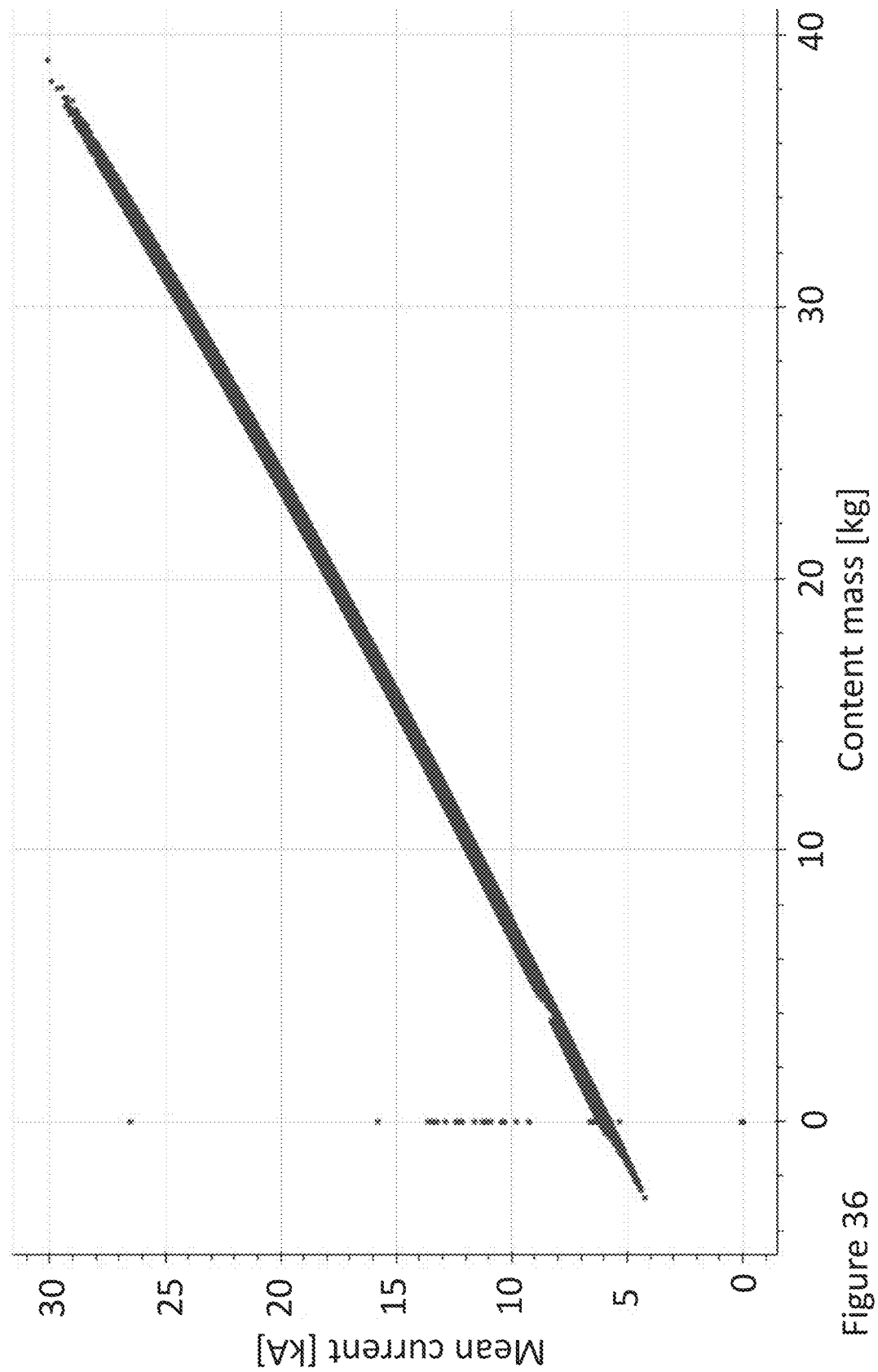
FIG. 36 is a plot showing how the mean current of the hoist motor varies with the mass of the contents of the storage container hoisted by the motor.

An alternative method to determine the mass of a storage container and its contents is to measure the current draw of the motor used to operate the lifting device and hoist the storage container into the container receiving space of the load handling device. The current draw varies approximately linearly with the mass of the storage container, so this provides a simple and convenient way to determine the mass, and has the advantage of not requiring the master control system to keep track of the mass of every single storage container and communicate this information to the controller on the load handling device. FIG. 36 is a graph plotting the measured mean current draw of the hoist motor plotted against the mass of the contents of the storage container. It can be seen that the data points fall on a straight line. The intercept represents the current required to lift an empty storage container (about 6 kA). Since the data points fall on a straight line, a linear fit can be used to capture the relationship between the current draw and the mass of the storage container, so a measured current can be used to estimate the mass of the container and its contents easily and accurately.

The calculation of torque demand described above is one example of how a torque demand can be calculated. The skilled person will appreciate that other methods of calculating or estimating or measuring accelerative forces and drag forces can also be applied to the current invention.

In some examples, the velocity, acceleration, and/or jerk constraints can be changed depending on the mass of the storage container and contents.

Since the acceleration feedforward torque demand is the product of the trajectory acceleration and the acceleration feedforward gain, and the acceleration feedforward gain is proportional to the total mass of load handling device (including any storage container and contents), a change in the total mass of the load handling device and its cargo will result in a change in the acceleration feedforward torque demand. Acceleration feedforward demand in some examples is the most significant component of the total torque demand. Since the wheel motors are rated to provide a given maximum torque, it is possible that a load handling device carrying a particularly heavy load would demand more torque from the wheel motors than the wheel motors can provide, so the load handling device would either not be able to maintain its commanded acceleration or the wheel motors would be at risk of overheating from operating above their rated torque. Or alternatively, if the wheel motors are rated higher in order to overcome this issue, the full torque capacity of the wheel motors will only be used occasionally, so the wheel motors are effectively overdesigned for the application and will therefore be heavier and more expensive than necessary.

To overcome this issue, in some examples the acceleration constraints can be made dependent on the total mass of the load handling device and its cargo. For example, if the value of the acceleration constraint were inversely proportional to the total mass of the load handling device and its cargo, the acceleration feedforward torque demand would be substantially constant, and substantially independent of the mass of any storage container and contents carried by the load handling device. This has the advantage that the torque rating of the wheel motors can be chosen to match the expected acceleration feedforward torque demand, and the torque demand will not vary substantially with mass.

Similarly, the velocity feedforward torque demand is the product of the trajectory velocity and the velocity feedforward gain, and the velocity feedforward gain is proportional to the total mass of load handling device (including any storage container and contents), a change in the total mass of the load handling device and its cargo will result in a change in the velocity feedforward torque demand. As with the acceleration constraint, if the velocity constraint were (for example) inversely proportional to the total mass of the load handling device and its cargo, the velocity feedforward torque demand would be substantially constant, and substantially independent of the mass of any storage container and contents carried by the load handling device. Making both the acceleration constraint and the velocity constraint dependent on (for example, inversely proportional to) the total mass of the load handling device means none of the three terms of the feedforward torque demand equation are dependent on mass, so the torque demand is substantially constant with respect to the mass of the load handling device and its cargo.

In some examples, the value of the jerk constraints can be dependent on the total mass of the load handling device and any storage container and contents located in the container receiving space of the load handling device. For example, a load handling device carrying a heavy storage container may be more stable with a lower centre of gravity, so can tolerate a higher value of jerk without risk of the load handling device toppling over on the grid. The absolute value of the jerk constraint can be defined as a function of the total laden mass of the load handling device, either as a continuous function or as a set of discrete values.

In other examples, the value of jerk constraint can be dependent on the contents of the storage container. For example, a lower value of jerk can be used when the load handling device carries a storage container in its container receiving space containing delicate or breakable items. A higher value of jerk can be used when the load handling device carries a storage container in its container receiving space containing more robust items, or items that are less likely to roll around and hit the sides of the container.

One method that can be used to determine a value for the jerk constraint is to subject a load-handling device to a trapezoidal profile (theoretically infinite jerk), measure the time taken to achieve the commanded position, and measure the jerk of the actual motion of the load handling device. S-curve profiles can then be run with a range of jerk values around the measured jerk, and the effects evaluated on position error and total time taken to reach the commanded position relative to the trapezoidal profile.

Although specific examples have been described here of how the jerk constraints, acceleration constraints, and velocity constraints can be made to vary with respect to the mass of the load handling vehicle, it will be appreciated that the scope of the invention encompasses other variations, and other values or numbers of jerk constraints, acceleration constraints, and/or velocity constraints may be applied.

The total calculated torque demand is translated to appropriate controlling signals to drive the wheels. In the particular embodiment of the present invention, the total torque demand is shared amongst the first or the second set of wheels depending on whether the first set of wheels are engaged with the grid structure or tracks or the second set of wheels are engaged with the grid structure. In the particular embodiment of the present invention and as describe above, each wheel of the first and second set of wheels is driven individually by hub motors 220. The first set of wheels comprises a pair of wheels at the front of the body of the load handling device and a pair of wheels at the back of the body of the load handling device. Similar pairs of wheel are present for the second set of the wheels, i.e. a first and second pair of wheels either side of the body of the load handling device. In operation, the pairs of wheels are driven in synchronisation as if they are driven on "virtual or imaginary" axles. For example, the front pair of wheels are driven in synchronisation as if they are driven on the same axle and the rear pair of wheel are driven in synchronisation as if they are driven on the same axle. The same principle applies to the second set of wheels even though they are driven by individual hub motors. Equally and applicable in the present invention is the case where all four wheels of the first set of wheels are driven in synchronisation. Likewise, all four wheels of the second set of wheels may be driven in synchronization. The advantage of driving the wheels of the wheel assembly individually by hub motors is that the torque to the wheels can be distributed differently to each of the wheels, which is particularly important during slippage of the wheels.

The torque derived from the motor control profile or the compensated total torque demand is distributed amongst the wheels of the wheel assembly by a biasing mechanism 216. The biasing mechanism 216 "splits" or divides the total torque demand between the front and rear "axles" to account for any weight transfer of the load handling device on the grid structure. For example, when the load handling device is accelerating on the grid structure, a greater proportion of the calculated total torque demand is transferred to the front "axle". Conversely, when the load handling device is decelerating on the grid structure, the total torque demand is transferred more to the rear "axle". Thus, the biasing mechanism varies the amount of torque demand to the first and rear "axle" to transfer the weight of the load handling device between the front portion and rear portion of the load handling device accordingly when accelerating or decelerating on the grid structure.

The biasing mechanism 216 applies a differential torque demand to the wheels, more specifically the motors driving the wheels in accordance with the trajectory acceleration reference of the motion control profile. The trajectory acceleration reference and/or the trajectory velocity reference of the motion control profile provides an indication or a reference point as to whether the load handling device is accelerating or decelerating on the grid structure. In other words, the differential torque applied to the wheels follows the trajectory acceleration reference of the motion control profile, i.e. there is a proportional relationship between the distribution of the torque to the wheels and the trajectory acceleration reference of the motion control profile. In response to the signals from the motion control profile generator indicating to accelerate, the biasing mechanism transfers more of the calculated total torque demand to the front axle and conversely, when instructed to decelerate, more of the total torque demand is shifted to the rear axle, or the total torque demand is reduced to providing a "braking" force. Equally, when cruising on the grid structure, the total torque demand is substantially equally split between the front and rear "axles".

As well as the differential torque applied to the front and rear "axles", the torque demand to the wheel motors can also be controlled either side of the body of the load handling device to control the yawing or turning of the load handling device on the grid structure. For example, depending on the direction of travel of the load handling device on the grid structure, the torque demand can be used to control the speed to the left or right set of wheels, and thereby control the yawing or turning angle of the load handling device on the grid structure. Ideally, the arrangement of the grid members extending in transverse or X-Y directions, the differential torque to the left and right wheels are controlled to prevent the load handling device yawing or turning on the tracks, i.e. travel in a substantially straight line.

In addition to translating the motion control profile to control signals for driving the drive mechanism, the biasing mechanism 216 can also be configured for controlling the slip of the wheels on the tracks as well as periodically compensating the motion control profile in response to receiving position signals from one or more position sensors mounted to the load handling device and/or one or more positional track sensors. The one or more position sensors can also be used to determine slip of any one of the first and second of wheels on the tracks. This is shown in FIG. 17 as a separate slip component 218 within the positional controller. Slip of the wheels occurs when the rotational speed of any of the wheels is greater than the kinematic state of the load handling device on the grid structure. The kinematic state of the load handling device on the grid structure can be determined or derived from a first derivative of the one or more position sensors as a function of time, e.g. the rotational speed of first or second "fifth" wheel depending whether the load handling device is travelling in the first direction or the second direction. The individual rotational speed of each wheel of the first and the second set of wheels is determined by one or more wheel encoders disposed adjacent each wheel. The one or more wheel encoders can be an incremental encoder comprising a rotary electromechanical device that generates pulses indicative of the rotational speed of the wheel. In the particular embodiment of the present invention, a slip control manager manages the slip of each of the wheels of the wheel assembly by individually comparing the rotational speed of the wheels to the kinematic state of the load handling device on the grid structure determined from the first "fifth" wheel or second "fifth" wheel depending on the direction of travel of the load handling device on the grid structure. In the particular embodiment of the present invention, the slip control manager resides within the position controller as shown in the schematic block diagram of the position controller in FIG. 17.

If the rotational speed of any one of the wheels is greater than the kinematic state of the load handling device on the grid structure, the slip control manager removes or reduces the torque to that wheel by controlling the biasing of the torque demand to that wheel until the rotational speed of the wheel catches up with the kinematic state of the load handling device. For example, the position controller via the biasing mechanism can alter the torque demand on the slipping wheel, i.e. reduce the torque demand, or even remove the torque demand entirely on the wheel so as to reduce the rotational speed of the slipping wheel, i.e. the rotation of the wheel becomes more passive. Alternatively, the slip control manager can redistribute the torque from the slipping wheel to the other wheels so as to balance the speed of the wheels of the wheel assembly to match the kinematic state of the load handling device on the grid structure.

It is to be understood that the architecture shown in FIG. 17 is only intended to be exemplary and other arrangements of the components of the positon control are within the scope of the present invention. For example, the position controller may be integrated into the controller for generating the motion control profile or trajectory or alternatively, they may be separate controllers.

3.0 Generation of the Trajectory

The generation of the trajectory or motion control profile involves controlling the number and duration of the trajectory segments such that when the trajectory segments are "stitched" together, the acceleration and the velocity is substantially zero at the commanded position. In accordance with the present invention, the generation of the trajectory segments relies on applying one or more jerk references dependent upon the identification of one or more circumstances in the trajectory or one or more conditions of the trajectory being met. These circumstances could be a change in one or more of the constraints and/or the commanded position. In generating the trajectory, the trajectory generator should be able to decide on what trajectory segments are required in order for the trajectory to reach its endpoint, starting from its current point. In identifying these circumstances, the generator must be able to carry out this decision making process (i.e. generate the trajectory) regardless of the current trajectory point, as its inputs (especially, but not specifically, the commanded position) may change at any time. For example, the Commanded Position is generally modified during pass of a grid cell based on feedback from the fifth wheel and/or grid sensors.

Whether the trajectory is terminated or still underway, in its simplest form the outcome of asking the generator to re-generate the trajectory (i.e. by modifying its inputs) involves generating one or more trajectory segments, each of which comprises:

the value of the manipulated variable to be applied from this point onward, the length of time to apply the manipulated value (i.e. the duration of the trajectory segment–transition time), and the segment's endpoint (as it is useful information to cache).

As a result, the trajectory segment that is already underway will be superseded by the re-generated trajectory segment, or otherwise will become the trajectory segment that is underway if the trajectory was terminated.

The value of the manipulated variable may take any value (within the rules discussed below), regardless of its value prior to the request to re-generate the trajectory. In the case of a finite jerk trajectory (S-curve trajectory), the number of trajectory segments is controlled by applying one or more jerk constraints to increase or decrease the magnitude of the acceleration during the different stages of the motion control profile. For ease of explanation of the present invention, jerk constraints are applied in the acceleration phase (positive acceleration) and the deceleration phase (negative acceleration). The acceleration phase corresponds to the trajectory where the trajectory velocity reference is increasing. Conversely, the deceleration phase corresponds to the trajectory where the trajectory velocity reference is decreasing. Thus, there are a set of jerk constraints to vary the acceleration in the acceleration phase and a set of jerk constraints in the deceleration phase. These are summarised as follows below:

Acceleration Phase

Jerk 1—increase the magnitude the acceleration when wanting to increase the velocity.

Jerk 2—decrease the magnitude of the acceleration when wanting to increase the velocity.

Deceleration Phase

Jerk 3—increase the magnitude of acceleration when wanting to decrease the velocity.

Jerk 4—decrease the magnitude of acceleration when wanting to decrease the velocity.

Jerk 1, Jerk 2, Jerk 3, and Jerk 4 may also be referred to as $J_1$, $J_2$, $J_3$, and $J_4$ respectively. In the particular embodiment of the present invention, four non-zero jerk constraints are used. Jerk 1 and Jerk 2 are used to respectively increase and decrease the acceleration in the acceleration phase and Jerk 3 and Jerk 4 are used to respectively increase and decrease the magnitude of the acceleration in the deceleration phases (deceleration). In the particular embodiment of the present invention, the motion control generator is configured to switch between jerk 1 and jerk 2 in one or more switching patterns to control the number and duration of the trajectory segments in the acceleration phase and switch between jerk 3 and jerk 4 in one or more switching patterns to control the number and duration of the trajectory segments in the motion control profile with the aim that the trajectory reaches the commanded position in the shortest possible time i.e. when the acceleration and the velocity reaches are substantially zero at the desired commanded position. A zero value of jerk constraint is used when wanting to maintain a desired acceleration in the acceleration phase or a desired deceleration in the deceleration phase.

In the particular embodiment of the present invention, the absolute values of Jerk constraints, 1, 2, and 4 are equal and the motion control generator is configured to switch signs, S, (+ or −) when wanting to increase the magnitude of the acceleration or decrease the magnitude in the acceleration phase. The positive sign, "+", is used when wanting to increase the magnitude of the acceleration and a negative sign "−" is used when wanting to decrease the magnitude of the acceleration. The absolute value of Jerk 1, 2, 3 and 4 chosen is dependent on the ability of the load handling device to tolerate the sudden change in the acceleration without tipping or toppling over on the grid structure which is dependent on the stability of the load handling device on the grid structure. For a very stable load handling device having a relatively low centre of gravity, the load handling device can tolerate a much higher jerk in comparison to a relatively less stable load handling device. In the case of a load handling device having a footprint of a single grid cell, an absolute value of the jerk is chosen such that the load handling device is able to accelerate at a rate to the maximum velocity defined by the constraint without tipping or toppling over. In the particular embodiment of the present invention, the absolute value of the jerk is 20 m/s³. Thus, Jerk 1 and 2 will have the values of +20 m/s³ and −20 m/s³ respectively. Similarly, Jerk 3 and Jerk 4 will have the values of +20 m/s³ and −20 m/s³ respectively. However, it is not necessary that the jerk 1, 2, 3, and 4 have the same values to control the number of trajectory segments. The jerk constraints can have different absolute values. Alternatively, the jerk constraint can be two values that are used to respectively increase or decrease the magnitude of the acceleration in both the acceleration phase and the deceleration phase.

As described earlier, in some examples, the value of the jerk constraints can be dependent on the total mass of the load handling device and any storage container and contents located in the container receiving space of the load handling device.

In the generation of the motion control profile, the value of the jerk can switch between any of the jerk constraints discussed above, regardless of its value prior to the request to re-generate the trajectory. For example, if the trajectory is in the acceleration phase (i.e. ramping speed up towards Commanded Velocity) and the Commanded Position is modified back to a Start Position then the generator must immediately generate a new trajectory segment(s) that looks to decelerate the trajectory (i.e. ramp speed down towards zero); the fact that the trajectory was in the acceleration phase has absolutely no bearing on the decision to generate a new trajectory segment to decelerate the trajectory.

Another example: if the trajectory velocity is already at the Commanded Velocity limit and the trajectory position is still far away from the Commanded Position, then if the (absolute value of) Commanded Velocity or constraint velocity is increased, with all other of the constraints of the trajectory generator inputs left unchanged then, in order to fulfil the "shortest possible time" requirement, the trajectory generator must begin increasing trajectory velocity, possibly all the way to the new Commanded Velocity value, depending on the new value of Commanded Position. The fact that the trajectory was in the constant velocity phase prior to the instruction to increase the velocity constraint or Commanded Velocity has no bearing on this decision.

Generating the trajectory involves establishing the status or condition of the trajectory in a given time, generating one or more trajectory segments depending on the circumstance of the trajectory at that time such that the trajectory is able reach a desired destination (which could be the commanded position) starting from its current point. A trajectory may comprise multiple trajectory segments, each trajectory segment having a respective trajectory segment endpoint which together represent a trajectory or motion control profile. For the purpose of the present invention, the term "endpoint" reflects the trajectory point at the end of a given trajectory segment.

The process of establishing the status of the trajectory in a given time is done by a decision making process through the process of elimination where a series of questions are posed or queried to the controller or control system, in a specific order, until one of the answers makes it clear what the next course of action should be taken to accommodate the new generator inputs values. In a first example above, the obvious course of action is to start ramping velocity down to zero by generating one or more trajectory segments because the longer it takes for this to happen, the further the trajectory will move away from its desired position. In a second example the obvious course of action is to increase the velocity because not doing so (i.e. staying at the same velocity) would make the trajectory take longer to reach its desired position.

In the process of generating the trajectory, the generator may produce multiple trajectory segments, in which case it uses the first one and can cache the others for subsequent use. Each of the multiple trajectory segments can represent one or more velocity transitions. Simply, generating a single trajectory segment to bring the trajectory from a start point $(p_0, v_0, a_0)$ to an endpoint $(p_e, v_e, a_e)$ by applying the trajectory equations using the jerk constraint may not be adequate as the trajectory may accelerating away from the commanded position and a trajectory is required to bring back the trajectory on course towards the commanded position and/or the trajectory may be accelerating too excessively to bring down the trajectory to the commanded position without overshooting. All of these conditions must be taken into account when transitioning to a desired final velocity value, $v_f$, and this may include generating multiple trajectory segments. The desired final velocity value, $v_f$, may be substantially zero in the sense that the trajectory is a point-to-point move to the commanded position and the control system is instructed to generate a trajectory for the point-to-point move such that the final velocity value at the commanded position is substantially zero. Whenever a new request arises to re-generate the trajectory (again, as a consequence of a change to the generator's inputs) the generator must purge all cached trajectory segments because they may be invalid under the new generator inputs; the act of re-generating the trajectory, by itself, will re-compute new trajectory segments.

Figure 18:
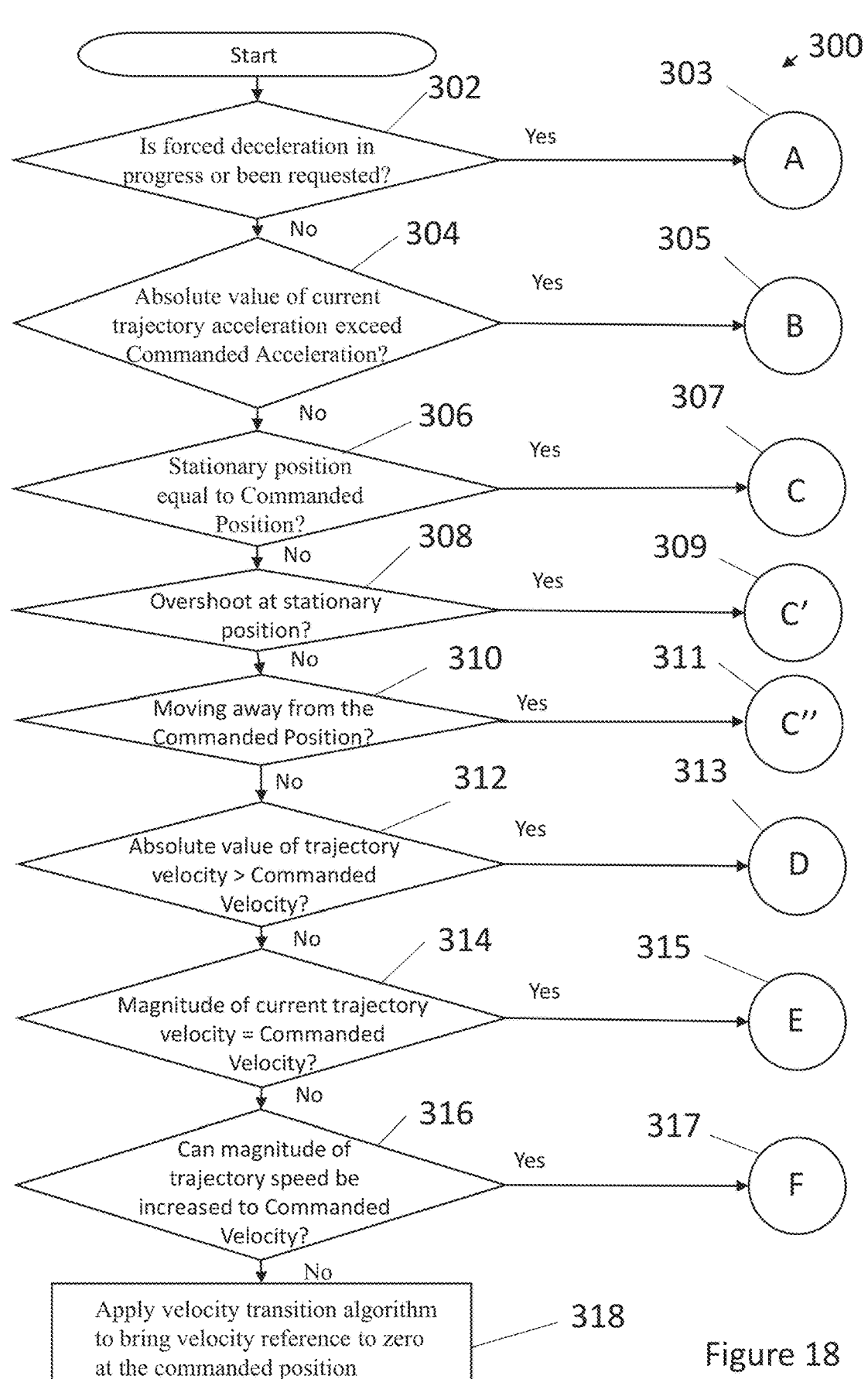
FIG. 18 is a flowchart of an example of the methodology for generating the trajectory profile according to an embodiment of the present invention.
Figure 19:
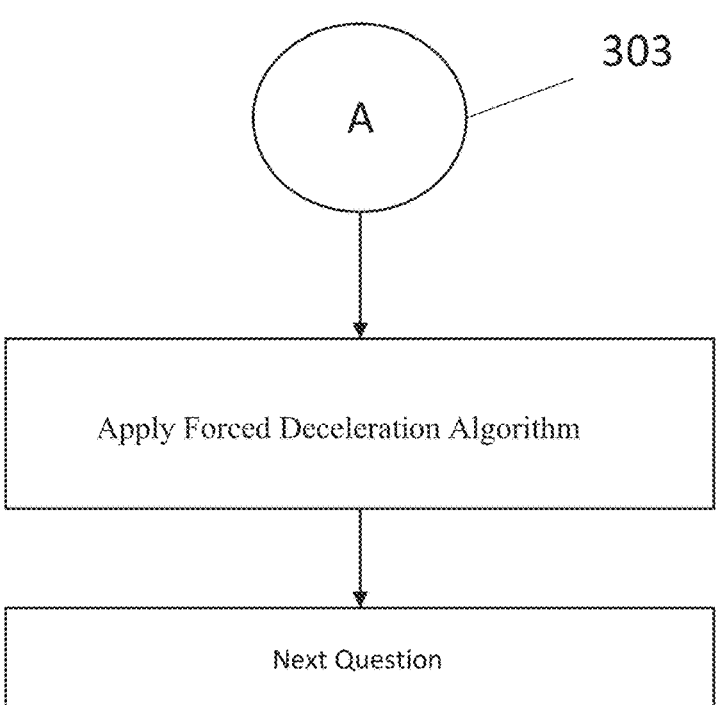
FIG. 19 is the step of the forced deceleration in FIG. 18.
Figure 20:
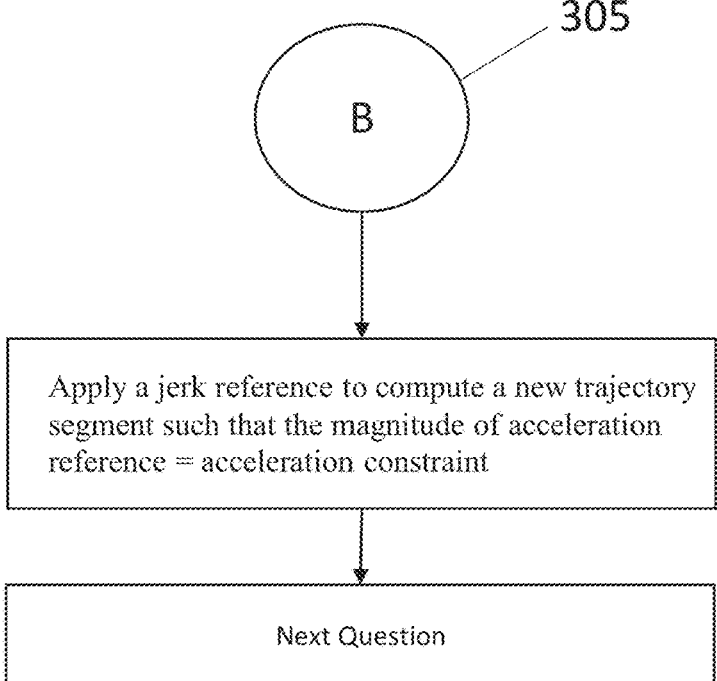
FIG. 20 is the remedial step of ramping the magnitude of the acceleration to the commanded acceleration in FIG. 18.

The following sections in conjunction with the flowchart 300 shown in FIG. 18 outline the decision making process associated with generating finite-jerk trajectories according to an embodiment of the present invention. Each section is organised in the form of a series of questions (in bold)—which represent the logical checks that are carried out to produce an answer—and the course of action that must be taken depending on the answer to the question. Each course of action is represented by flowcharts shown in FIGS. 19 to 26. Each of the questions aims to establish a status the current trajectory is in before applying the course of action. The series of questions in the generation of the trajectory is as follows:

A) Is forced deceleration in progress (or been requested just now) 302?

Forced deceleration is applied in circumstances where, for example, there has been a change in the commanded position and a different trajectory segment would need to be generated in order for the trajectory to reach the updated commanded position, i.e. the trajectory is asked to terminate sooner. The process uses a forced deceleration algorithm discussed further below to find the deceleration trajectory segment to reach the updated commanded position, i.e. the acceleration and velocity being substantially zero at the updated commanded position. Choosing a deceleration trajectory such that the trajectory reaches the updated commanded position without overshooting and not exceeding the commanded deceleration may require the controller system generating new inputs including but not limited to new constraints in deceleration to allow a more forceful deceleration of the trajectory. The methodology as set out in the forced deceleration below involves applying a forced deceleration constraint to the trajectory. In some cases, an algorithm, more specifically a root finding algorithm, may be applied to determine the appropriate deceleration constraint of the trajectory. The objective function is the degree of overshoot from the updated commanded position that the trajectory experiences if a deceleration is carried out under a chosen deceleration constraint, and the root is the deceleration where the objective function is substantially zero. The algorithm successively produces a more accurate approximation to the root, which corresponds to a deceleration value for the trajectory to be able to land on the updated commanded position. For example, the trajectory in the deceleration phase can be requested to reach a new commanded position which is closer than the previously requested commanded position. When applying the forced deceleration algorithm, a velocity transition algorithm according to the present invention may be carried out to transition the velocity reference from an initial start point to a desired final velocity, $v_f$, having a magnitude of substantially zero. To transition the magnitude of the velocity from an initial value to a desired final velocity, $v_f$, in this case substantially zero velocity, may involve generating one or more trajectory segments depending on the status of the start point or current status of the trajectory.

Figure 34:
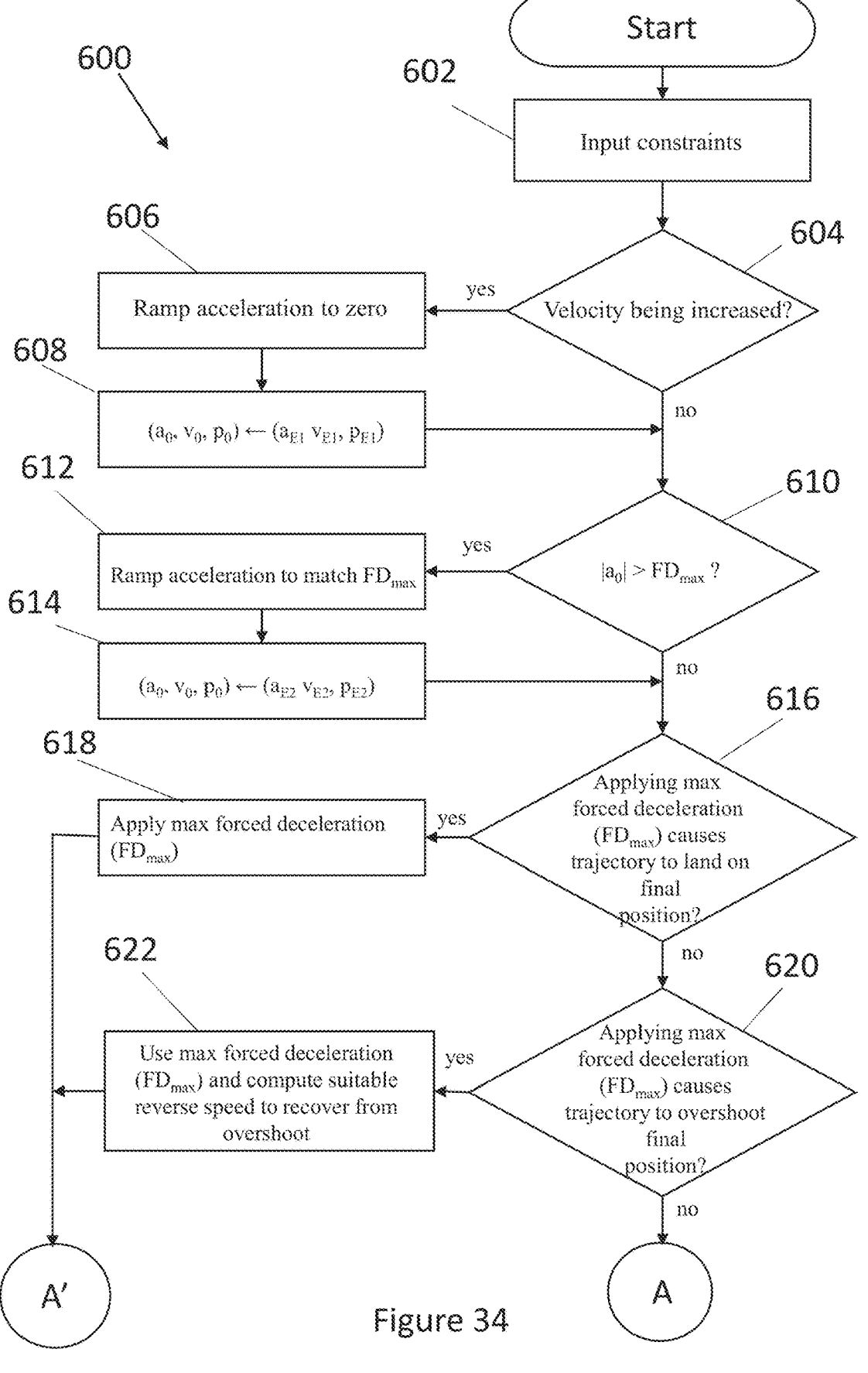
FIG. 34 is a flowchart of an example methodology of the forced deceleration algorithm according to an embodiment of the present invention.
Figure 34:
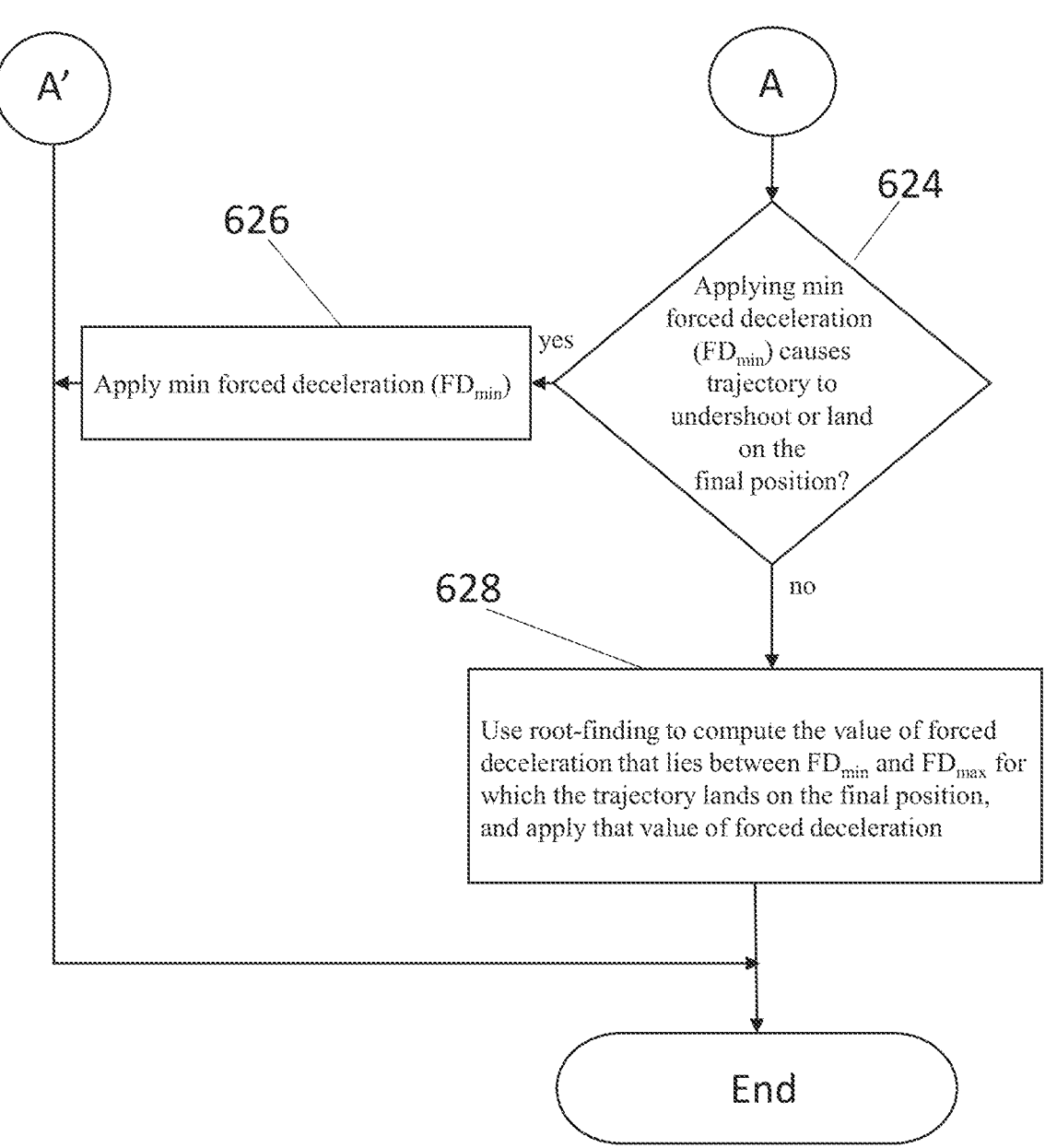

If the answer to Question A is yes 303, the methodology described in the forced deceleration section below and shown in FIG. 34 is followed to produce the required trajectory segments to bring down the trajectory to the commanded position; otherwise if the circumstance of the trajectory is not present (i.e. forced deceleration is not in progress and has not been requested), the control system moves to the next question.

B) Does the (absolute value of the) current trajectory acceleration exceed Commanded Acceleration 304?

In this circumstance, the absolute value of the current trajectory acceleration is compared to the commanded acceleration (acceleration constraint). If the absolute value of the current trajectory acceleration is greater than the commanded acceleration, then a new trajectory segment is required to be computed such that the magnitude of the trajectory acceleration is reduced to the Commanded Acceleration. In this circumstance, one or more jerk values are applied to the trajectory so as to reduce the trajectory acceleration (see FIG. 20), i.e. the endpoint of the acceleration reference has a reduced endpoint acceleration equivalent to the commanded acceleration. The magnitude of the trajectory acceleration is compared to the commanded acceleration each time the jerk is applied to the trajectory until the trajectory acceleration is reduced to the commanded acceleration. This is exemplified by the trajectory segment generation having a start point $(p_0, v_0, a_0)$ and an endpoint $(p_e, v_e, a_e)$ below:

the manipulated variable (jerk) value used is $J=J_2$ (reduce the trajectory acceleration reference).

The trajectory segment duration is given by $$T = \frac{|a_e - a_0|}{J},$$

The endpoint acceleration $a_e$ and the endpoint velocity $v_e$ and the endpoint position $p_e$ are obtained by direct application of the trajectory equations 3, 4, and 5 using the start point $(p_0, v_0, a_0)$, $J_2$, and the segment duration T.

If the circumstance is that the current trajectory acceleration does not exceed the commanded acceleration, then the control system moves onto the next question.

C) If the trajectory were to be brought to a stationary position (zero velocity & acceleration) starting right now, is its stationary position:

a) Essentially equal (i.e. to within 0.5 position units) to Commanded Position 306?

b) On the opposite side of the Commanded Position from where the trajectory's current position is 308 (i.e. overshoot)?

c) Further away from the Commanded Position than the trajectory's current position is 310 (i.e. are we moving away from the Commanded Position)?

Knowing that the magnitude of the trajectory acceleration does not exceed the commanded acceleration, the control system checks if the trajectory is at the commanded position if the trajectory is brought to a standstill. This will also give an indication as to how far the trajectory is from the commanded position or whether it will overshoot the commanded position. A series of questions are put to the control system and through a process of elimination, the status of the trajectory at the current state can be established and the required remedy applied to the trajectory to make sure that the trajectory is on course of the point-to-point movement.

Figure 21:
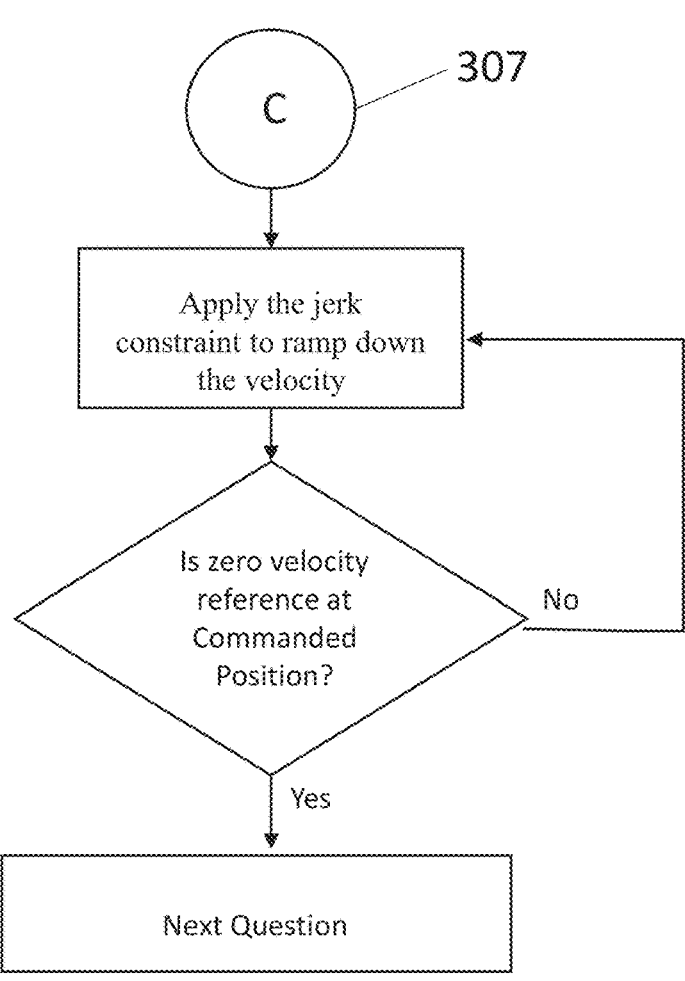
FIG. 21 is the remedial step of ramping down the magnitude of the velocity to substantially zero in FIG. 18.
Figure 22:
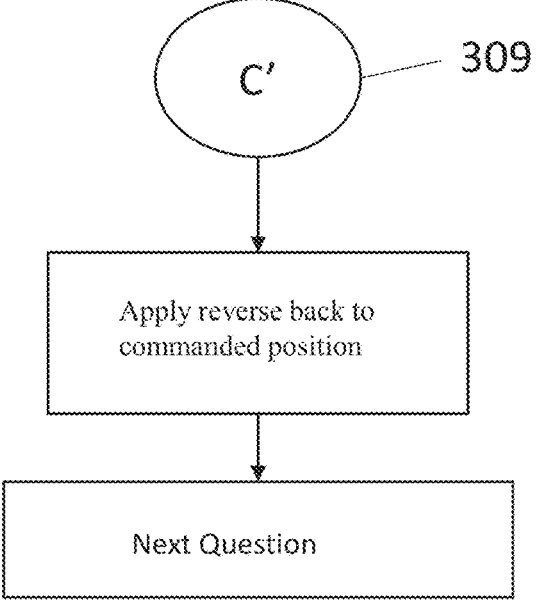
FIG. 22 is the remedial step of applying the reverse back from the overshoot in FIG. 18.
Figures 23, 24:
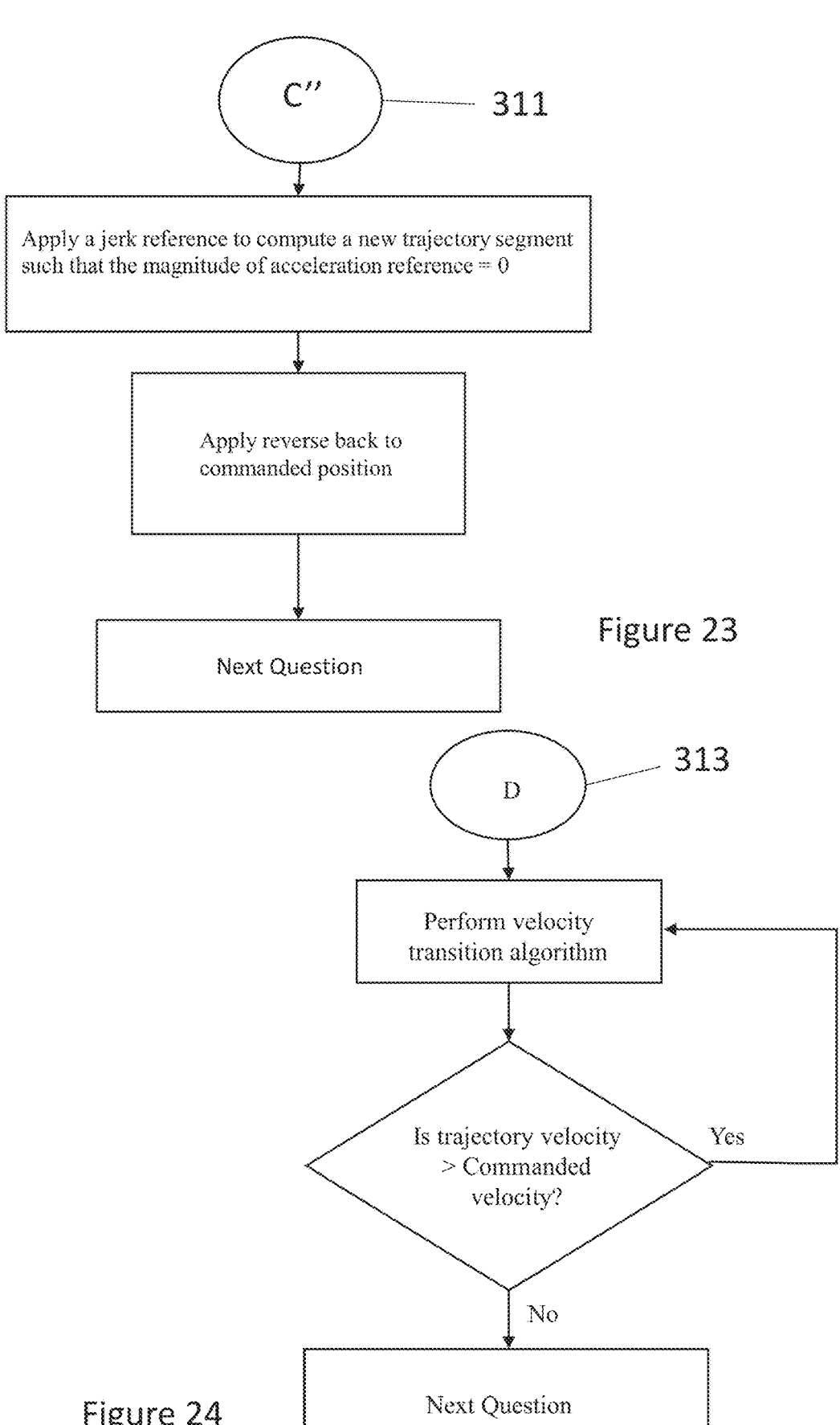
FIG. 23 is the remedial step of ramping down the magnitude of the acceleration to substantially zero and applying the reverse back from the overshoot in FIG. 18.
FIG. 24 is the remedial step of the magnitude of the trajectory acceleration being greater than the commanded velocity.
Figure 25:
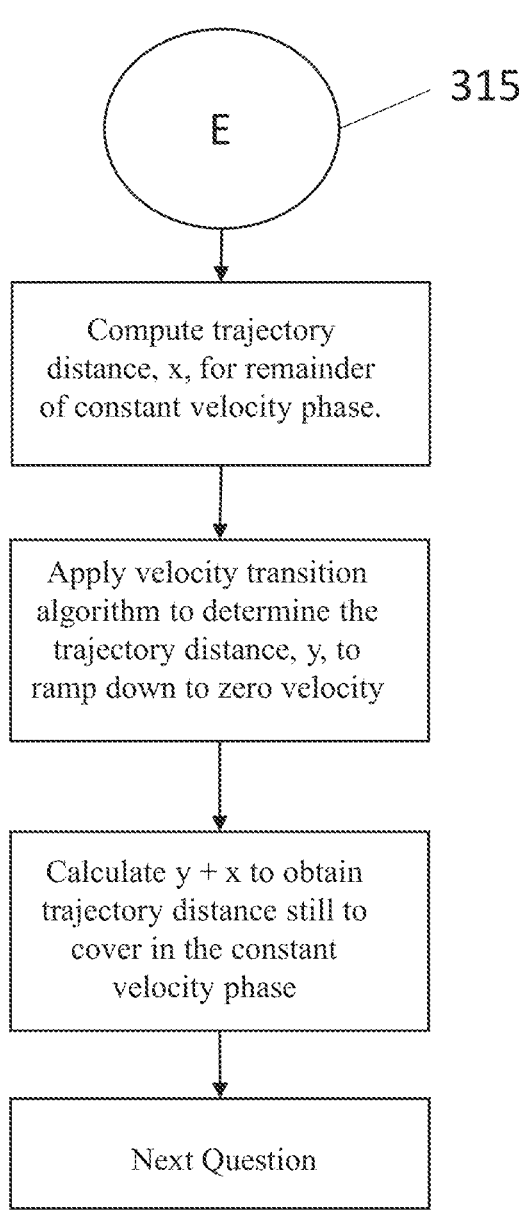
FIG. 25 is the remedial step of the magnitude of the current trajectory velocity being substantially equal to the commanded velocity.
Figure 26:
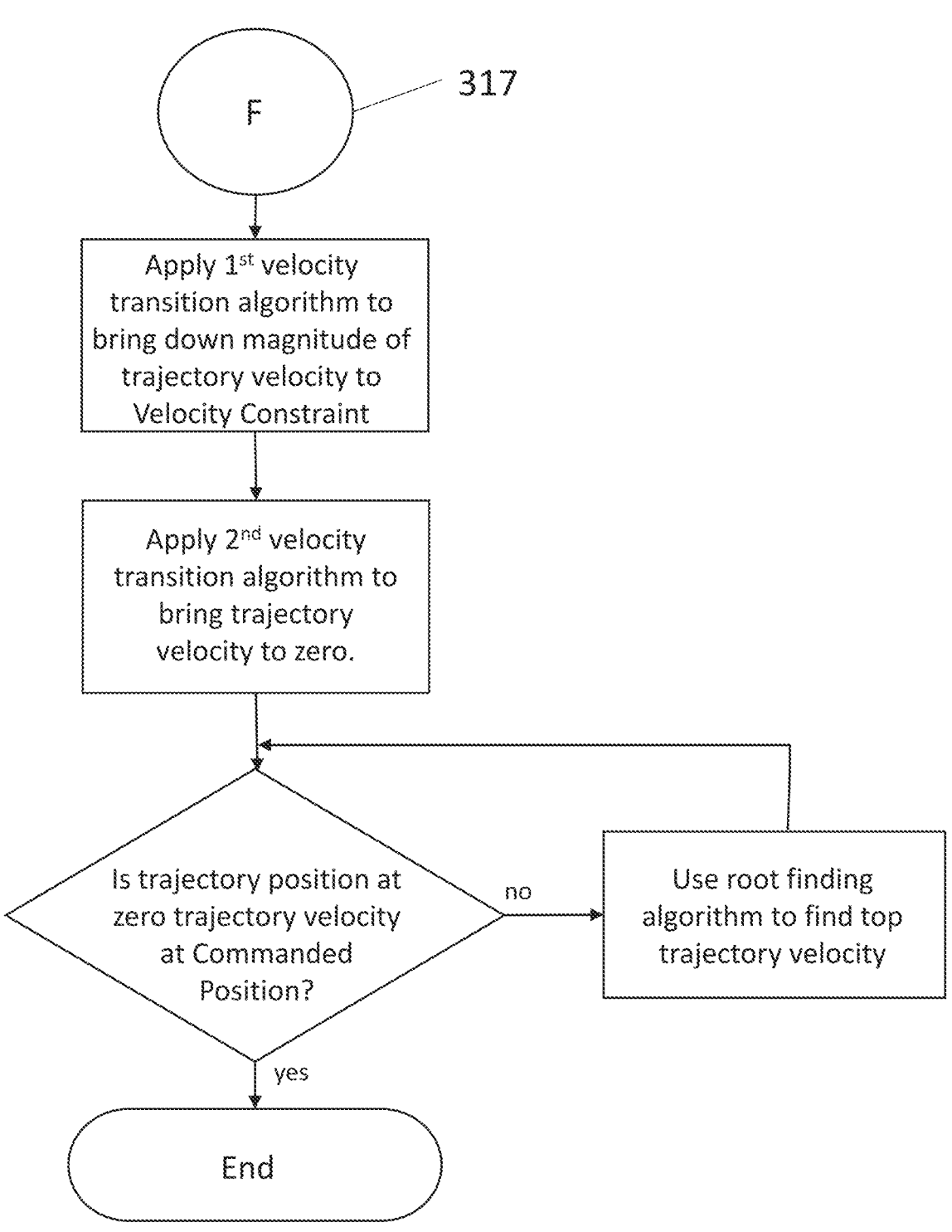
FIG. 26 is the remedial step of increasing the magnitude of the current trajectory velocity to the commanded velocity.

If the answer to question (a) is yes, then the control system carries out the necessary steps to ramp down to zero velocity such that the trajectory is brought to a stationary position at the commanded position by generating one or more trajectory segments from the current trajectory point $(p_0, v_0, a_0)$ to an endpoint, where the endpoint acceleration, $a_e$ and endpoint velocity, v e are substantially zero at the commanded position (see FIG. 21). This is exemplified by the generation of a single trajectory segment having a start point $(p_0, v_0, a_0)$ and an endpoint $(p_e, v_e, a_e)$ below:

the manipulated variable (jerk) value used is $J=J_2$ (reduce the trajectory acceleration reference).

The trajectory segment duration is given by $$T = \frac{a_0}{J},$$

The endpoint acceleration, $a_e$ and the endpoint velocity, $v_e$ are substantially zero and the endpoint $p_e$ is obtained by direct application of the trajectory equations 3, 4 and 5 using the start point $(p_0, v_0, a_0)$, $J_2$ and the segment duration, T.

However, if the answer is 'no' to question (a) but yes to either of the last two questions, (b) and (c) 308, 310 (see FIGS. 22 and 23) then the circumstance is that the trajectory is overshooting the Commanded Position. The remedial action would then be to bring the trajectory velocity to a "reverse" value so that the trajectory can recover by "reversing back" towards Commanded Position. As with the forward trajectory towards the commanded position, one or more reverse trajectory segments are provided by applying one or more jerk values such that a motive device such as the load handling device operating in reverse will travel towards the commanded position. The duration or length of the reverse trajectory segments is dependent on the degree of overshoot from the commanded position. For example, if the degree of overshoot is large, then the trajectory will have enough time to reach the commanded velocity before ramping down to zero velocity at the commanded position. Conversely, if the degree of overshoot is short, then the trajectory velocity may not reach the commanded velocity and thus, a desired peak velocity, $v_{peak}$, is required that will allow the trajectory in reverse reach the commanded position in the shortest possible time. In both cases, a "velocity transition algorithm" is applied to transition the magnitude of the velocity from an initial or current value to a final velocity, $v_f$, value. The velocity transition algorithm will be discussed in further detail below. In essence, a first velocity transition algorithm is applied to bring the trajectory from an initial (current) state or trajectory point to a trajectory point where an endpoint velocity, $v_E$, of a given trajectory segment corresponding to the desired peak velocity, $v_{peak}$ is reached. This is given an initial trajectory point $(p_0, v_0, a_0)$, the endpoint velocity $(v_E)$, commanded acceleration $(a_{max})$ and specific values of jerk constraints to increase or decrease the magnitude of the trajectory acceleration reference. By assigning the endpoint $(p_E, v_E, a_E)$ of the first velocity transition algorithm to the start point $(p_0, v_0, a_0)$, a second velocity transition algorithm brings the magnitude of the velocity reference from an initial velocity $v_0$ corresponding to the desired peak velocity, $v_{peak}$, to a new endpoint velocity, $v_E$ corresponding to the desired final velocity, $v_f$, and having a value of substantially zero and an endpoint acceleration, $a_E$, corresponding to substantially zero. Further detail of the velocity transition algorithm is discussed below. If the trajectory is moving away from the commanded position, then prior to applying the velocity transition algorithm to the desired final velocity, $v_f$, at the commanded position, it is necessary to ramp down the magnitude of the current trajectory acceleration to substantially zero. As shown in the flowchart shown in FIG. 23, the magnitude of the trajectory acceleration is ramped down to substantially zero before applying a reverse back to the desired final velocity, $v_f$, of substantially zero at the commanded position.

However, if the answer is 'no' to all three questions, then the circumstance must be that by ramping down to zero velocity right now will cause the trajectory to undershoot the Commanded Position. In this circumstance, the control system moves onto the next question to establish the next stage of the trajectory generation.

D) Does the trajectory velocity exceed Commanded Velocity 312?

In accordance with an embodiment of the present invention, the generation of the motion control profile is dependent on the load handling device being able to achieve a maximum possible velocity during the acceleration phase on the grid structure without causing the load handling device to overshoot the commanded position. Conversely, too low a velocity would cause the load handling device to undershoot the commanded position. However, the peak or maximum velocity that the load handing device can travel is very much limited to what is defined by one of the maximum velocity limit constraints or commanded velocity discussed above. The ability to reach a peak velocity, $v_{peak}$, closer to the commanded velocity of the drive mechanism is dependent on the length of travel on the grid structure. If the length of travel is long, then there is enough time for the velocity to reach the commanded velocity before entering the deceleration phase. If the length of travel is short, there will not be enough time for the velocity to reach the commanded velocity before entering the deceleration phase without overshooting the commanded position.

The controller will always aim to reach the commanded velocity defined by the constraint so as to provide the shortest possible time to complete a point-to-point move. Reaching the commanded velocity may not be feasible where the length of travel is too short. In the circumstance where the load handling device were to reach the commanded velocity, the load handling device would overshoot the commanded position. Choosing the optimal peak velocity, $v_{peak}$, that the load handling device is able to reach between the commanded velocity and an initial velocity, $v_0$, is thus required that allows the load handling device to complete the trajectory in the shortest possible time.

In this particular circumstance, the control system decides whether the trajectory velocity exceeds the commanded velocity. If the answer to question D) is yes 313 (see FIG. 24), the control system performs a velocity transition algorithm in order to bring the magnitude of the trajectory velocity reference down to the commanded velocity by generating one or more trajectory segments such that the endpoint of the trajectory segment corresponds to the commanded velocity; otherwise the control system moves to the next question. The principle of the velocity transition algorithm, as will be discussed further below, is to generate one or more trajectory segments required to bring the trajectory from a start point to a trajectory point where the magnitude of the velocity is the final velocity, $v_f$, and the endpoint acceleration is substantially zero.

A root finding algorithm is used to find the desired peak velocity, $v_{peak}$, that the trajectory may reach without overshooting or undershooting the commanded position. The velocity transition algorithm according to an embodiment of the present invention generates the necessary trajectory segments to transition the magnitude of the velocity to the peak velocity, $v_{peak}$ and then back down to substantially zero. The objective function is the degree of overshoot or undershoot, and the root is the desired peak velocity where the objective function is substantially zero.

E) Is the magnitude of the current trajectory velocity the same as Commanded Velocity 314?

If the answer to question E) is no, move to the next question F. If yes 315 (see FIG. 25) to the circumstance that the magnitude of the current trajectory velocity is the same as the commanded velocity, the control system will compute one or more trajectory segments for the remainder of the constant-velocity phase. In order to compute the one or more trajectory segments for the remainder of the constant-velocity phase or cruise phase, the distance travelled by the trajectory when it starts to ramp down to zero velocity would need to be calculated. This would normally be calculated as a consequence of answering one of the previous questions, in particular question C above.

The duration of the one or more trajectory segments for the remainder of the constant-velocity phase, and thus the distance that the trajectory can still cover while in the constant-velocity phase, is determined by subtracting the distance travelled by the trajectory when it starts to ramp down to zero velocity from the currently remaining distance. This can be explained as follows:

(1) The trajectory can remain at the commanded velocity for some time T, whereby the trajectory position will advance by $\Delta p_{cruise}$, and (2) After time T, the trajectory must carry out a velocity transition by applying the velocity transition algorithm from commanded velocity to zero velocity (i.e. of $=0$) whereby the trajectory position will travel a further $\Delta p_{decel}$.

(3) And therefore: Remaining Distance=$\Delta p_{cruise}$, +$\Delta p_{decel}$

Looking at where the trajectory is in its current position, Remaining Distance is computed from Commanded Position–Current Position ($p_0$).

The values of $\Delta p_{cruise}$, $\Delta p_{decel}$ and T are computed by the control system as follows:

To find $\Delta p_{decel}$: the distance travelled by the trajectory when the velocity transition (2) is carried out. This is carried out by the velocity transition algorithm, which produces its usual output: trajectory segments+distance travelled. This distance is equivalent to how much the trajectory will travel during the deceleration phase (from commanded velocity to zero velocity), i.e. $\Delta p_{decel}$.

By (3), the control system can now compute $\Delta p_{cruise}$=Remaining Distance–$\Delta p_{decel}$ Finally the duration, T, of the trajectory segment at the cruise phase is determined from:

$$T = \frac{\Delta p_{cruise}}{v_{max}} \tag{6}$$

where:

$\Delta p_{cruise}$ is the distance travelled during at constant command velocity $v_{max}$ is the command velocity.

The constant-velocity phase trajectory segment duration is obtained by dividing the absolute value of that distance, $\Delta p_{cruise}$ by the commanded velocity, $v_{max}$. The value of the manipulated variable, jerk, at the constant velocity phase trajectory segment is zero. Since the trajectory velocity is constant during the constant velocity phase segment, the control system should assert that the magnitude of the trajectory acceleration is zero at this point; if it is not, then the handling performed by the previous question (C) ("velocity overshoot") was not carried out correctly and this calculation can be used as a check of the calculations in question (C).

If all of the above questions (A) to (E) are false, then it can be concluded that the trajectory velocity can be increased.

By a process of elimination, the circumstance of the trajectory can be brought to the conclusion that the trajectory will not overshoot if brought to a stationary position, it currently does not exceed either the command velocity or the command acceleration, and it is not yet travelling at the command velocity. Therefore, it must be that the magnitude of the velocity can be increased. By structuring the questions in this order, the shortest possible time for a point to point move is achieved.

F) Can the magnitude of the trajectory velocity be increased to Commanded Velocity 316?

In this circumstance and through a process of elimination, the magnitude of the trajectory velocity is in a condition that it can be increased to the commanded velocity. Here, the control system applies a first velocity transition algorithm to bring the magnitude of trajectory velocity to the commanded velocity immediately followed by a second velocity transition algorithm to bring the trajectory to a stationary position, i.e. when the magnitude of the velocity is substantially zero. If the trajectory position that results from the two back-to-back velocity transitions does not overshoot commanded position then the answer to this question is yes 316 (see FIG. 26), in which case the trajectory segments generated as part of the first velocity transition calculations are adopted as the immediate solution.

However, if the trajectory velocity cannot be increased to the commanded velocity without overshooting the commanded position, then a desired final velocity, $v_f$, corresponding to a peak velocity, $v_{peak}$, is thus required where the trajectory velocity can be increased such that followed by a second velocity transition, the trajectory speed is brought to a stationary position at the commanded position. In accordance with the present invention, this is solved by applying a root finding algorithm to an objective problem in the search for the optimal peak velocity, $v_{peak}$, where the candidate peak velocity is the abscissa and the degree of overshoot distance is the ordinate. Thus, the objective function, $f(t)$, being the degree of overshoot or undershoot otherwise known as the deviation from the commanded position. The root being a peak velocity, $v_{peak}$, between the commanded velocity, $v_{max}$, and the initial velocity, $v_0$, where the deviation from the commanded position is substantially zero, i.e. $f(t)=0$. The root finding algorithm starts with one or more initial guesses of the final peak velocity, $v_{peak}$, and determining the necessary trajectory segments to achieve the velocity transition to the final peak velocity, $v_{peak}$, by applying the velocity transition algorithm. The deviation or overshoot from the commanded position is determined by applying the trajectory equations (3 to 5). This is repeated for each peak velocity, $v_{peak}$, chosen when applying the root finding algorithm. Each iteration of the root finding algorithm produces a successively more accurate approximation to the root. The iteration is repeated until the sequence of numbers, in this case, the peak velocity choices, converges towards the root, i.e. where the objective function of the root is substantially equal to zero. The obvious candidates for the peak velocity, $v_{peak}$, choices are:

The magnitude of the initial trajectory velocity, the commanded velocity a weighted combination of the first two.

Further detail of the application of the root finding algorithm is discussed below in Section 5.0. The root finding algorithm can be any one of a Newton's root-finding method, a secant root-finding method, a bisection root-finding method, an interpolation-based root-finding method, an inverse-interpolation-based root-finding method, a Brent's root-finding method, a Budan-Fourier-based root-finding method, and a Strum-chain-based root-finding method. The trajectory segments that result from the velocity transition (current velocity to solution top velocity) are retained.

If at the final stage of the generation of the trajectory or motion control profile, the magnitude of the velocity does not need to be increased to the commanded velocity or velocity constraint, then the velocity transition algorithm 318 is applied so as to bring the trajectory to zero velocity at the commanded position.

4.0 Velocity Transition Algorithm

The process of generating finite-jerk ("S-curve") trajectories relies heavily on solving what is referred to in the present invention as the velocity transition algorithm. The velocity transition algorithm is centred on determining the trajectory segments required to bring the trajectory from an initial trajectory point of position, $p_0$, velocity, $v_0$ and acceleration, $a_0$ to a desired final velocity, $v_f$, with the magnitude of the final acceleration being substantially zero. The final velocity, $v_f$, can be any value that is desired. For example, when the load handling device needs to be instructed to be brought to a standstill, then $v_f$ can be set to substantially zero and the velocity transition algorithm will carry out the necessary trajectory segments to bring the trajectory from a current trajectory point to a standstill. This is subject to the constraints of commanded acceleration $(a_{max})$, commanded velocity $(v_{max})$, and the one or more jerk constraints, $J_1$, $J_2$, $J_3$, $J_4$. For ease of explanation and understanding of the velocity transition algorithm, the one or more jerk constraints are termed $j_{inc}$ to increase the magnitude of the acceleration, $j_{dec}$ to decrease the magnitude of the acceleration.

The velocity transition algorithm is broken into sub-algorithms; a first velocity transition sub algorithm and a second velocity transition sub algorithm—both need to be carried out before the velocity transition algorithm according to the present invention can be completed. The first velocity transition sub algorithm checks the validity or condition of the trajectory and whether one or more trajectory segments are necessary to correctly apply the second velocity transition sub algorithm. The second velocity transition sub algorithm is the algorithm that actually carries out the (velocity) transition to the desired final velocity, $v_f$, regardless of the value of $v_f$. For avoidance of doubt, the term "velocity" and "velocity reference" are used interchangeably to mean the same function. Equally, the term "acceleration" and "acceleration reference" are used interchangeably to mean the same function.

It is essential when applying the second velocity transition sub algorithm to make sure that the i) trajectory acceleration is not excessive, ii) deal with the trajectory accelerating away from final velocity, $v_f$, iii) deal with overshoots of the final velocity, $v_f$. If any of these conditions are not met, then the control system applies the first sub velocity transition algorithm to generate one or more trajectory segments to deal with these anomalies or situations before proceeding to the second velocity transition sub algorithm. In other words, to handle the general case of the velocity transition algorithm, the control system need to initially carry out those three checks: namely, excessive acceleration, acceleration in wrong direction and trajectory velocity overshoots the desired final velocity $v_f$. By providing these remedial steps or generate the trajectory segments to address these sub-problems should they arise in the trajectory, the problem is reduced to a simple problem that the second velocity transition sub algorithm can resolve.

Figure 28:
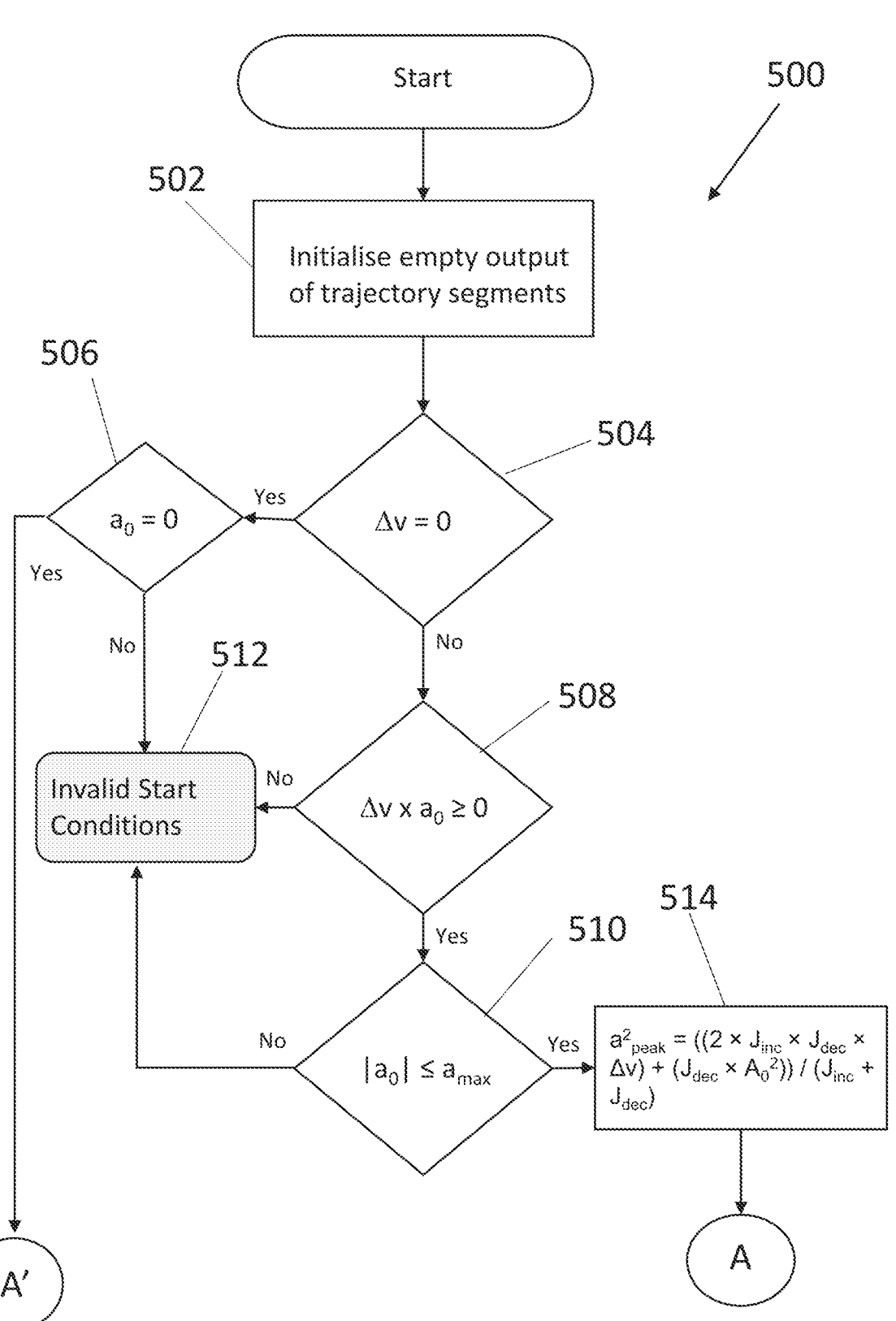
FIG. 28 is a flowchart of an example methodology of the second velocity transition sub algorithm according to an embodiment of the present invention.
Figure 28:
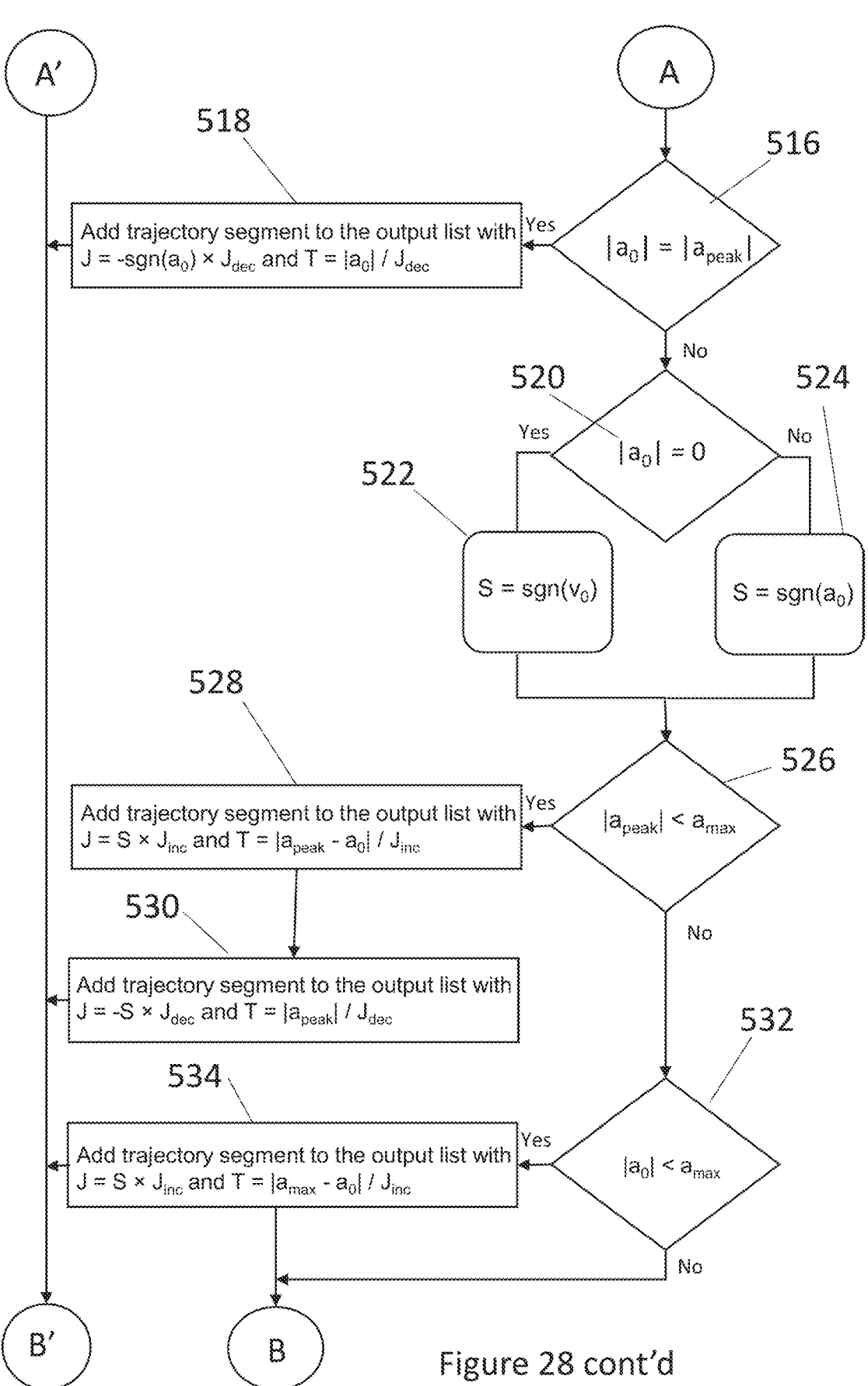
Figure 28:
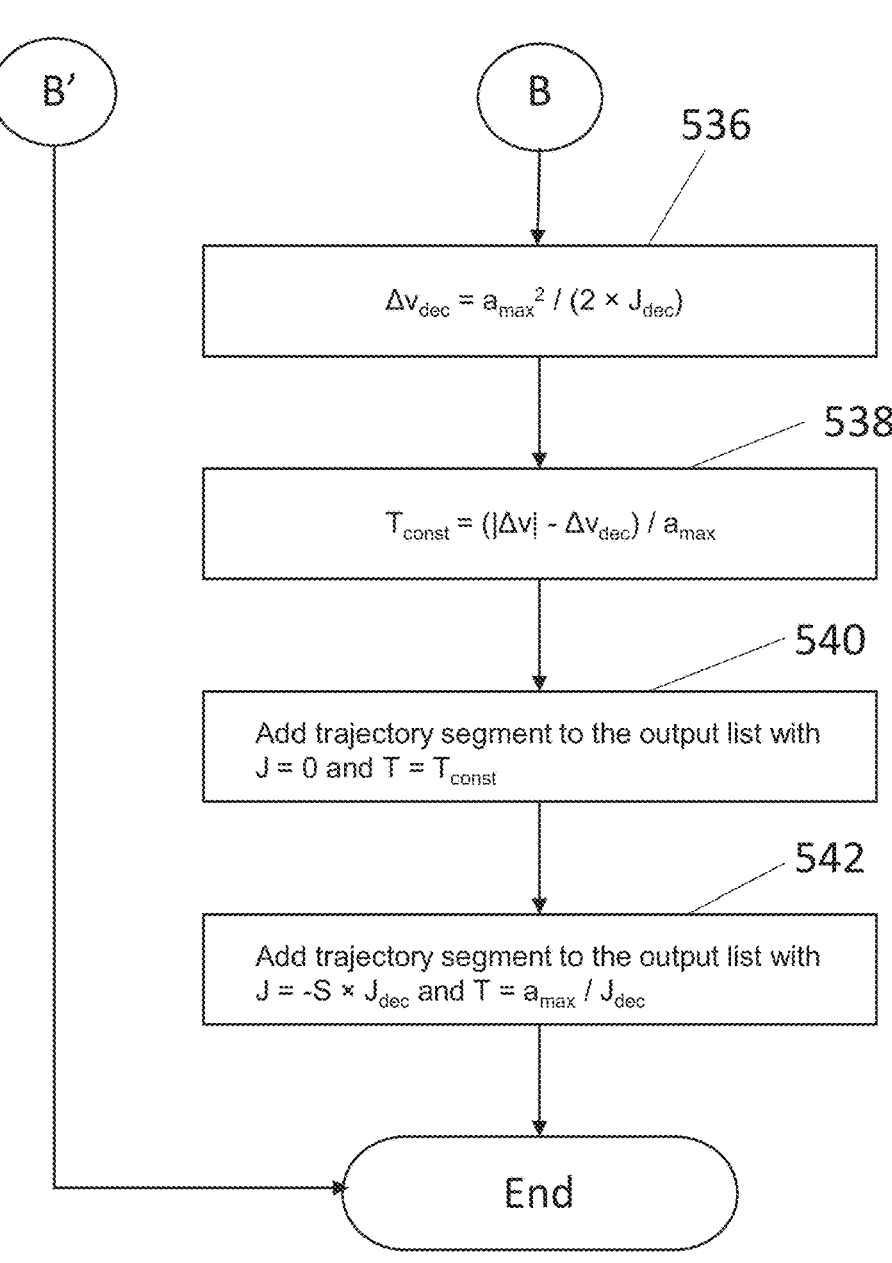

FIG. 28 shows a flowchart detailing the application of the second velocity transition sub algorithm and the checks that are incumbent for the second velocity transition sub algorithm to be implemented according to an embodiment of the present invention.

The output variables in generating the one or more trajectory segments are jerk value, J, and time duration of the trajectory segment, T. For the purpose of describing the velocity transition algorithm, the speed delta, $\Delta v$, which is defined as the difference between the desired final speed, $v_f$, and the velocity $v_0$ at a given point in time, $\Delta v = v_f - v_0$ will be used in assessing the status of the trajectory. The value of the velocity or speed delta, $\Delta v$, can change depending on where in the trajectory the velocity transition algorithm according to the present invention is being applied. This is because the velocity reference, $v(t)$, is dependent on where in the trajectory the velocity reference is taken, i.e. the value of the velocity trajectory at a trajectory point. Preferably, the velocity delta is based on the difference between the desired final velocity reference and either the initial or endpoint velocity reference of the one or more trajectory segments.

The process begins with initializing the output list of trajectory segments and deciding whether the conditions are right to start the velocity transition algorithm.

4.1 Application of the First Velocity Transition Sub Algorithm

However, the second velocity transition sub algorithm cannot begin unless certain conditions are met or whether there are anomalies or conditions in the trajectory that need to be dealt with. The conditions for a valid start of the second velocity transition sub algorithm are one of the following:

a) The trajectory is already at the desired final velocity, $v_f$, starting from a zero trajectory acceleration, $a_0$. Mathematically, this is given by the conditions:

$$\Delta v = 0 \text{ AND } a_0 = 0$$

b) The trajectory is not already at the desired final velocity, $v_f$, and the trajectory is accelerating towards $v_f$, but the trajectory acceleration does not exceed the constraint of the command acceleration or the initial acceleration is zero. Mathematically, this is given by the conditions:

$$(\Delta v \neq 0) \text{ AND } (\Delta v \times a_0 \geq 0) \text{ AND } (|a_0| \leq a_{max})$$

c) The trajectory is not already at the desired final velocity, $v_f$, and the initial acceleration, $a_0$, is zero. Mathematically, this is given by the conditions:

$$(\Delta v \neq 0) \text{ AND } (a_0 = 0) \text{ AND } (|a_0| \leq a_{max})$$

These conditions are shown in FIG. 28 as decision making blocks 504, 506, 508, and 510. In contrast to meeting the conditions of the second velocity transition sub algorithm, the second velocity transition sub algorithm cannot be carried out unless certain anomalies or conditions in the trajectory such as the trajectory acceleration being excessive needs to be dealt with. These sub problems are addressed by the first velocity transition sub algorithm. Without addressing these anomalies or conditions, the second velocity transition sub algorithm is not able to transition the velocity to the desired final velocity, $v_f$. These are termed invalid start conditions and is shown in the flowchart in FIG. 28 as the box referenced "invalid start conditions" 512, and include:— a) The trajectory is already at the desired final velocity, $v_f$, but the initial acceleration, $a_0$, is not zero. In other words, the trajectory is accelerating away from the desired final velocity, $v_f$. To correct this anomaly, three or four trajectory segments are needed: one to bring the magnitude of the trajectory acceleration to zero and then the velocity transition sub algorithm can generate two or three further trajectory segments to bring the magnitude of the trajectory velocity back to the desired final velocity, $v_f$. Mathematically, the condition of the invalid start conditions is given by:

$$\Delta v = 0 \text{ AND } a_0 \neq 0$$

b) The trajectory is accelerating away from the desired final velocity, $v_f$. In this instance, $\Delta v$ and $a_0$ have opposite signs (i.e. $\Delta v$ is positive and $a_0$ is negative, or $\Delta v$ is negative and $a_0$ is positive) and three or four trajectory segments would be required: one to bring the magnitude of the trajectory acceleration to zero and then the velocity transition sub algorithm can generate two or three further trajectory segments to bring the magnitude of the trajectory velocity back to the desired final velocity, $v_f$. Mathematically, the invalid condition is given by the conditions:

$$\Delta v \times a_0 < 0$$

c) The initial acceleration, $a_0$ exceeds the constraint maximum or commanded acceleration, $a_{max}$. One or more trajectory segments are required to bring the trajectory acceleration to the commanded acceleration, $a_{max}$. Mathematically, the invalid condition is given by:

$$|a_0| > a_{max}$$

Before completing the velocity transition algorithm, the anomalies in the trajectory that do not meet the conditions or incumbent for application of the second velocity transition sub algorithm are first discussed in order to put the trajectory into a condition for application of the second velocity transition sub algorithm. The conditions are addressed by the first velocity transition sub algorithm and are described as sub-problems which need to be addressed in a specific order as documented in the flowchart 400 shown in FIG. 27. Addressing these anomalies will produce a sequence of between one and five trajectory segments which, together, constitute the solution to the velocity transition algorithm.

In addressing the sub-problems and generating the one or more trajectory segments, in some examples a pre-emptive jerk value, $J_{red}$, in addition to $J_{inc}$ and $J_{dec}$, is introduced to the inputs 402 as shown in Table 1.

TABLE 1

Inputs and outputs of application of the first velocity transition sub algorithm. First Velocity Transition sub algorithm

| Inputs: |
| --- |
| Initial Velocity $v_0$ |
| Initial Acceleration $a_0$ |
| Maximum acceleration $a_{max}$ ($a_{max} > 0$) |
| Acceleration magnitude reduction jerk $J_{red}$ ($J_{red} > 0$) |
| Acceleration magnitude increase jerk $J_{inc}$ ($J_{inc} > 0$) |
| Acceleration magnitude decrease jerk $J_{dec}$ ($J_{dec} > 0$) |
| Final Velocity $v_f$ |
| Outputs: |
| List of contiguous trajectory segments, each characterised by |
| A jerk value (J), and |
| A time duration (T) |
| Total distance traversed by the trajectory ($\Delta P$), as per the list of segments |
| Definitions: |
| $\Delta v = v_f - v_0$ |

$J_{red}$ is different from $J_{dec}$ in the sense that the pre-emptive jerk, $J_{red}$, is required to reduce the magnitude of the acceleration to substantially zero differently to $J_{dec}$. In other words, $J_{red}$ reduces the magnitude of the acceleration at a different rate to $J_{dec}$ and is needed when handling the two initial checks (excessive acceleration and accelerating away from final velocity) described below. Thus, when there is excessive acceleration or the trajectory is accelerating away from the desired final velocity, $v_f$, the control system applies the pre-emptive $J_{red}$, to reduce the acceleration to substantially zero. The above explanation applies in examples when $J_{red}$ and $J_{dec}$ have different values. In other examples, the values of $J_{red}$ and $J_{dec}$ may be the same.

The flowchart 400 shown in FIG. 27 and described below details the solutions of the sub-problems of the first velocity transition sub algorithm and the order they are addressed before the second velocity transition sub algorithm according to the present invention is applied to generate the trajectory. The sub-problems are broken down into one or more blocks, each of the one or more blocks representing the solutions of the sub-problems addressed by the first velocity transition sub algorithm. Each solution to the sub-problem generates one or more trajectory segments that are entered into an output list. Initially, the output list of trajectory segments is empty. For the purpose of explanation of the velocity transition algorithm, the term "integrate" in that context means "apply the trajectory equations 3, 4 and 5 (using a start point, trajectory segment jerk and segment duration) to arrive at the segment end-point".

A) Handle Excessive Acceleration

In the decision making process and prior to the application of the second velocity transition sub algorithm of the present invention is that the control system determines whether the magnitude of the initial acceleration, $|a_0|$, is greater than the constraint commanded acceleration, $a_{max}$. This is represented by the decision block 404 in FIG. 27. If the answer is affirmative, then the control system adds a trajectory segment 406 to the output list. The new trajectory segment reduces the trajectory acceleration to $a_{max}$ before attempting to solve the second velocity transition sub algorithm, in which case a trajectory segment must be generated, for which:

The manipulated variable, jerk value used is $J=-\text{sign}(a_0)\times J_{red}$. The negative sign is necessary to reduce the acceleration from the initial acceleration, $a_0$.

The trajectory segment duration is given by $T_1=|a_{max}-|a_0||/J_{red}$

By applying the manipulated variable, jerk, J, the endpoint trajectory acceleration, $a_{E1}$, is given by $a_{E1}=\text{sign}(a_0)\times a_{max}$.

Starting from the initial position, $p_0$ and velocity, $v_0$, the endpoint velocity $v_{E1}$ and position $p_{E1}$ are thus obtained by the direct application of the trajectory equations 3, 4 and 5 using the start point $(a_0, v_0, p_0)$, jerk, J and trajectory segment duration, $T_1$. This is shown in the flowchart as integrating 408 the trajectory from the start point $(v_0, a_0)$, using all segments on the output list, to compute the resulting velocity and acceleration, $v_{E1}$ and $a_{E1}$.

If the trajectory segment is generated in this step, then its endpoint becomes the initial trajectory point for the next sub-problem, $(a_0, v_0, p_0)$ $(a_{E1}, v_{E1}, p_{E1})$ and the velocity delta 412 is recalculated accordingly to $\Delta v \leftarrow v_f-v_{E1}$. In other words, the endpoint of the generated trajectory segment is assigned to the start point of a subsequent trajectory segment. This represented by the block 410 in FIG. 27.

However, the step of generating a new trajectory segment to bring the excessive acceleration down to $a_{max}$ is not necessary if the magnitude of the initial acceleration $a_0$, is less than or equal to $a_{max}$ and the control system moves to the next sub-problem.

Whatever the outcome of decision block 404 (i.e. whether or not the magnitude of the acceleration $a_0$ is greater than $a_{max}$), the algorithm proceeds to steps 408 and 410. Step 408 integrates the whole trajectory from the start point, including all of the trajectory segments in the output list. In the case where acceleration is excessive and a new trajectory segment has been generated in step 406, this segment is integrated. In the case where the acceleration is not excessive and a new trajectory segment has not been generated, the output list of trajectory segments is empty and the integration step at 408 will still proceed but not have any effect, so the resulting velocity $v_{E1}$ and acceleration $a_{E1}$ will be the same as the initial velocity $v_0$ and acceleration $a_0$.

Similarly to step 408, later steps of integrating the trajectory in steps 420 and 436 are applied irrespective of the outcome of the previous decision blocks. The step of integrating applies to the whole trajectory from the start point, whether or not a new trajectory segment has been added to the output list in the previous step.

B) Handle Trajectory Accelerating Away from the Desired Final Speed, $v_f$.

Figure 27:
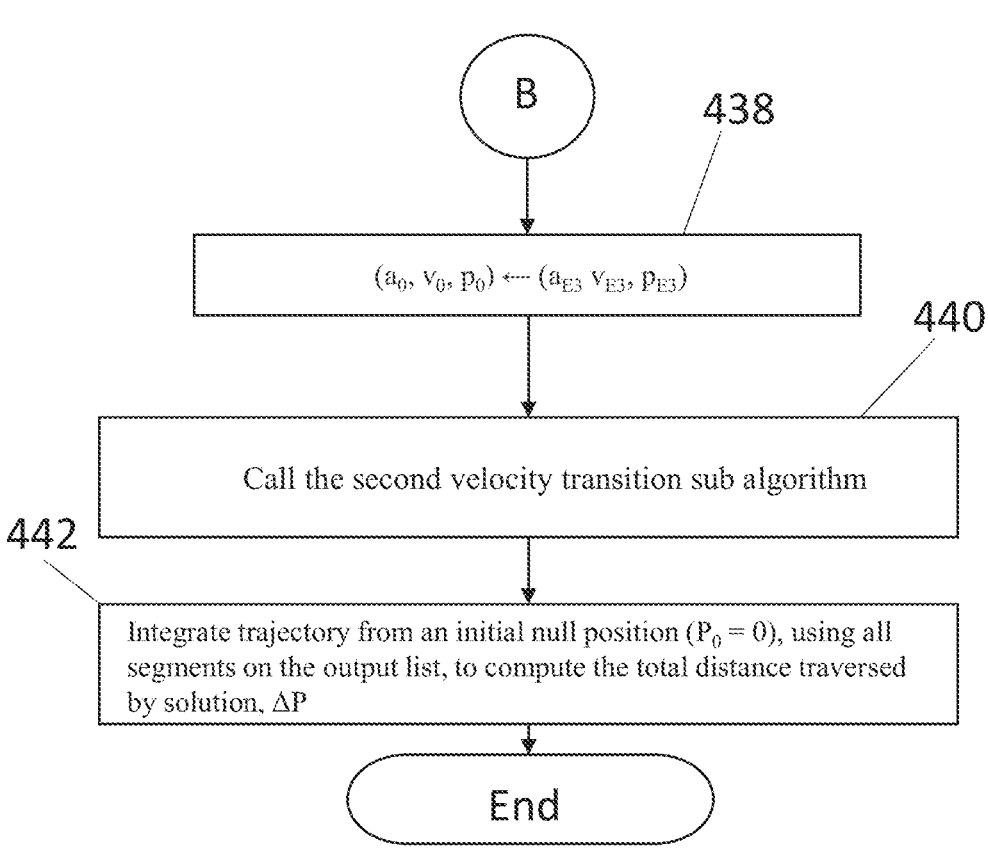
FIG. 27 is a flowchart of an example methodology of the first velocity transition sub algorithm according to an embodiment of the present invention.

This is represented by the decision blocks 414, and 416 in FIG. 27. The control system applies a decision making process to address the anomaly where the magnitude of the velocity is at $v_f$ but is accelerating away from $v_f$ 414 and/or the anomaly (condition) where the velocity is not at $v_f$ and is accelerating away from it 416. In the former anomaly 414, the control system decides whether velocity delta, $\Delta v$ is equal to zero, i.e. $\Delta v=0$, and the magnitude of the initial acceleration, $a_0$, is not equal to zero, i.e. $a_0 \neq 0$. If both these conditions are present, then this is an indication that the trajectory is accelerating away from the desired final velocity, $v_f$. If both conditions are not present, then the control system moves to decision block 416 and decides whether the trajectory is accelerating away from $v_f$. To determine whether this is the case, the control system determines whether the product of the magnitude of the initial trajectory acceleration, $a_0$, and the speed delta, $\Delta v$ is negative ($\Delta v \times a_0 < 0$) 416. If the product is negative, then this is an indication that the trajectory is accelerating away from the desired final velocity, $v_f$, i.e. moving in opposite directions. The product $\Delta v \times a_0$ will be negative if the sign of the acceleration $a_0$ is opposite to the sign of the velocity delta $\Delta v$, i.e. the trajectory is accelerating in the opposite direction to the direction required to reach the final velocity.

If, in either of the decision blocks 414 and 416, both of the conditions are affirmative in the sense that the trajectory is accelerating away from the desired final velocity, $v_f$, then a trajectory segment 418 must be generated to remedy this anomaly by reducing the trajectory acceleration to zero before the second sub velocity transition algorithm can be applied. For the new trajectory segment 418, The manipulated variable, jerk, used is $J=-\text{sign}(a_0)\times J_{red}$. The negative sign is necessary to reduce the acceleration to substantially zero.

The trajectory segment duration is given by $$T_2 = \frac{|a_0|}{j_{red}}$$

The magnitude of the endpoint acceleration is zero ($a_{E2}=0$). Starting from the initial position, $a_0$ and velocity, $v_0$, the endpoint velocity $v_{E2}$ and position $p_{E2}$ are thus obtained by the direct application of the trajectory equations (equation 3, 4 and 5) using the start point $(a_0, v_0, p_0)$, jerk, J and trajectory segment duration, $T_2$. This is shown in the flowchart as integrating 420 the trajectory from the start point $(v_0, a_0)$, using all segments on the output list, to compute the endpoint velocity and acceleration, $v_{E2}$ and $a_{E2}$.

If such a trajectory segment is generated in this step, then its endpoint becomes the initial trajectory point for the next sub-problem, i.e. $(a_0, v_0, p_0)$ $(a_{E2}, v_{E2}, p_{E2})$ and the velocity delta is recalculated accordingly to $\Delta v \leftarrow v_f-v_{E2}$, i.e. re-assigned the values 420, 422.

However, if both conditions are not affirmative in either of the decision blocks 414 and 416, then either the trajectory is at the $v_f$ and the acceleration is substantially zero or the trajectory is accelerating towards $v_f$, then the control system maintains the status quo of the initial trajectory point $(a_0, v_0, p_0)$ and moves to the next sub-problem.

C) Handle Trajectory Overshoots the Final Velocity

This third check is represented by the decision block 424 in FIG. 27. The first check in step A) ensured that the trajectory acceleration is not excessive, and the second check in step B) ensured that the trajectory is not accelerating in the "wrong" direction. So by that point the trajectory acceleration, a, will either be zero (in which case the third check will not do anything because the trajectory is not actually accelerating at that time) or the trajectory will be accelerating towards desired final velocity, $v_f$ (and may overshoot it). In this scenario, and before applying the second velocity transition sub algorithm, the control system as a final check, determines whether the trajectory is overshooting the desired final velocity, $v_f$. The decision making process begins with checking in decision block 424 whether the magnitude of the initial trajectory acceleration, $a_0$, is substantially equal to zero. If the magnitude of the initial trajectory acceleration, $a_0$, is substantially equal to zero then this is an indication that the conditions are valid to apply the second velocity transition sub algorithm. However, if the trajectory acceleration is not substantially equal to zero, there is a risk that the trajectory velocity may still be on the upward trajectory and may overshoot the desired trajectory final velocity, $v_f$. This check helps to catch this scenario when the third check is applied, and applies a trajectory segment that reduces the magnitude of the acceleration to zero only in the case that, in doing so, the trajectory velocity crosses and continues to move away from the desired final velocity, $v_f$.

If the trajectory velocity crosses and exceeds the desired final velocity, $v_f$, then the following remedial action is taken before applying the second velocity transition sub algorithm. Initially a tentative trajectory segment is computed in which the jerk applied is $J=J_{dec}$, as opposed to $J_{red}$ used in the previous two checks, but the tentative trajectory segment is not added to the output list. As Ja e, is applied later when transitioning the velocity to the desired final velocity, v f, in the second sub algorithm, then it makes sense to continue to use the same jerk value, Ja e, in the third check since the trajectory is also advancing towards the desired final velocity, $v_f$ and may overshoot it. The possibility that the trajectory velocity happens to overshoot $v_f$ (if the third check determines that it does overshoot) does not detract from using the same value of jerk that would be used if the trajectory were able to land on $v_f$ without overshooting it. The pre-emptive jerk, $J=J_{red}$, is used in special circumstances when the trajectory acceleration is excessive and/or the trajectory is accelerating in the wrong direction and needs to be brought back.

In step 426, the trajectory is integrated using the tentative trajectory segment, to calculate the resulting velocity $v_{aux}$ that the load handling device would achieve at the end of the tentative trajectory segment. This velocity is needed in the next step to calculate whether the trajectory has overshot the final velocity $v_f$.

In determining whether the trajectory velocity has overshot the final velocity $v_f$ in decision block 432, The speed delta, $\Delta v$, 428 which represents a velocity transition from the initial velocity, $v_0$, in the immediate previous check to the desired final velocity, $v_f$, is computed. Thus, $\Delta v$ represents the degree of overshoot of the initial velocity, $v_0$, from the desired final velocity, $v_f$.

The speed delta, $\Delta v_{aux}$, 430 represents a velocity transition from the endpoint velocity $v_{aux}$ of the tentative trajectory segment computed in step 426 to the desired final velocity, $v_f$. Thus, $\Delta v_{aux}$, represents the degree of overshoot of the presently computed $v_{aux}$ from the desired final velocity, $v_f$.

If the trajectory segment overshoots in the final check then the product of $\Delta v \times \Delta v_{aux}$ will be less than zero or negative ($\Delta v \times \Delta v_{aux} < 0$), i.e. one of the speed deltas $\Delta v$ or $\Delta v_{aux}$ is negative (see decision making block 432 in FIG. 27). If ($\Delta v \times \Delta v_{aux} < 0$), then this is a clear indication that the trajectory segment overshoots the desired final velocity, $v_f$. In this case, in step 434 the control system adds the tentative trajectory segment calculated earlier to the output list, in order to bring the magnitude of the acceleration to substantially zero. For the new trajectory segment (now no longer tentative):

The manipulated variable jerk value used is $J_{dec}$ as opposed to the pre-emptive jerk, $J_{red}$. Thus, the jerk applied is $J=-\text{sign}(a_0) \times J_{dec}$. The negative sign is necessary to reduce the acceleration to substantially zero, i.e. indicate a deceleration.

The trajectory segment duration is given by $T_3 = |a_0|/J_{dec}$.

The endpoint acceleration is zero ($a_{E3}=0$). Starting from the initial position, $a_0$ and velocity, $v_0$, the endpoint velocity $v_{E3}$ and position $p_{E3}$ are thus obtained by the direction application of the trajectory equations (equation 3, 4 and 5) using the start point ($a_0$, $v_0$, $p_0$), jerk, J and trajectory segment duration, $T_3$. This is shown in the flowchart as integrating 436 the trajectory from the start point ($v_0$, $a_0$), using all segments on the output list, to compute the resulting velocity and acceleration, $v_{E3}$ and $a_{E3}$. The endpoint velocity $v_{E3}$ is equal to $v_{aux}$.

Thus, the third check ensures that the acceleration reference, a, is ramped down to substantially zero and is prevented from accelerating further away from the desired final velocity, $v_f$. If the trajectory segment overshoots the desired final velocity, $v_f$, when the acceleration reference, a, is ramped down to zero, this condition is accepted. The purpose of the third check is to prevent the trajectory accelerating further away from the desired final velocity, $v_f$, —hence, the need to ramp the acceleration reference to substantially zero. Again, the endpoint becomes the initial trajectory point for the velocity transition algorithm, i.e. ($a_0$, $v_0$, $p_0$) ($a_{E3}$, $v_{E3}$, $p_{E3}$) 438 and the speed or velocity delta is recalculated accordingly to $\Delta v = v_f - v_{E3}$. The updated trajectory point then becomes the initial trajectory point for the next sub-problem.

If this trajectory segment does not overshoot the desired final velocity, $v_f$, then this trajectory segment is ignored altogether, i.e. no modification is needed to the initial trajectory point or to the speed delta, $\Delta v$.

Once the trajectory conditions are set (e.g. the magnitude of the acceleration is brought to substantially zero), which may involving generating one or more trajectory segments in the first velocity transition sub algorithm, then the control system moves on to the next stage of the velocity transition algorithm, the second velocity transition sub algorithm, 440 to transition the magnitude of the velocity to a desired final velocity. Finally, the total distance $\Delta p$ traversed by applying the first velocity transition sub algorithm can be determined by integrating all of the generated trajectory segments 442. The application of the second velocity transition sub algorithm is discussed further below in section 4.2.

Below are examples of the application of the first velocity transition sub algorithm for different scenarios of the trajectory. In all of these examples, SI units are used: distance is measured in metres, time in seconds, velocity in m/s, acceleration in m/s$^2$, and jerk in m/s$^3$.

Example 1

Take the example where the input values are:
Initial trajectory acceleration, $a_0=1.0$
Commanded Acceleration, $a_{max}=2.0$
Initial velocity, $v_0=1.0$
Desired final velocity, $v_f=1.1$
$\Delta v=v_f - v_0=0.1$
Jerk values, $J_{red}=J_{inc}=J_{dec}=0.1$
A) First question: Is acceleration excessive? No. $|a_0|=1.0$ and $|a_{max}|=2.0$ so the start acceleration $a_0$ is not excessive.

B) Second question: Is trajectory accelerating away from $v_f$? No. $\Delta v=0.1$ is a positive value and $a_0$ is a positive value, therefore the trajectory is accelerating towards $v_f$.

C) Third question: Will trajectory overshoot $v_f$ even if acceleration is ramped down to zero starting immediately? Yes Using the jerk value, $J_{dec}$ of 0.1 ramping $a_0$ to zero takes $T=|a_0|/J=1.0/0.1=10$ time units. While acceleration gets ramped to zero, the trajectory velocity will increase by $10*1.0/2=5.0$ (area of a right-angle triangle, base=10 time units, height is $a_0=1.0$). Therefore, even if the control system tries to ramp the trajectory acceleration to zero, the trajectory velocity will still go from $v_0=1.0$ to 6.0 therefore overshooting $v_f=1.1$.

In this example, the first two checks did not yield any action (no action was needed) but the third check definitely needs to be there in order to deal with the overshooting of $v_f$, otherwise you cannot call the second sub velocity transition algorithm (invalid start conditions).

Example 2

Commanded Acceleration, $a_{max}=2.0$
Initial acceleration, $a_0=-3.0$
Initial velocity, $v_0=1.0$
Desired final velocity, $v_f=3.0$ $$\Delta v=v_f-v_0=3.0-1.0=2.0$$

$J_{red}=1.0$
$J_{inc}=J_{dec}=0.5$

A) First question: Is acceleration excessive? Yes. $|a_0|=3.0$ is larger than $a_{max}$ so the control system must create a trajectory segment with $J=+J_{red}=+1.0$ whose duration is $T=|a_{max}-|a_0||/J_{red}=1.0/1.0=1.0$ The endpoint of this segment is $a_E$ (endpoint acceleration)$=-2.0$, $v_E$ (endpoint velocity)$=0.5$ Note that acceleration is still negative because all this step does is to reduce the magnitude of the acceleration so that it is no longer excessive (i.e. above $a_{max}$)

Re-compute $\Delta v=v_f-v_E=3.0-(0.5)=2.5$
Re-assign $a_0=-2.0$ and $v_0=0.5$

B) Second question: Is trajectory accelerating away from $v_f$? Yes. $\Delta v=2.5$ (positive value) and $a_0=-2.0$ (negative value), therefore the trajectory is accelerating away from $v_f$. So we must create a trajectory segment with $J=+J_{red}=+1.0$ whose duration is $T=|a_0|/J_{red}=2.0/1.0=2.0$ The endpoint of this segment is Acceleration, $a_E=0$, $v_E=-1.5$ Re-compute $\Delta v=v_f-v_E=3.0-(-1.5)=4.5$
Re-assign $a_0=0$ and $v_0=-1.5$ C) Third question: Will trajectory overshoot $v_f$ even if acceleration is ramped down to zero starting immediately? No, because acceleration is currently already zero.

In Example 2, the first two checks yielded action (one trajectory segment was generated by each) but the third check did not yield any action (no action was necessary). From the prior three queries, the trajectory has now ended up with valid conditions to proceed with the second velocity transition sub algorithm having an initial trajectory point of $a_0=0$, $v_0=-1.5$, and $v_f=3.0$, i.e. the acceleration has been ramped down to substantially zero. Application of the second velocity transition sub algorithm will create two further trajectory segments (because $a_{peak}$ turns out to be 1.5 which is lower than $a_{max}$), so as to bring the trajectory velocity to $v_f$ (and acceleration to zero). The calculation of $a_{peak}$ is fundamental to the application of the second sub velocity transition algorithm.

4.2 Application of the Second Velocity Transition Sub Algorithm

The inputs and the output of second velocity transition sub algorithm are shown in Table 2 below. Once the prior sub-problems discussed above have been addressed by the first velocity transition sub algorithm, then the control system is able to call the second velocity transition sub algorithm. The second velocity transition sub algorithm is the algorithm that actually carries out the (velocity) transition to $v_f$ regardless of the value of $v_f$. It is only called when certain specific start conditions discussed above have been addressed. These include but are not limited to the trajectory having excessive acceleration, and/or the trajectory accelerating away from the desired final velocity. These checks are performed by blocks 504, 506, 508, 510, in FIG. 28 and are described above. The purpose of the velocity transition algorithm is to generate the trajectory segments to arrive at the chosen velocity, $v_f$. The final velocity, $v_f$, can be any velocity of choice subject to the velocity constraints. However, if the velocity or speed delta, $\Delta v$, is substantially zero, in which case the magnitude of the trajectory velocity, $v_0$, is already at the desired final velocity, $v_f$, and the magnitude of the acceleration, $a_0$, is substantially zero, in which case, the trajectory is not accelerating away from the desired final velocity, $v_f$, then the conditions are already ideal to be at the desired final velocity. This is shown by the path from the decision block 506 to the end of the flowchart (FIG. 28) in the second velocity transition sub algorithm.

In accordance of the present invention, it was found that a useful concept for the purpose of the second velocity transition sub algorithm is that of the velocity delta, $\Delta v$, which is defined as the difference between the desired final velocity, $v_f$, and the initial velocity, $v_0$. The value of the initial velocity, $v_0$, is dependent on the endpoint velocity reference, $v_E$, assigned to the initial velocity, $v_0$, in the first velocity transition sub algorithm discussed above. Referring to the flowchart 500 shown in FIG. 28, the value of a peak trajectory acceleration a Na k, is computed 514 and represents the acceleration value at the apex of an imaginary triangle whose area is given by $\Delta v$ and whose sides are defined by the rate of increase of acceleration (away from zero acceleration) Jane and rate of decrease of acceleration (towards zero acceleration) $J_{dec}$ (see FIG. 29). In other words, ape is the acceleration value at the apex of a triangle-looking shape that can be drawn using a rate of acceleration magnitude increase Jane and rate of acceleration magnitude decrease $J_{dec}$ such that the area of the shape corresponds or is equivalent to $\Delta v$. Arrival at box 514 is incumbent on the conditions in decision boxes 504, 508 and 510 being fulfilled, i.e. (i) $\Delta v\neq0$; (ii) $\Delta v\times a_0\geq0$; and (iii) $|A_0|\leq_{max}$–valid start conditions. The conditions ought to be fulfilled, because the trajectory has already been through the first velocity transition sub-algorithm so any anomalies of excessive acceleration and/or trajectory accelerating away from final velocity ought to have been dealt with by adding trajectory segments to the output list.

TABLE 2

| Inputs and outputs of application of the second velocity transition sub algorithm. Second Velocity Transition sub algorithm |
| --- |
| Inputs: |
| Initial Velocity $v_0$ <br> Initial Acceleration $a_0$ <br> Maximum acceleration $a_{max}$ ($a_{max} > 0$) <br> Acceleration magnitude increase jerk $J_{inc}$ ($J_{inc} > 0$) <br> Acceleration magnitude decrease jerk $J_{dec}$ ($J_{dec} > 0$) <br> Final Velocity $v_f$ <br> Output: |
| List of contiguous trajectory segments, each characterised by <br> A jerk value (J), and <br> A time duration (T) <br> Definitions: |
| $\Delta v = v_f - v_0$ |

Figures 29, 30:
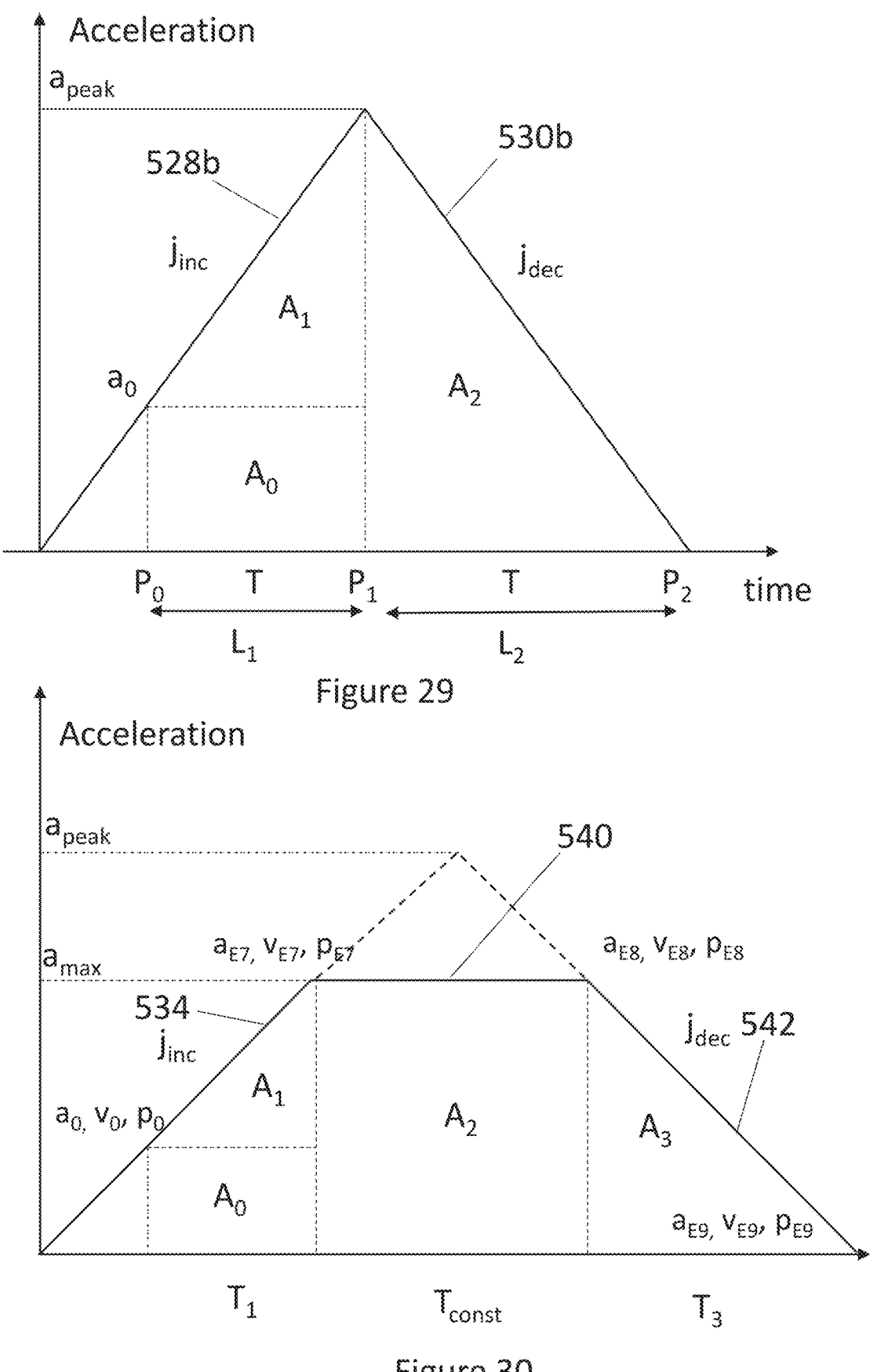
FIG. 29 is a schematic imaginary triangle of the magnitude of the trajectory acceleration depicting the back to back velocity transitions according to an embodiment of the present invention.
FIG. 30 is a schematic imaginary trapezoidal of the magnitude of the trajectory acceleration depicting multiple velocity transitions according to an embodiment of the present invention.

In detail, given the initial acceleration $a_0$, initial velocity $v_0$ (defined by the output of the first velocity transition sub algorithm), desired final velocity $v_f$, velocity delta $\Delta v = v_f - v_0$, and specific values of jerk to increase ($J_{inc}$) and decrease ($J_{dec}$) the magnitude of the trajectory acceleration, it is possible to draw an imaginary "triangular acceleration trajectory" (see FIG. 29) for which the area to the right of $a_0$ is equivalent to $\Delta v$. In other words, carrying out such a triangular-shaped change of the acceleration signal would bring $v_0$ to of (irrespective of the number of trajectory segments), thus solving the second velocity transition sub problem. From first principles, taking the area under the imaginary triangular acceleration trajectory to be equivalent to delta velocity, $\Delta v$, then:

$$A_0 + A_1 + A_2 = \Delta v \tag{7}$$

where $A_0$, $A_1$, and $A_2$ are the areas illustrated in FIG. 29. Let $a_{peak}$ be the value of acceleration at the apex of this imaginary triangle. The fraction of the total area below the triangle which corresponds to $\Delta v$ can be expressed as a sum of three smaller areas, $\Delta v = A_0 + A_1 + A_2$, where:

$$A_0 = L_1 a_0 \tag{8}$$

$$A_1 = L_1 \frac{(a_{peak} - a_0)}{2} \tag{9}$$

$$A_2 = L_2 \frac{(a_{peak})}{2} \tag{10}$$

$$L_1 = \frac{(a_{peak} - a_0)}{j_{inc}} \tag{11}$$

$$L_2 = \frac{(a_{peak})}{j_{dec}} \tag{12}$$

Solving for $a_{peak}{}^2$:

$$\Delta v = A_0 + A_1 + A_2 \tag{13}$$

$$\Delta v = L_1 a_0 + L_1 \frac{(a_{peak} - a_0)}{2} + L_2 \frac{(a_{peak})}{2} \tag{14}$$

$$\Delta v = \frac{L_1}{2}(a_{peak} + a_0) + L_2 \frac{a_{peak}}{2} \tag{15}$$

$$\Delta v = \frac{1}{2 j_{inc}}(a_{peak} + a_0)(a_{peak} - a_0) + \frac{1}{2 j_{dec}} a_{peak}^2 \tag{15}$$

-continued $$\Delta v = \frac{1}{2 j_{inc}}\left(a_{peak}^2 - a_0^2\right) + \frac{1}{2 j_{dec}} a_{peak}^2 \tag{16}$$

$$\Delta v = \frac{j_{dec}}{2 j_{inc} j_{dec}}\left(a_{peak}^2 - a_0^2\right) + \frac{j_{inc}}{2 j_{inc} j_{dec}} a_{peak}^2 \tag{17}$$

$$2 j_{inc} j_{dec} = \left[j_{dec}\left(a_{peak}^2 - a_0^2\right)\right] + j_{inc} a_{peak}^2 \tag{18}$$

$$2 j_{inc} j_{dec} \Delta v = (j_{inc} + j_{dec}) a_{peak}^2 - j_{dec} a_0^2 \tag{19}$$

$$(2 j_{inc} j_{dec} \Delta v) + \left(j_{dec} a_0^2\right) = (j_{inc} + j_{dec}) a_{peak}^2 \tag{20}$$

The magnitude of the peak acceleration, $|a_{peak}{}^2|$, can thus be obtained by taking the square root of the following:

$$a_{peak}^2 = \frac{(2 j_{inc} j_{dec} \Delta v) + \left(j_{dec} a_0^2\right)}{j_{inc} + j_{dec}} \tag{21}$$

Once the magnitude of the peak acceleration, $a_{peak}$, has been computed from equation 21, one of three mutually exclusive possibilities may be true, each of which is described in detail below:

A) Initial Acceleration Magnitude, $a_0$, Matches that of Peak Acceleration, $a_{peak}$ If the magnitude of the initial acceleration is equal to the peak acceleration 516, i.e. $|a_0| = |a_{peak}|$, then the trajectory is already at the peak acceleration, so it only needs to ramp the acceleration down (decelerate) to zero in order to reach the desired final velocity, $v_f$.

In this case a single trajectory segment 518 is generated for which:

i) The manipulated variable (jerk) value is $J = -\text{sign}(a_0) \times J_{dec}$ to bring the acceleration down, ii) The trajectory segment duration is given by $$T = \frac{|a_0|}{J_{dec}},$$

and iii) The endpoint acceleration is zero ($a_{E4} = 0$), the endpoint velocity is $v_{E4} = v_f$ and the endpoint position $p_{E4}$ is obtained by direct application of the trajectory equations (equation 3, 4, and 5) using the start point ($a_0$, $v_0$, $p_0$), jerk, $j_{dec}$ and segment duration, T.

B) Peak Acceleration Magnitude, $a_{peak}$, is Smaller than or Equal to that of the Maximum Acceleration, $a_{max}$ (Commanded Acceleration)

If the magnitude of the peak acceleration is smaller than 526 that of the maximum acceleration, i.e. $|a_{peak}| < a_{max}$, then the magnitude of the trajectory acceleration can still be increased to $|a_{peak}|$ and then it needs to be ramped back down to zero, at which point the desired final velocity, $v_f$ will be met.

Thus, in this case, two trajectory segments 528, 530 would need to be generated and can be demonstrated by the imaginary triangle in FIG. 29 showing a first trajectory segment 528b to the peak acceleration and a second trajectory segment 530b to ramp back down to substantially zero.

For the first trajectory segment 528b,

The manipulated variable (jerk) value used is $J=S \times J_{inc}$.

The sign S depends on whether the initial acceleration, $a_0=0$, is positive or negative. As shown in the flowchart, if the initial acceleration, $a_0$, is substantially equal to zero then the sign, S, bears the same sign as the initial velocity, $v_0$, as the trajectory segment would need to ramp up or down the trajectory acceleration depending on the direction of the trajectory velocity in order to reach the final velocity, $v_f$. If, however, the initial acceleration, $a_0$, is not equal to zero, then the sign, S, bears the sign of the initial acceleration in order to ramp up or down the trajectory acceleration in order for the magnitude of the velocity to reach the final velocity, $v_f$.

The first trajectory segment duration is $T=|a_{peak}-a_0|/J_{inc}$

The endpoint acceleration is the peak acceleration ($a_{E5}=a_{peak}$), and endpoint velocity $v_{E5}$ and position $p_{E5}$ are obtained by direct application of the trajectory equations (equation 3, 4 and 5) using start point $a_0$, $v_0$, $p_0$, jerk, $J=j_{inc}$ and segment duration T.

Re-assign its endpoint to the initial trajectory point for the second trajectory segment generation, i.e. $(a_0, v_0, p_0) \leftarrow (a_{E5}, v_{E5}, p_{E5})$.

For the second trajectory segment 530b,

The manipulated variable (jerk) value is $J=S \times j_{dec}$.

The second trajectory segment duration is $T=|a_{peak}|/J_{dec}$

The endpoint acceleration is substantially zero ($a_{E6}=0$), and endpoint velocity $v_{E6}$ and position $p_{E6}$ are obtained by direct application of the trajectory equations (equation 3, 4, and 5) using initial trajectory point $a_{E5}$, $v_{E5}$, $p_{E5}$, jerk $j_{dec}$ and segment duration T.

C) Peak Acceleration Magnitude is Greater than that of the Maximum Acceleration, $a_{max}$ It follows on from when $|a_{peak}| < a_{max}$ is not the case, then $|a_{peak}|$ must be greater than $a_{max}$. If the magnitude of the peak acceleration is bigger than that of the maximum acceleration, i.e. $a_{peak} > a_{max}$, then the magnitude of the trajectory acceleration must be increased all the way to $a_{max}$, it must then be kept at $a_{max}$ for some time, and then finally it needs to be ramped back down to zero in time to meet the desired final velocity $v_f$. In other words, the acceleration trajectory will look like a trapezoid. Thus, in this case, two or three trajectory segments may be generated depending on whether the magnitude of the trajectory acceleration is already equal to $a_{max}$ or whether it is still below it.

The value of the variation in the velocity due to the acceleration ramp down from $a_{max}$ to zero is computed first by substituting $a_{peak}=a_0=a_{max}$ in equation 21 to obtain:

$$\Delta v_{dec} = \frac{a_{max}^2}{2 j_{dec}} \tag{22}$$

For which, the (time) length of the constant acceleration phase denoted by $T_{const}$ in FIG. 30 can be computed as well:

$$T_{const} = \frac{|\Delta v| - \Delta v_{dec}}{a_{max}} \tag{23}$$

where:

$|\Delta v|$ is the magnitude of the velocity transition from the initial velocity, $v_0$, at the start of the constant acceleration phase, to the desired final velocity, $v_f$. The total area $A_2+A_3$ under the constant acceleration phase and acceleration ramp down trajectory segments 540 and 542 as shown in FIG. 30 is the velocity delta $\Delta v=v_0-v_f$ (where $v_0$ is the velocity at the start of the constant acceleration phase). The area $A_3$ under the acceleration ramp down segment 542 is $\Delta v_{dec}$ as calculated in equation 22. The area $A_2$ can be calculated by subtracting the area $A_3$ from the total area, so $A_2=\Delta v-\Delta v_{dec}$. From the area $A_2$, the duration $T_{const}$ can be calculated by dividing the area by the acceleration $a_{max}$, as in equation 23.

If $|a_0| < a_{max}$ then three trajectory segments must be generated. This is shown in FIG. 28 by the decision block 532 and the additional trajectory segment 534 generated on top of the trajectory segments 540 and 542 in FIG. 28, and demonstrated by the imaginary trapezoidal shape in FIG. 30.

For the first trajectory segment 534 over the duration $T_1$ in FIG. 30:

The manipulated variable (jerk) value used is $J=S \times J_{inc}$,

The trajectory segment duration is given by $$T_1 = \frac{|a_{max} - a_0|}{j_{inc}},$$

and

The endpoint acceleration is the max acceleration ($a_{E7}=\text{sign}(a_0) \times |a_{max}|$), and endpoint speed $v_{E7}$ and position $p_{E7}$ are obtained by direct application of the trajectory equation (3, 4 and 5) using start point $a_0$, $v_0$, $p_0$, jerk $j_{inc}$ and segment duration $T_1$.

Re-assign its endpoint to the initial trajectory point for the second trajectory segment generation, i.e. $(a_0, v_0, p_0) \leftarrow (a_{E7}, v_{E7}, p_{E7})$.

For the second trajectory segment 540 over the duration $T_2$—shown as $T_{const}$ in FIG. 30:

The manipulated variable (jerk) value used is zero,

The segment duration is given by $T_2=T_{const}$ given by equation 23, and

The endpoint acceleration is the max acceleration ($a_{E8}=a_0$) (noted that $a_0=a_{E7}$ from previous calculation), and endpoint speed $v_{E8}$ and position pa are obtained by direct application of the trajectory equations using start point $a_{E7}$, $v_{E7}$, $p_{E7}$, zero jerk and segment duration $T_2=T_{const}$.

Re-assign its endpoint to the initial trajectory point for the second trajectory segment generation, i.e. $(a_0, v_0, p_0) \leftarrow (a_{E8}, v_{E8}, p_{E8})$.

For the third trajectory segment 542 over the duration $T_3$ in FIG. 30:

The manipulated variable (jerk) value used is $J=-S \times j_{dec}$,

The segment duration is given by $$T_3 = \frac{a_{max}}{j_{dec}},$$

and

The endpoint acceleration is zero ($a_{E9}$=0), the endpoint velocity is $v_{E9}$=$v_f$ and the position $p_{E9}$ is obtained by direct application of the trajectory equations (equations 3, 4, and 5) using start point $a_{E8}$, $v_{E8}$, $p_{E8}$, jerk $j_{dec}$ and segment duration $T_3$.

If, however, $a_0$=$a_{max}$ from the first velocity transition sub algorithm, then only two trajectory segments 540, 542 must be generated: a first trajectory segment at $a_{max}$ for time, $T_{const}$ and a second trajectory segment to ramp the acceleration from $a_{max}$ down to zero. This is shown in the trajectory as a "no" decision branch from the decision block 532 $|a_0|<a_{max}$ in the flowchart, and the two trajectory segments added are represented by the blocks 540 and 542 in FIG. 28 and FIG. 30. This is because if $|a_0|<a_{max}$ is "no", then the obvious choice would be that $|a_0|$=$a_{max}$, since one of the three checks discussed above when applying the velocity transition algorithm is whether the magnitude of the initial acceleration is greater than $a_{max}$, $|a_0|>a_{max}$, i.e. excessive acceleration and to bring $a_0$ to $a_{max}$ (see block 406 in FIG. 27).

For $|a_0|$=$a_{max}$, the ramp up to the maximum acceleration, $a_{max}$, is ignored in FIG. 30 and the magnitude of the trajectory acceleration is already at the maximum acceleration, $a_{max}$.

For the first trajectory segment 540 over the duration $T_{const}$:

The manipulated variable (jerk) value used is zero,

The segment duration is given by $T_2$=$T_{const}$, and

The endpoint acceleration is the peak acceleration ($a_{E8}$=$a_0$), and endpoint speed $v_{E8}$ and position $p_8$ are obtained by direct application of the trajectory equations using the start point $a_0$, $v_0$, $p_0$, zero jerk and segment duration $T_2$.

For the second trajectory segment 542 over the duration $T_3$:

The manipulated variable (jerk) value used is j=-S×$j_{dec}$,

The trajectory segment duration is given by $$T_3 = \frac{a_{max}}{j_{dec}},$$

and

The endpoint acceleration is zero ($a_{E9}$=0), the endpoint speed is $v_{E9}$=$v_f$ and the position $p_{E11}$ is obtained by direct application of the trajectory equations (equation 3, 4, and 5) using start point $a_{E8}$, $v_{E8}$, $p_{E8}$, jerk $j_{dec}$ and segment duration $T_3$.

The second velocity transition sub algorithm according to the present invention terminates when the desired final velocity, $v_f$, is reached. The desired final velocity, $v_f$, can have any value, e.g. substantially zero when instructed to move to a standstill at the commanded position.

EXAMPLE

Figure 31:
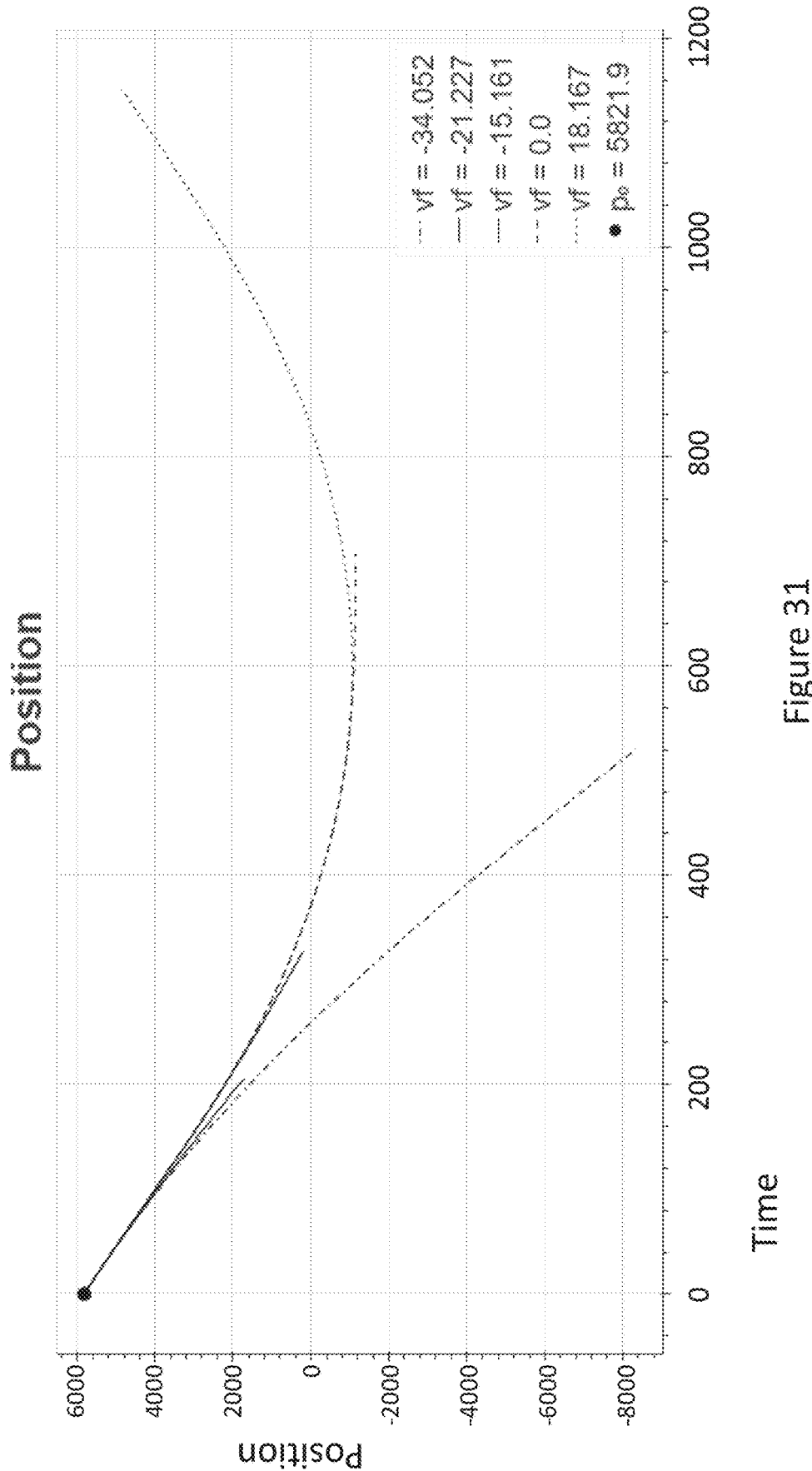
FIG. 31 (a to d) is the trajectory profiles when applying the velocity transition algorithm for different desired velocities, $v_f$, according to an embodiment of the present invention.
Figure 31:
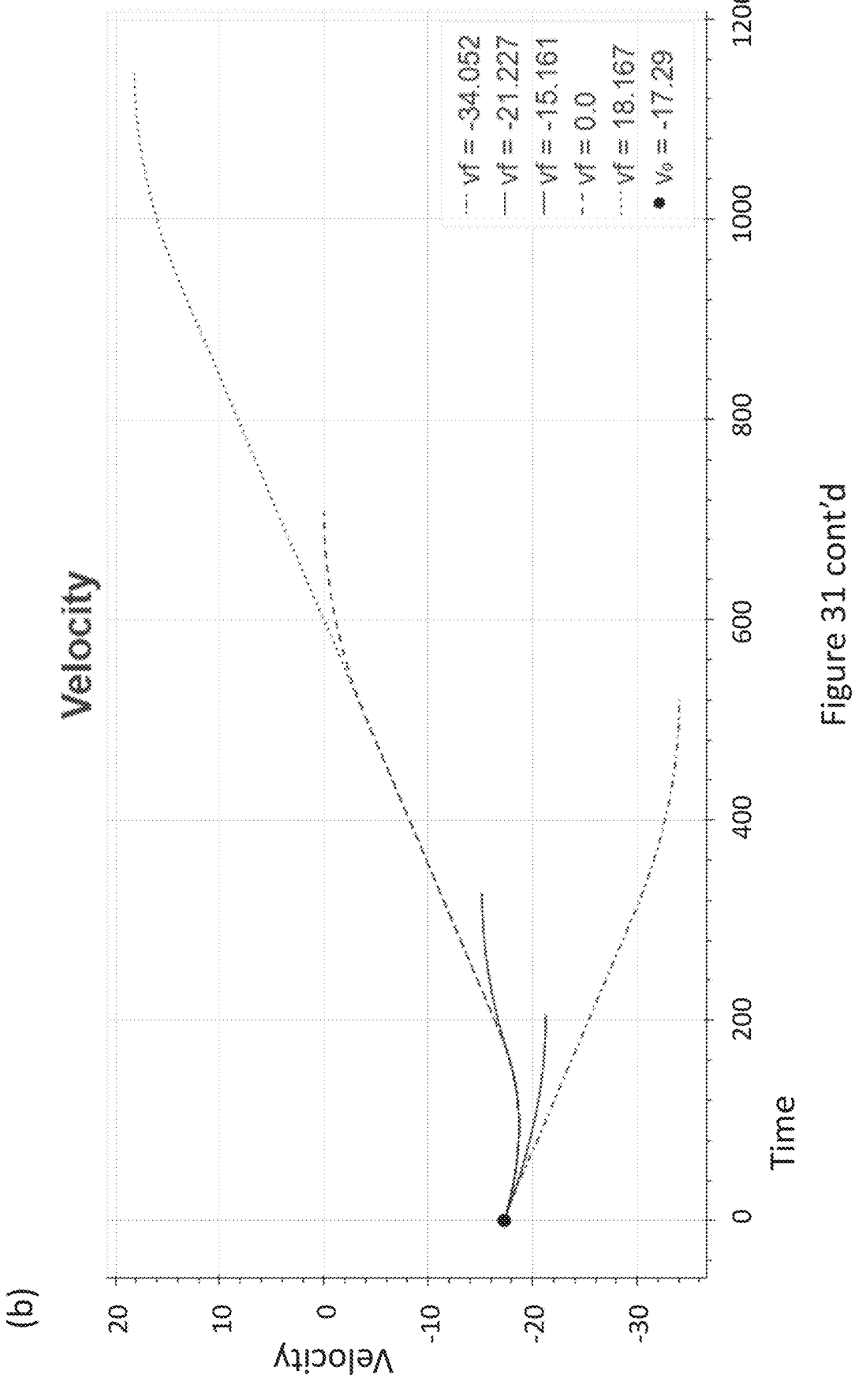
Figure 31:
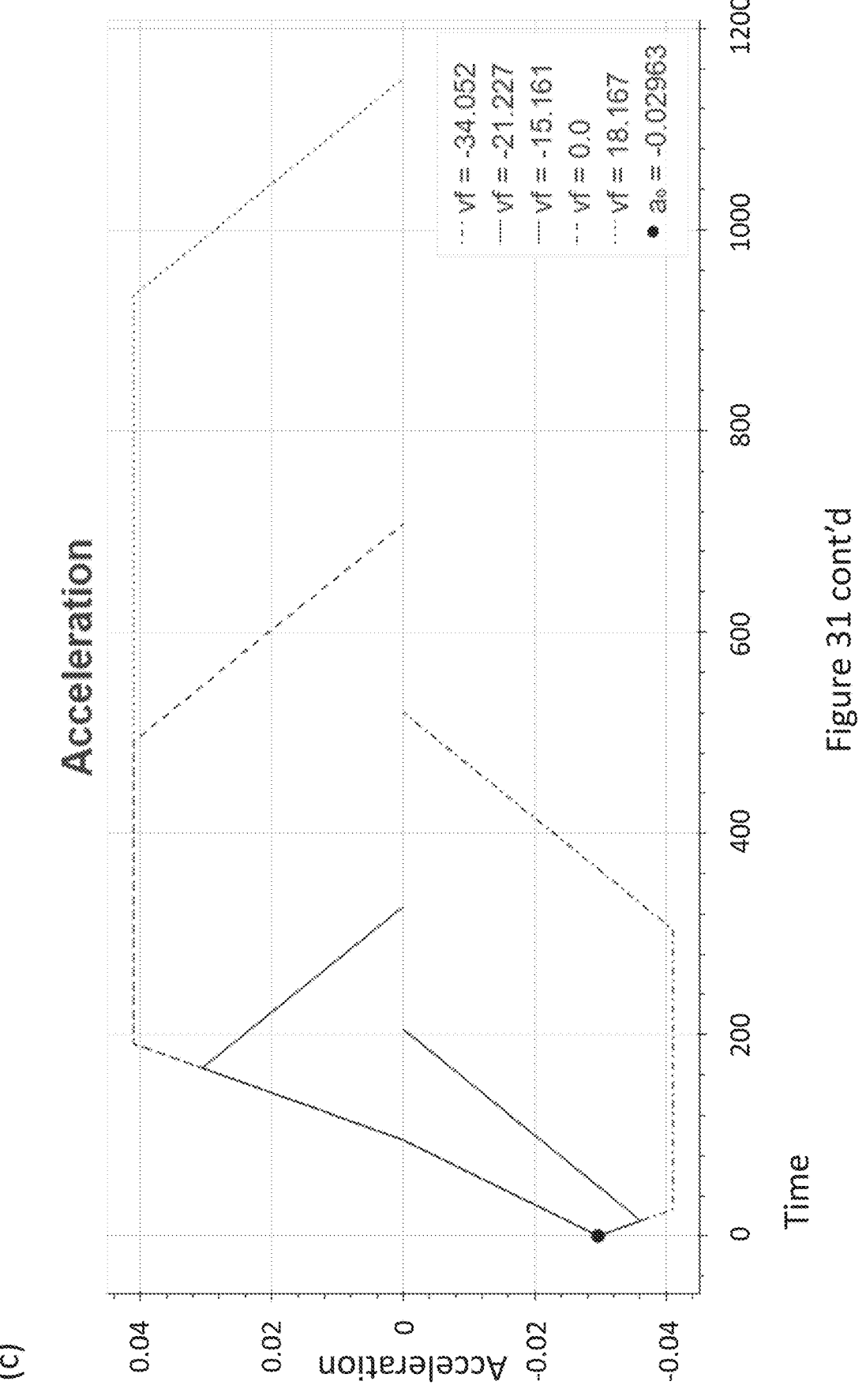
Figure 31:
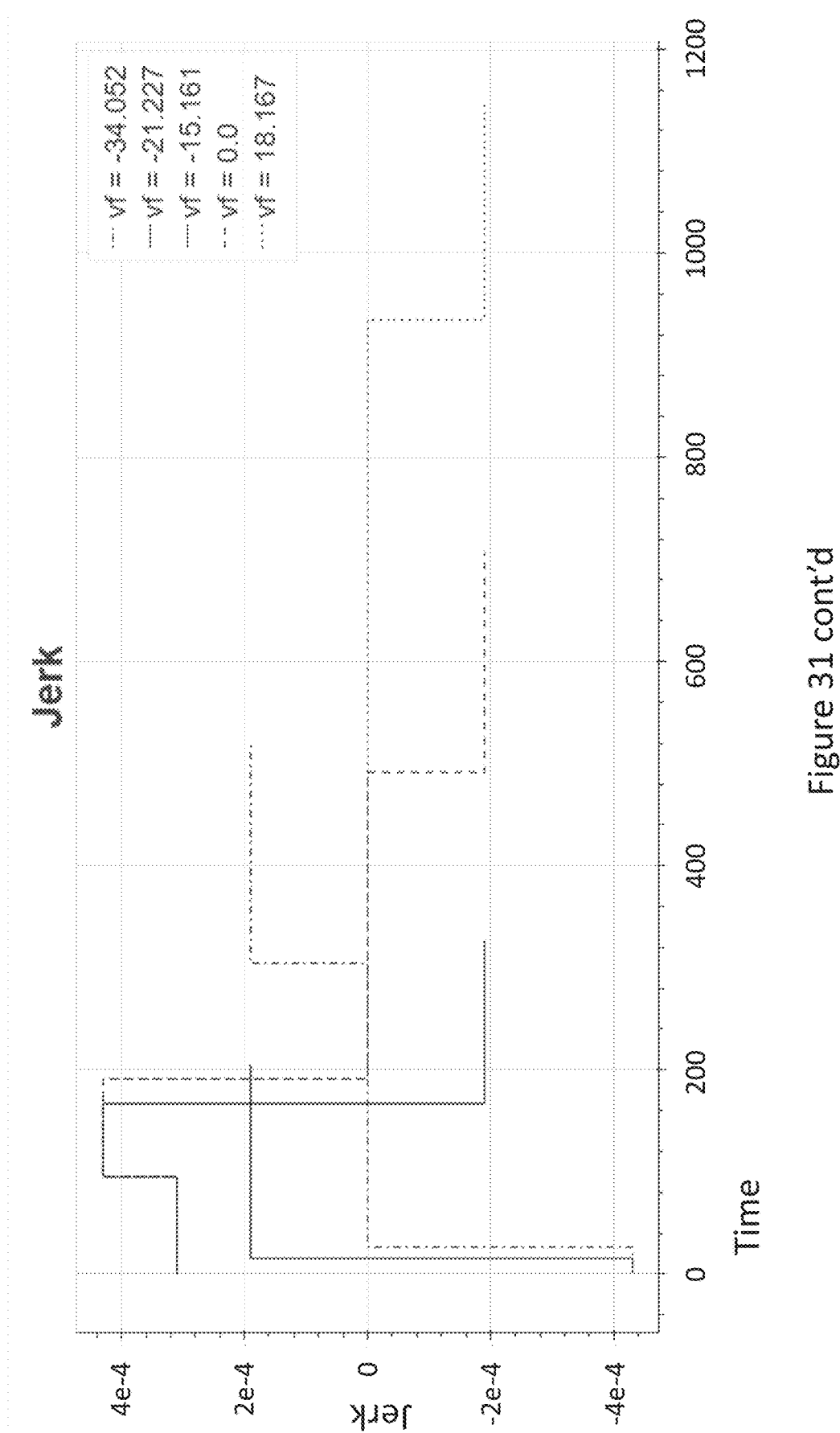

FIG. 31 (a to d) show various trajectory or motion control profiles generated when applying the velocity transition algorithm according to the present invention when transitioning to different final velocities, $v_f$, ranging from −34.052 to 18.167. All of the generated profiles share the same starting point, ($p_0$, $v_0$, $a_0$). It is clearly apparent in FIG. 31(a), that transitioning to the different final velocities, $v_f$, results in different lengths of travel and therefore, different position references which in turn results in different deviations from the commanded position. The number of trajectory segments in the generation of the trajectory is dependent on the value of the final velocity, $v_f$, with up to four trajectory segments being generated (see FIG. 31d). The trajectory or motion control profile is used by the controller to generate or calculate the feedforward torque demand discussed in Section 2.0 above.

5.0 Root—Finding Algorithm

It is essential when generating the trajectory or motion control profile that the trajectory velocity is controlled in a way that the trajectory lands at the commanded position without undershooting or overshooting and in the shortest possible time. For example, in circumstances where the trajectory distance is of a relatively short length giving little time for the load handling device to reach the commanded velocity, $v_{max}$, then the trajectory would need to undergo a number of velocity transitions from the initial start position throughout the trajectory so as to reach the commanded position precisely without undershooting or overshooting. This involves the trajectory travelling to a peak velocity, $v_{peak}$, in the trajectory and then ramping back down to the desired final velocity, $v_f$.

Finding the desired peak velocity, $v_{peak}$, to travel to but not exceeding the commanded velocity, $v_{max}$, such that the load handling device can complete the trajectory in the shortest possible time becomes a challenge. In accordance with an embodiment of the present invention, a root finding algorithm is employed to predict a "sweet spot" velocity (root) between the initial velocity, $v_0$, and the maximum velocity constraint, $v_{max}$, where the objective function represents the deviation of the trajectory from the commanded position, i.e. at the trajectory point where the endpoint trajectory acceleration and endpoint velocity is substantially zero. The use of the root finding algorithm is not restricted to when the trajectory is at the beginning of the motion control profile. Depending on one or more circumstances of the trajectory, e.g. one or more constraints or commanded position, the motion profile generator can re-generate the motion control profile in response to one or more circumstances being different to any one of the initial one or more circumstances. This re-generation of the motion control profile can be instructed whilst in the acceleration phase and/or the deceleration phase of the motion control profile. In this instance, the root finding algorithm can be applied in the regeneration stage of the motion control profile in the prediction of the "sweet spot" velocity for the remaining distance to travel to the commanded position.

The use of the root finding algorithm is not restricted to the trajectory velocity; the root finding algorithm can be applied to different parameters of the trajectory. For example, the root finding algorithm can be applied to finding the ideal trajectory acceleration or deceleration to reach the commanded position in the shortest possible time and/or without overshooting.

In the case where the parameter is the trajectory velocity, the root finding algorithm is applied in conjunction to the velocity transition algorithm discussed above to investigate different peak velocities, $v_{peak}$, for which the trajectory segments to arrive at different trajectory velocities are generated. The root finding algorithm will use the results of the trajectory segments generated by the velocity transition algorithm to determine the degree of overshoot or undershoot from the commanded position. So for example for the "peak velocity search" problem, this translates to the root-finding algorithm trying out different values of the "desired peak velocity" $v_{peak}$, and together with the application of the velocity transition algorithm, searching for the value of $v_{peak}$ for which the overshoot is substantially zero. In accordance with the present invention, the root finding algorithm will call the velocity transition algorithm in circumstances when the desired final velocity, $v_f$, is within the limits of the commanded velocity, $v_{max}$ and can be increased to the commanded velocity.

For each call of the velocity transition algorithm by the root finding algorithm, one or more trajectory segments are generated to move the magnitude of the velocity to the desired peak velocity, $v_{peak}$, and back down to the desired final velocity, $v_f$.

Figure 32:
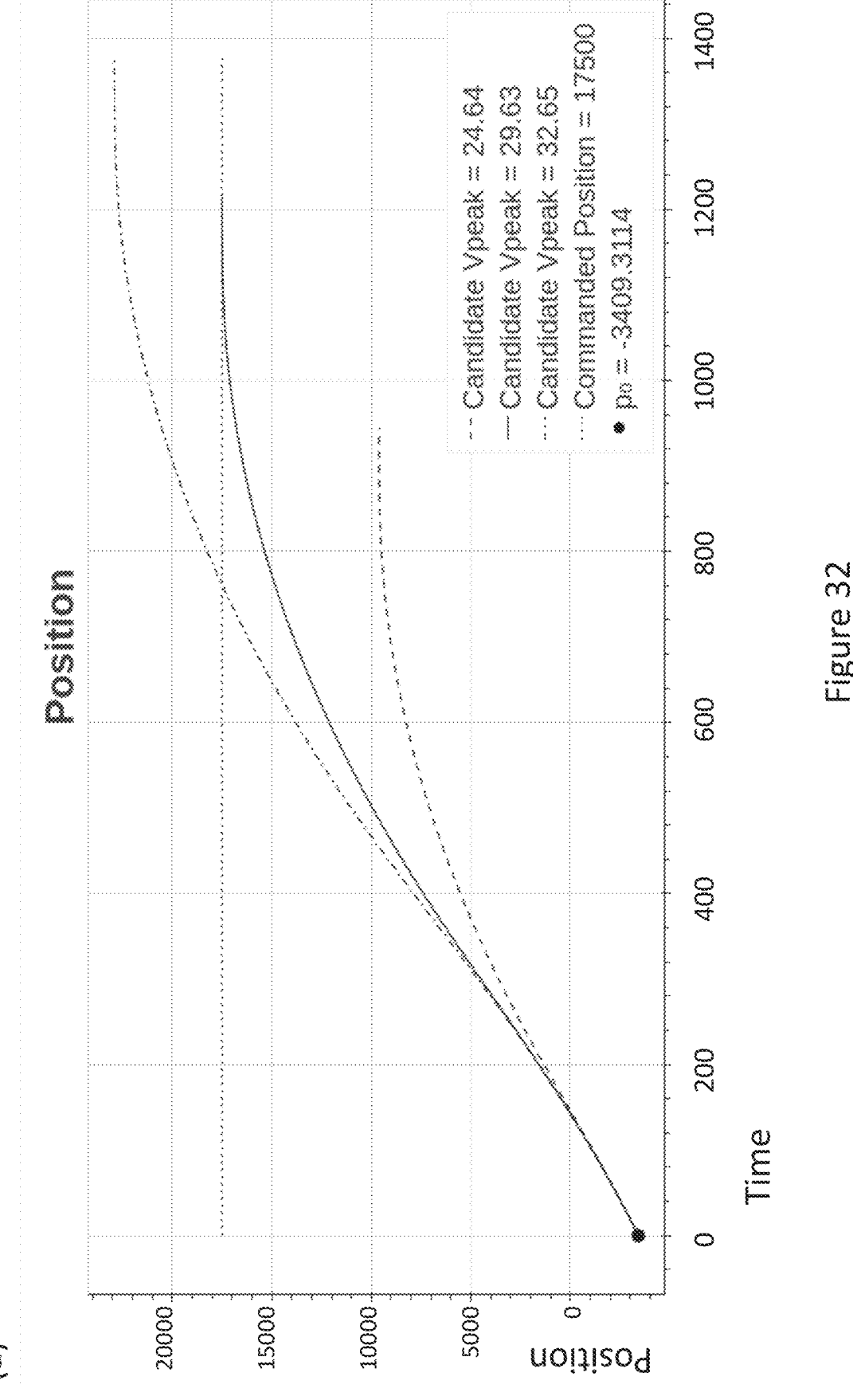
FIG. 32 (a to c) is the trajectory profiles when applying the root finding algorithm in conjunction with the velocity transition algorithm for different peak velocities, $v_{peak}$, according to an embodiment of the present invention.
Figure 32:
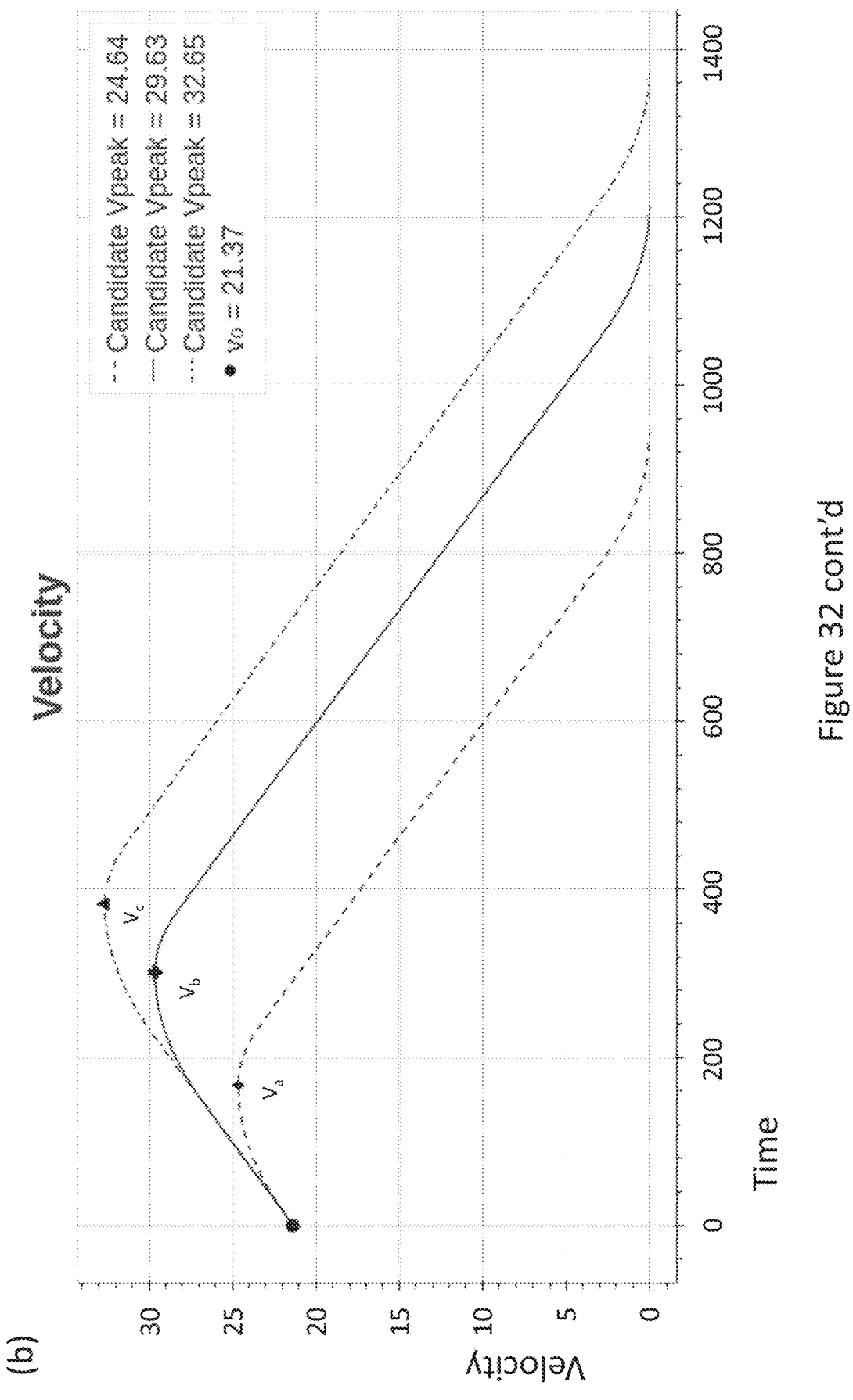
Figure 32:
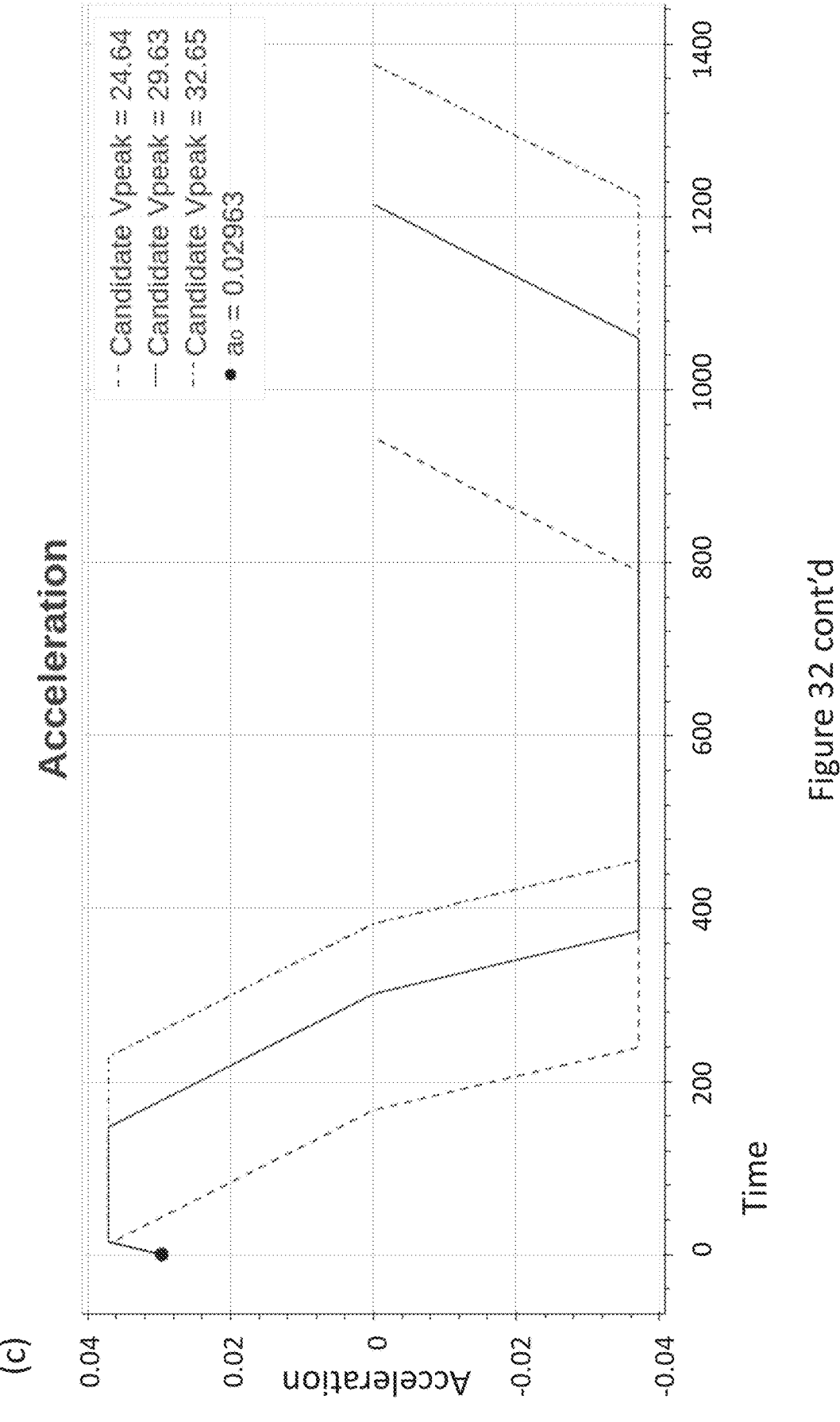

Take the example shown in FIG. 32, where a desired peak velocity, $v_{peak}$, is required to travel from an initial position, $p_0$, to the commanded position where the final velocity, $v_f$, and acceleration is substantially zero. The top profile (FIG. 32a) represents the magnitude of the position reference as a function of time, the middle profile (FIG. 32b) represents the magnitude of the velocity reference as a function of time and the bottom profile (FIG. 32c) represents the magnitude of the acceleration reference as a function of time. FIG. 32 shows multiple velocity trajectory profiles at different "chosen" peak velocities between a relatively low peak velocity, $v_A$, to a relatively larger peak velocity, $v_C$. The root finding algorithm is employed to find an ideal peak velocity, $v_{peak}$, between the upper limit corresponding to the commanded velocity, $v_{max}$, and the lower limit, $v_0$, such that the trajectory completes the point to point move from a given initial start point to a given endpoint without overshooting or undershooting (see FIG. 32b). For the purpose of explanation of the present invention, the term "deviation" from the commanded position is broadly construed to cover the trajectory undershooting or overshooting the commanded position. In the example shown in FIG. 32, for each candidate peak velocity, $v_{peak}$, two velocity transitions would be taking place;

1) A first velocity transition from an initial velocity, $v_0$, to the desired peak velocity (say, $v_A$), and;
2) A second velocity transition from an initial velocity, $v_A$ (peak velocity $v_A$ being reassigned to the initial velocity), to the desired final velocity, $v_f$, corresponding to substantially zero.

Figure 33:
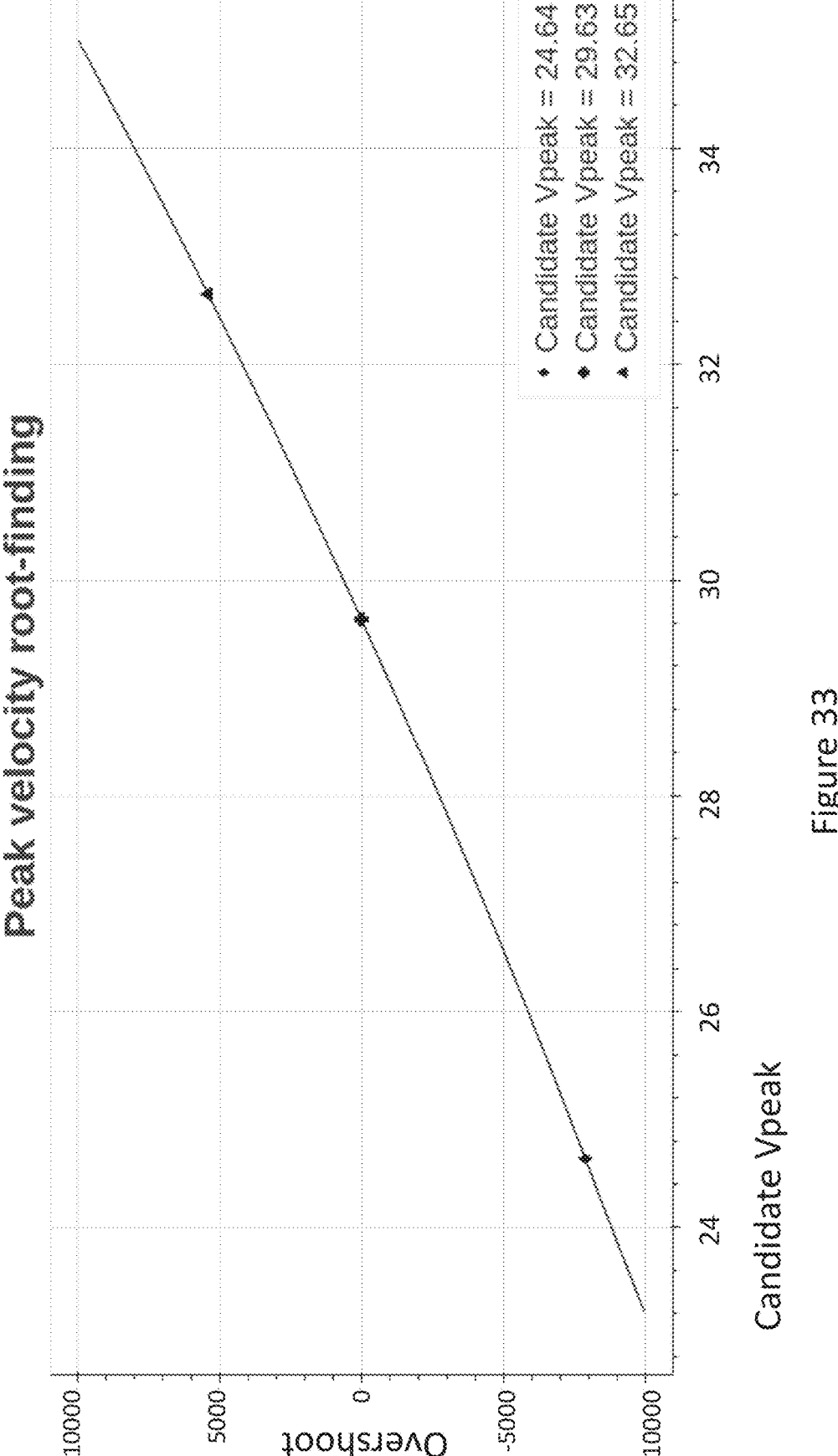
FIG. 33 is a plot of the objective function of the root finding algorithm versus the different peak velocity in FIG. 32 according to an embodiment of the present invention.

At each iteration of the root finding algorithm, the trajectory segments are generated by applying the first and second velocity transitions to determine the degree of deviation from the commanded position, i.e. the trajectory segments are integrated by applying the trajectory equations (3, 4 and 5) to generate an accumulated endpoint position, $p_E$. The deviation of the accumulated end point for successive values of velocity peaks from the commanded position represents the degree of undershoot or overshoot from the commanded position, i.e. deviation. Thus, each iteration of the root finding algorithm together with applying the velocity transition algorithm produces a successively more accurate approximation of the root, in this case, the desired peak velocity, $v_{peak}$. Another way of viewing this, is that one or more velocity transition algorithms are nested within each iteration of the root finding algorithm. For each iteration of the root finding algorithm, at least one velocity transition algorithm is applied to determine the necessary trajectory segments computed to transition to the peak velocity, $v_{peak}$ and thus, the degree of deviation from the commanded position. The "sweet spot" velocity as shown in the plot of deviation versus velocity in FIG. 33, shows a desired peak velocity, $v_{peak}$, between the magnitudes of the initial velocity to the commanded velocity where the deviation is substantially zero. In the particular example shown in FIG. 33, the "sweet spot" velocity where the objective function is substantially zero is 29.63.

The trajectory or motion control profile that constitutes the trajectory segments generated by the velocity transition algorithm when transitioning to the "root" velocity such that the final velocity, $v_f$, is substantially zero at the commanded position can be termed the optimal motion control profile or optimal trajectory. The application of the root finding algorithm is not just restricted to the finding an optimal peak velocity, the root finding algorithm is also called upon in an embodiment of the present invention to find an optimal deceleration constraint such that when applying the velocity transition algorithm discussed above, the trajectory is able to decelerate effectively so as to land on the commanded position. Further detail of the application of the root finding algorithm to find an optimal deceleration constraint is discussed below in section 7.0.

6.0 Reverse Back

There may be situations where the trajectory overshoots the commanded position. This could be that the commanded position has suddenly changed or brought closer to the load handling device or the travel distance to the commanded position was so short that the duration of the trajectory segments is such that the time taken to reach the desired final velocity, $v_f$, may be too long causing an overshoot. The generation of the trajectory for the reverse back to the commanded position is very similar to the generation of the trajectory when moving towards the commanded position, in the sense that the root finding algorithm is used in conjunction with the velocity transition algorithm to determine the desired peak velocity, $v_{peak}$ such that the trajectory segments are generated when transitioning to the desired peak velocity, $v_{peak}$, and from desired peak velocity, $v_{peak}$ to a final velocity, $v_f$ having a magnitude equal to substantially zero, i.e. the trajectory reverses back to the commanded position. If the overshoot from the commanded position is long, then the magnitude of the trajectory velocity can be increased all the way to maximum velocity constraint, $v_{max}$, before ramping down to the commanded position. In both cases of the overshoot, the velocity transition algorithm is applied to transition back to the commanded position.

7.0 Forced Deceleration

The inputs to the trajectory are regularly revisited by the control system and one or more of the constraints may be updated depending on whether there has been a change of the trajectory, e.g. visit a different destination or grid cell or the presence of an obstacle on the grid structure. One or more of the changes may include the commanded position and may cause the trajectory generator to re-generate the trajectory based on an updated commanded position. The updated commanded position may result in the trajectory terminating closer than originally anticipated. A deceleration trajectory is thus required such that the trajectory velocity and acceleration are substantially zero at the updated commanded position. The deceleration allows the controller or control system to apply the necessary torque demand to decelerate the load handling device to the updated commanded position, i.e. a braking force. In a particular embodiment of the present invention, a forced deceleration algorithm is applied to the trajectory which involves the use of the velocity transition algorithm discussed above to transition the velocity from a current or initial velocity to a substantially zero final velocity, $v_f$. This may involve generating one or more trajectory segments using a forced deceleration, FD, constraint instead of the commanded acceleration to force the deceleration of the trajectory such that the trajectory acceleration and velocity are substantially zero at the updated commanded position.

The inputs to the forced deceleration algorithm are shown in Table 3 below:

TABLE 3

Inputs and outputs of the forced deceleration algorithm
Trajectory Generation with Forced Deceleration Inputs:

Initial Position $P_0$
Initial Velocity $v_0$
Initial Acceleration $a_0$
Final/Updated Position $P_f$
Maximum velocity $v_{max}$ ($v_{max}$ >0)
Maximum accel magnitude during decel phase $D_{max}$ ($D_{max}$ >0)
Decrease accel magnitude during accel phase jerk $J_2$ ($J_2$ >0)
Increase accel magnitude during decel phase jerk $J_3$ ($J_3$ >0)
Decrease accel magnitude during decel phase jerk $J_4$ ($J_4$ >0)
Forced Deceleration accel magnitude lower limit $FD_{min}$ ($FD_{min}$ >0)
Forced Deceleration accel magnitude upper limit $FD_{max}$ ($FD_{max}$ >0)
Output:

List of contiguous trajectory segments describing the next steps the trajectory must
take in order to reach the final position, each segment characterised by
A jerk value (J), and
A time duration (T)

The values of the FD upper limit, $FD_{max}$ can be different or substantially the same as the commanded acceleration and depends on the tolerance of the motor. In the case of the load handling device, $FD_{max}$ is dependent on the tolerance of the drive mechanism of the wheel assembly and/or the stability of the load handling device on the grid structure. The control system will decide from the computed endpoint position, $p_E$, whether the trajectory undershoots or overshoots the updated commanded position depending on whether the upper limit forced deceleration, $FD_{max}$ or the lower limit forced deceleration, $FD_{min}$ is being used to generate the additional trajectory segment(s) when applying the velocity transition algorithm.

Application of the forced deceleration is summarised in the flowchart 600 shown in FIG. 34. Subsequent to the input constraint 602, the process begins with performing one or more decision making processes to determine whether the trajectory can be forced to decelerate using either FDmax or FDmin before computing a suitable deceleration constraint through application of a root finding algorithm. The first two decision making processes of the forced deceleration algorithm require bringing the trajectory into a condition to apply the velocity transition algorithm to transition the magnitude of the trajectory velocity to substantially zero, i.e. $v_f$=0. In the order shown in the flowchart, the first check 604 involves the decision making process of whether the velocity is being increased. If the trajectory velocity is increasing, then the control system applies the appropriate jerk constraint, $J_4$, to generate a single trajectory segment 606 to ramp the acceleration, $a_0$, to substantially zero to prevent any further increase in the velocity. For example, a single trajectory segment is generated as follows:

The manipulated variable (jerk) value used is $J=J_4$,

The segment duration is given by $$T = \frac{a_0}{J},$$

and
The endpoint acceleration is the peak acceleration ($a_{E1}$=0), and endpoint speed $v_{E1}$ and position $p_{E1}$ are obtained by direct application of the trajectory equations (3, 4 and 5) using start point $a_0$, $v_0$, $p_0$, $J=J_4$ and segment duration T.

The endpoint of the trajectory segment is re-assigned 608 to the start point of the next trajectory segment ($a_0$, $v_0$, $p_0 \leftarrow a_{E1}$, $v_{E1}$, $p_{E1}$).

If it is not increasing, the control system proceeds to the next decision making process 610 to determine whether the initial deceleration is excessive by determining whether the magnitude of the trajectory acceleration is greater than forced deceleration maximum constraint, i.e. $|a_0|$>$FD_{max}$. If the magnitude of the acceleration is excessive, then the control system generates a single trajectory segment 612 to ramp the magnitude of the acceleration to substantially match the forced deceleration constraint, $FD_{max}$.

For example, a single trajectory segment is generated as follows:

The manipulated variable (jerk) value used is $J=J_4$,
The segment duration is given by $$T = \frac{FD_{max} - a_0}{J},$$

and
The endpoint acceleration is the peak acceleration ($a_{E2}$=$FD_{max}$), and endpoint speed $v_{E2}$ and position $p_{E2}$ are obtained by direct application of the trajectory equations using start point $a_0$, $v_0$, $p_0$, $J=J_4$ and segment duration T.

The endpoint of the trajectory segment is re-assigned 614 to the start point of the next trajectory segment ($a_0$, $v_0$, $p_0 \leftarrow a_{E2}$, $v_{E2}$, $p_{E2}$).

Now that the trajectory acceleration is not being increased and does not have excessive acceleration, the next three decision making processes 616, 620, 624 involve applying the velocity transition algorithm to make the velocity transition to the desired final velocity, $v_f$, i.e. the endpoint velocity having a magnitude substantially equal to the desired final velocity, $v_f$. The decision making process moves onto deciding whether applying the velocity transition algorithm using the forced deceleration constraint, $FD_{max}$, would cause the trajectory to land on the commanded position 616. If affirmative, then one or more trajectory segments are generated by determining $\Delta v$ using the velocity transition algorithm 618 to transition the magnitude of the velocity transition from an initial velocity, $v_0$ to a desired final velocity, $v_f$, equated to substantially zero (where the acceleration constraint is equated to $FD_{max}$). If not, then the forced deceleration, FD max may not be sufficient or may be too aggressive. If when applying the forced deceleration, $FD_{max}$, to the trajectory is not considered sufficient and would cause the trajectory to still overshoot 620 the updated commanded position, then the only option would be that the control system would need to apply the "reverse back" 622 discussed in section 6.0 to recover from the overshoot, and thereby land on the updated commanded position. A trajectory segment is generated to reduce the magnitude of the trajectory acceleration to $FD_{max}$. Then, one or more trajectory segments are generated to return from the overshoot by determining $\Delta v$ through applying back-to-back velocity transition algorithms. This involves applying a first velocity transition algorithm to transition the magnitude of the velocity transition from an initial velocity, $v_0$ to a desired peak velocity, $v_{peak}$, and an endpoint position, $p_E$. A second velocity transition algorithms is then applied to ramp down from the peak velocity, $v_{peak}$, such that endpoint position, $p_E$, when applying the second velocity transition is at the commanded position.

If, however, when applying the velocity transition algorithm using maximum forced deceleration, $FD_{max}$, the trajectory position undershoots, then the maximum forced deceleration, FD max, may be considered too aggressive. In this instance, a gentler forced deceleration constraint, $FD_{min}$, would need to be applied to the trajectory, i.e. applying the velocity transition algorithm using FD m j n as the commanded acceleration. If applying the velocity transition algorithm using the lower limit forced deceleration, $FD_{min}$, causes the trajectory position to undershoot or land on the updated commanded position 624, then the velocity transition algorithm 626 is applied using $FD_{min}$ (where the magnitude of the trajectory acceleration is reduced to $FD_{min}$). In the case when using $FD_{min}$, the trajectory undershoots, then the magnitude of the trajectory velocity has reached such a low limit beyond the ability of using the $FD_{min}$ to land at the updated commanded position, i.e. the desired final velocity, $v_f$, reaches substantially zero at an endpoint before the commanded position.

If when applying the velocity transition algorithm, the upper forced deceleration, $FD_{max}$ causes the trajectory to undershoot the commanded position but applying the lower limit forced deceleration, $FD_{min}$ would cause the trajectory to overshoot the commanded position, then there is a forced deceleration constraint, FD, between $FD_{max}$ and $FD_{min}$ that could be applied to cause the trajectory to land on the commanded position. In this circumstance, the control system proceeds to the root finding algorithm 628 to determine a forced deceleration constraint, FD, to allow the trajectory to land on the final position, i.e. when $v_f$ is substantially zero. The root finding algorithm is applied between the limits of forced deceleration, $FD_{max}$ as the upper limit and $FD_{min}$ as the lower limit. The objective function is the degree of positional deviation from the final position when a chosen forced deceleration constraint is applied between the upper and lower limit of forced deceleration constraint. At each successive iteration of the root finding algorithm, the velocity transition algorithm is applied to transition the trajectory from an initial start point to a desired final velocity, $v_f$, where $v_f$ is substantially zero, using the chosen forced deceleration constraint to determine the accumulated endpoint position, $p_E$, i.e. integrate trajectory from an initial position, $p_0$, using all segments on the output list, to compute the total distance traversed by solution, $\Delta P$. The endpoint position, $p_E$, will provide an indication of the 'deviation' from the commanded position, i.e. when the final velocity, $v_f$, is substantially zero. Each iteration of the root finding algorithm produces a successively more accurate approximation to the root—in this case, the forced deceleration, FD. The onus is on the control system to determine the correct forced deceleration, FD, using the root finding algorithm when applied in conjunction with the velocity transition algorithm to transition the trajectory velocity to the final velocity, $v_f$. Once the root is determined, the forced deceleration, FD is applied to the trajectory to transition the velocity from an initial start point to the endpoint where $v_f$ is substantially equal to zero.

Whilst the particular embodiment described above is in relation to a robotic load handling device operable on a grid structure, it will be appreciated that the generation of the trajectory or motion control profile can be applicable to other motive devices or robotic devices that require a motive move. For example, the generated trajectory can be used to control the point-to-point motion of a robotic arm.

It will be appreciated that the methodologies shown and described above are not limited by the order of the blocks, as some blocks may occur in different orders and/or concurrently with other blocks from what is depicted and described herein. It can be appreciated that various other branches, flow paths, and orders of the blocks may be implemented which achieve the same result.

Example of Application of the Velocity Transition Algorithm

Figure 35:
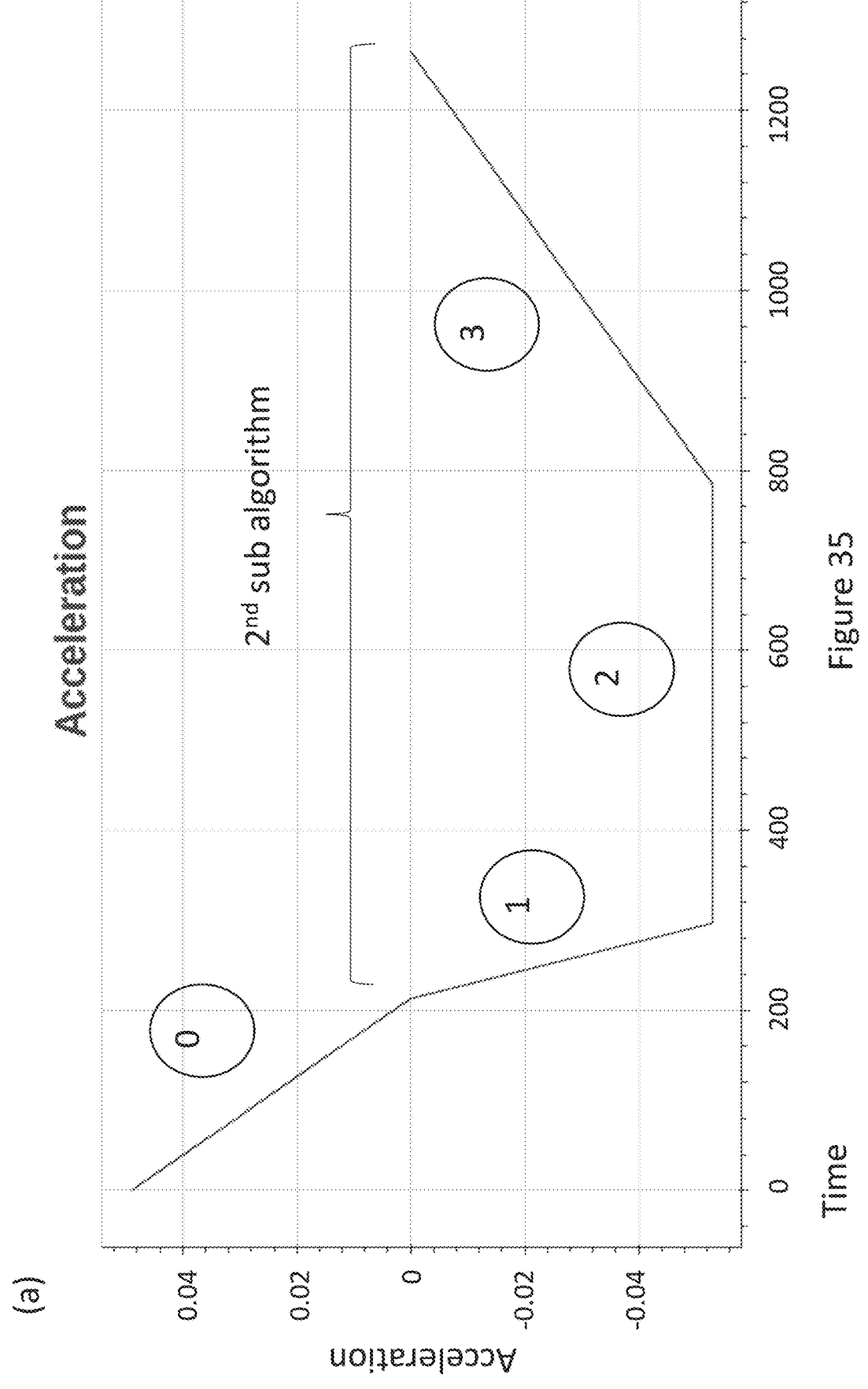
FIG. 35 (a to c) is a schematic view of an example of the trajectory profiles.
Figure 35:
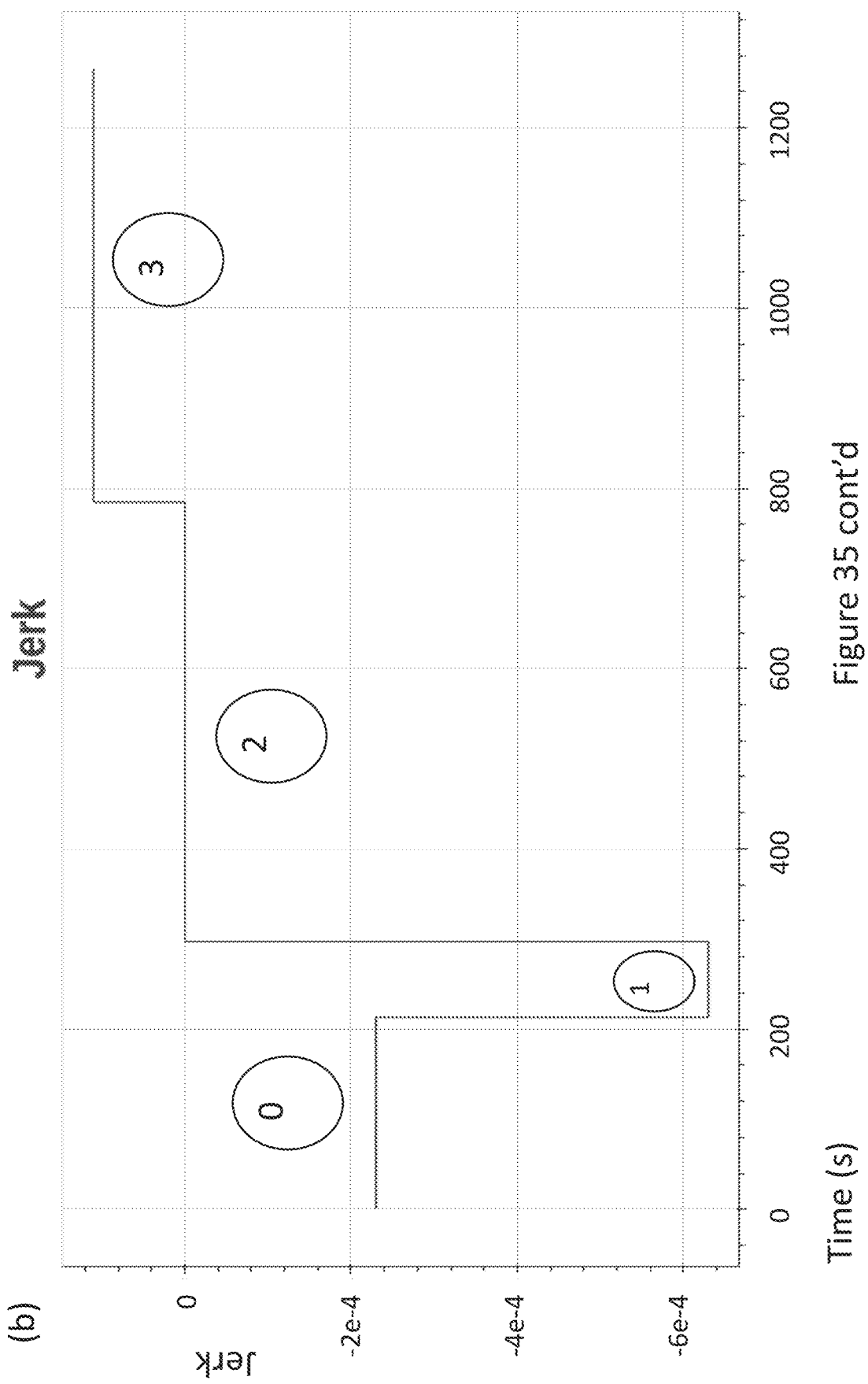

An application of the velocity transition algorithm according to the present invention can be demonstrated by the trajectory plots shown in FIG. 35 (a to c). The trajectory represents a transition from an initial velocity reference, $v_0$, to a desired final velocity reference, $v_f$. In the particular example of the present invention shown in the velocity plot in FIG. 35c, the velocity transition is from an initial velocity reference, $v_0$, +18, to a desired final velocity, $v_f$, −16. For ease of explanation, the trajectory reaches the desired final velocity, $v_f$, at the commanded position. The plots are broken down into stages 0, 1, 2, and 3 to represent the different trajectory segments needed to transition the velocity reference to the desired final velocity, $v_f$.

Initially, the magnitude of the acceleration is $+v_e$ and therefore, the trajectory is accelerating away from the desired final velocity, $v_f$, i.e. in the opposite direction (note that the desired final velocity is negative). Applying the first velocity transition sub algorithm:—

A) First question: Is acceleration excessive? No.

B) Second question: Is trajectory accelerating away from $v_f$? Yes.

To address the second question, the first stage of the application of the first velocity transition sub algorithm represented by stage 0 in the trajectory plot is the generation of a trajectory to ramp down the magnitude of the trajectory acceleration to zero to prevent the trajectory accelerating further away from the desired final velocity, $v_f$. This is shown by the acceleration plot shown in FIG. 35*a*. The initial velocity delta is given by $\Delta v_0$ shown in the velocity plot in FIG. 35*c*.

A trajectory segment is generated during this stage and the endpoint of the trajectory segment thus generated becomes the initial trajectory point for the next sub-problem, i.e. $(a_0, v_0, p_0) \leftarrow (a_E, v_E, p_E)$, and the velocity delta is calculated accordingly: $\Delta v_1 \leftarrow (v_f - v_E)$.

C) Third question: Will trajectory overshoot $v_f$ even if acceleration is ramped down to zero starting immediately? No, because acceleration has been ramped down to zero already by the trajectory segment applied in response to the previous question.

Once the first velocity transition sub algorithm has been applied, the trajectory is in a condition to apply the second velocity sub algorithm. Stages (1), (2) and (3) shown in the trajectory plot represent the generation of trajectory segments in the application of the second velocity transition sub algorithm.

Application of the second velocity transition sub algorithm involves the calculation of the peak acceleration, $a_{peak}$, from equation (21) given the initial velocity reference. In this particular example, the peak acceleration, $a_{peak}$, is bigger than that of the maximum acceleration. As a result, the application of the second velocity transition sub algorithm involves increasing the acceleration all the way to $a_{max}$, it must be kept at $a_{max}$ for some time, and then finally it needs to be ramped back down to zero in time to meet the desired final velocity, $v_f$. In other words, this part of the trajectory covered by the three trajectory segments 1, 2, and 3 will look like a trapezoid.

The first trajectory segment represented by (1) in FIG. 35*a* involves increasing the acceleration all the way to the maximum commanded acceleration, $a_{max}$, by applying a jerk value. This results in a velocity delta, $\Delta v_2 \leftarrow (v_f - v_E)$, and the end point of the trajectory segment is assigned to the initial trajectory point for the next sub-problem, i.e. $(a_0, v_0, p_0) \leftarrow (a_E, v_E, p_E)$.

The second trajectory segment represented by (2) involves maintaining the acceleration at the maximum acceleration, $a_{max}$, for some time by equating the jerk value to zero. As a result, the velocity varies linearly for the time duration when the acceleration is at the maximum acceleration, $a_{max}$, at which point the magnitude of the acceleration is reduced as the trajectory enters the final stage (3). This results in a velocity delta, $\Delta v_3 \leftarrow (v_f - v_E)$, and the end point of the trajectory segment is assigned to the initial trajectory point for the next sub-problem, i.e. $(a_0, v_0, p_0) \leftarrow (a_E, v_E, p_E)$.

The third and final trajectory segment represented by (3) involves applying a jerk value to reduce the magnitude of the acceleration in time to meet the desired final velocity, $v_f$. The final trajectory segment reduces the velocity reference until the desired final velocity $v_f$ is reached. This is shown in FIG. 35*c* by a gentle slope to the desired final velocity, $v_f$.

The invention claimed is:

1. A load handling device configured for lifting and moving one or more containers stacked in a storage system including a grid framework structure supporting a plurality of tracks arranged in a grid pattern to define a grid structure above the one or more stacks of containers, the grid pattern including a plurality of grid cells and each of the one or more stacks of containers being located within a footprint of only a single grid cell, the load handling device comprising:

i) a wheel assembly including a first pair and a second pair of wheels, the wheel assembly being driven by a drive mechanism;

ii) a lifting device for lifting a storage container from one of the stacks of containers into a container receiving space of the load handling device;

iii) a position detection means for measuring a position of the load handling device relative to the grid structure; and iv) a controller in communication with the position detection means and the drive mechanism, the controller being configured to control movement of the load handling device from a current position to a commanded position on the grid structure by:

a) determining a feedforward torque demand on the wheel assembly at a given time from a predetermined motion control profile; and b) compensating the feedforward torque demand from a measured position of the load handling device on the grid structure at the given time to calculate a torque demand on the wheel assembly.

2. The load handling device of claim 1, wherein the controller is configured to compensate the feedforward torque demand by:

i) determining a feedback torque demand on the wheel assembly from the measured position of the load handling device; and ii) combining the feedforward torque demand with the feedback torque demand to calculate the torque demand on the wheel assembly.

3. The load handling device of claim 1, wherein the predetermined motion control profile comprises:

one or more trajectory segments in a sequence, the one or more trajectory segments being respective portions of the motion control profile prescribing at least one of a jerk reference, an acceleration reference, a velocity reference and a position reference as a function of time.

4. The load handling device of claim 3, wherein the controller is configured to determine the feedforward torque demand from a magnitude of the acceleration reference and/or a magnitude of the velocity reference.

5. The load handling device of claim 3, wherein any one of the jerk reference, and/or the acceleration reference, and/or the velocity reference and/or the position reference are stored in a look-up table.

6. The load handling device of claim 3, wherein controller is configured to determine the feedback torque demand from a comparison between a magnitude of the position reference derived from the predetermined motion profile and a measured position of the load handling device on the grid structure at the given time.

7. The load handling device of claim 6, wherein the controller is configured to perform a PI or a PID calculation on a difference between a magnitude of the trajectory position reference and a measured position.

8. The load handling device of claim 1, wherein each wheel of the first and second pair of wheels is configured to be independently driven by the drive mechanism.

9. The load handling device of claim 8, wherein each wheel of the wheel assembly comprises:

a hub motor.

10. The load handling device of claim 1, wherein the driving means is configured to at least partially drive at least one of the wheels of the wheel assembly in order to meet the calculated torque demand.

11. The load handling device of claim 1, wherein the driving means is configured to at least partially brake at least one of the wheels of the wheel assembly in order to meet the calculated torque demand.

12. The load handling device of claim 8, wherein the controller is configured to share the calculated torque demand amongst each wheel of the wheel assembly.

13. The load handling device of claim 12, wherein the controller is configured to share the calculated torque demand between the first and second pair of wheels of the wheel assembly.

14. The load handling device of claim 13, wherein the controller is configured to vary a proportion of the calculated torque demand that is provided by the first and the second pair of wheels.

15. The load handling device of claim 13, wherein the controller is configured to transfer a greater proportion of the calculated torque demand to the first pair of wheels when the first pair of wheels is behind the second pair of wheels in a direction of travel of the load handling device.

16. The load handling device of claim 14, wherein the controller is configured to transfer a greater proportion of the calculated torque demand to the second pair of wheels when the second pair of wheels is in front of the first pair of wheels in a direction of travel of the load handling device.

17. The load handling device of claim 14, wherein the controller is configured to share the calculated torque demand between the first and second pair of wheels of the wheel assembly in a ratio based on a magnitude of the trajectory acceleration reference derived from the predetermined motion control profile.

18. The load handling device of claim 12, comprising:
means for measuring a kinematic state of the load handling device when on a grid structure.

19. The load handling device of claim 18, wherein the controller is configured to determine the kinematic state of the load handling device when on a grid structure from the position measuring means.

20. The load handling device of claim 18, wherein the kinematic state is velocity.

21. The load handling device of claim 18, comprising:
a drive wheel encoder coupled to each of the wheels of the wheel assembly for measuring a speed of each of the wheels of the wheel assembly.

22. The load handling device of claim 21, wherein the controller in communication with the drive wheel encoder is configured to:
i) compare the measured speed of each of the wheels of the wheel assembly with the kinematic state of the load handling device; and
ii) in response to the measured speed of any one of the wheels of the wheel assembly being substantially different to the kinematic state of the load handling device when on the grid structure, either:

a) adjust a shared calculated torque demand to the other wheels such that the kinematic state of the load handling device remains substantially unchanged; and/or
b) re-distribute the calculated torque demand to the each of the wheels of the wheel assembly.

23. The load handling device of claim 21, wherein the controller in communication with the drive wheel encoder is configured to remove a shared calculated torque demand from the any one of the wheels of the wheel assembly until a speed of the wheel is substantially equal to the kinematic state of the load handling device in response to the measured speed of any one of the wheels of the wheel assembly being substantially greater than the kinematic state of the load handling device.

24. The load handling device of claim 1, wherein the position detection means comprises:
a first position detection means and a second position detection means, the first position detection means being configured for detecting a position of the load handling device in a first direction when on the grid structure, and the second position detection means being configured for detecting a position of the load handling device in a second direction when on the grid structure, the first direction being transverse to the second direction.

25. The load handling device of claim 1, wherein the position detection means comprises:
an encoder coupled to a position wheel rotatably mounted to an arm such that rotation of the position wheel is detected by the encoder, said arm being downwardly biased so as to enable the position wheel to be biased into engagement with a grid structure.

26. The load handling device of claim 1, in combination with a storage system, the combination comprising:
a first set of tracks and a second set of tracks running transversely to the first set of tracks in a substantially horizontal plane to form a grid pattern including a plurality of grid spaces or grid cells;
a plurality of stacks of containers located beneath the first set of tracks and second set of tracks, wherein each of the stack of containers occupies a single grid space or grid cell; and
the load handling device arranged to traverse along the first set and the second set of tracks over the plurality of grid spaces or grid cells such that, when positioned above a stack of containers occupying a grid space or grid cell, the lifting device is configured to lift at least one container from said stack of containers.

\* \* \* \* \*